United States Patent
Park et al.

(10) Patent No.: US 10,813,118 B2
(45) Date of Patent: Oct. 20, 2020

(54) METHOD FOR TRANSMITTING AND RECEIVING UPLINK CONTROL INFORMATION AND DEVICES SUPPORTING THE SAME

(71) Applicant: LG Electronics Inc., Seoul (KR)

(72) Inventors: Hanjun Park, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 141 days.

(21) Appl. No.: 16/100,872

(22) Filed: Aug. 10, 2018

(65) Prior Publication Data

US 2019/0037586 A1    Jan. 31, 2019

Related U.S. Application Data

(60) Provisional application No. 62/669,951, filed on May 10, 2018, provisional application No. 62/635,474, filed on Feb. 26, 2018, provisional application No. 62/630,305, filed on Feb. 14, 2018, provisional application No. 62/622,737, filed on Jan. 26, 2018, provisional application No. 62/622,087, filed on Jan. 25, 2018, provisional application No. 62/555,691, filed on Sep. 8, 2017, provisional application No. 62/543,949, filed on Aug. 10, 2017, provisional application No. 62/531,811, filed on Jul. 12, 2017, provisional application No. 62/530,768, filed on Jul. 10, 2017.

(51) Int. Cl.
*H04W 72/04* (2009.01)
*H04W 72/12* (2009.01)
*H04W 72/14* (2009.01)
*H04L 5/00* (2006.01)

(52) U.S. Cl.
CPC ........... *H04W 72/1284* (2013.01); *H04L 5/00* (2013.01); *H04W 72/0413* (2013.01); *H04W 72/14* (2013.01)

(58) Field of Classification Search
CPC ....... H04L 1/00; H04L 1/0026; H04L 1/0031; H04L 1/0057; H04L 1/0073; H04L 5/00; H04L 5/0044; H04L 5/0055; H04W 72/0413; H04W 72/1284; H04W 72/14
See application file for complete search history.

(56) References Cited

U.S. PATENT DOCUMENTS

| | | | |
|---|---|---|---|
| 10,530,528 B2 * | 1/2020 | Park | H04L 5/0055 |
| 10,587,386 B2 * | 3/2020 | Larsson | H04W 72/1289 |
| 2012/0113831 A1 * | 5/2012 | Pelletier | H04L 5/0053 370/252 |
| 2014/0293921 A1 * | 10/2014 | Tang | H04W 72/0413 370/329 |

(Continued)

*Primary Examiner* — Mehmood B. Khan
*Assistant Examiner* — Zhaohui Yang
(74) *Attorney, Agent, or Firm* — Fish & Richardson P.C.

(57) ABSTRACT

Disclosed herein are a method for transmitting and receiving uplink control information between a terminal and a base station in a wireless communication system and devices supporting the same.
Particularly, disclosed herein are a method for transmitting and receiving uplink control information between a terminal and a base station on a physical uplink shared channel (PUSCH) without data (e.g., UL-SCH) and operation of devices supporting the same.

10 Claims, 21 Drawing Sheets

(56) References Cited

U.S. PATENT DOCUMENTS

2016/0381674 A1\* 12/2016 Kim ................. H04L 1/1819
 370/329
2018/0092073 A1\* 3/2018 Nogami ............ H04W 72/1268

\* cited by examiner

METHOD FOR TRANSMITTING AND
RECEIVING UPLINK CONTROL
INFORMATION AND DEVICES
SUPPORTING THE SAME

This application claims the benefit of U.S. Provisional Application No. 62/530,768 filed on Jul. 10, 2017, No. 62/531,811 filed on Jul. 12, 2017, No. 62/543,949 filed on Aug. 10, 2017, No. 62/555,691 filed on Sep. 8, 2017, No. 62/622,087 filed on Jan. 25, 2018, No. 62/622,737 filed on Jan. 26, 2018, No. 62/630,605 filed on Feb. 14, 2018, No. 62/635,474 filed on Feb. 26, 2018, and No. 62/669,951 filed on May 10, 2018, all of which are hereby incorporated by reference as if fully set forth herein.

BACKGROUND OF THE INVENTION

Field of the Invention

The following description relates to a wireless communication system, and more particularly, to a method for transmitting and receiving uplink control information between a terminal and a base station in a wireless communication system to which various numerologies are applicable, and devices supporting the same.

Discussion of the Related Art

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY OF THE INVENTION

An object of the present invention is to provide a method for transmitting and receiving uplink control information between a terminal and a base station in a newly proposed communication system.

In particular, it is an object of the present invention to provide a specific method for transmitting uplink control information when a terminal transmits uplink control information on a physical uplink shared channel in a newly proposed communication system.

It will be appreciated by persons skilled in the art that the objects that could be achieved with the present disclosure are not limited to what has been particularly described hereinabove and the above and other objects that the present disclosure could achieve will be more clearly understood from the following detailed description.

The present invention provides a method and devices for transmitting and receiving uplink control information between a terminal and a base station in a wireless communication system.

In one aspect of the present invention, a method for transmitting uplink control information (UCI) at a user equipment (UE) to a base station (BS) in a wireless communication system includes receiving from the BS, scaling information on acknowledgement information included in the UCI through higher layer signaling, determining a number of first coded modulation symbols for the acknowledgement information on physical uplink shared channel (PUSCH) without uplink shared channel (UL-SCH) on the basis of the scaling information, determining a number of second coded modulation symbols for channel state information (CSI) by subtracting the number of the first coded modulation symbols from a number of resource elements that can be used for transmission of the UCI including the acknowledgement information and the CSI, and transmitting to the BS, the UCI including the acknowledgement information and the CSI on the PUSCH on the basis of the number of the first coded modulation symbols and the number of the second coded modulation symbols.

In another aspect of the present invention, a method for receiving uplink control information (UCI) at a base station (BS) from a user equipment (UE) in a wireless communication system includes transmitting to the UE, scaling information on acknowledgement information included in the UCI through higher layer signaling, and receiving from the UE, the UCI including acknowledgement information and channel state information (CSI) on a physical uplink shared channel (PUSCH) without a uplink shared channel (UL-SCH). Herein, the UCI including the acknowledgement information and the CSI is received on the PUSCH on the basis of a number of first coded modulation symbols for the acknowledgement information and a number of second coded modulation symbols for the CSI, wherein the number of the first coded modulation symbols is determined on the basis of the scaling information, and wherein the number of the second coded modulation symbols is determined by subtracting the number of the first coded modulation symbols from a number of resource elements that can be used for transmission of the UCI including the acknowledgement information and the CSI.

For example, when the CSI includes CSI part 1 and CSI part 2 and the number of the first coded modulation symbols corresponds to Q'ACK, a number of third coded modulation symbols for the CSI part 1 may satisfy Equation 1 below, and a number of fourth coded modulation symbols for the CSI part 2 may satisfy Equation 2 below:

$$Q'_{CSI,1} = \min\left\{ \left\lceil \frac{\beta_{offset}^{CSI,1} \cdot (O_{CSI,1} + L_{CSI,1})}{c_0 \cdot Q_m} \right\rceil, \sum_{l=0}^{N_{symb,all}^{PUSCH}-1} M_{sc}^{\Phi^{UCI}}(l) - Q'_{ACK} \right\}, \quad [\text{Equation 1}]$$

$$Q'_{CSI,2} = \sum_{l=0}^{N_{symb,all}^{PUSCH}-1} M_{sc}^{\Phi^{UCI}}(l) - Q'_{ACK} - Q'_{CSI,1}, \quad [\text{Equation 2}]$$

where $O_{CSI,1}$ may denote payload size for the CSI part 1, where $L_{CSI,1}$ may denote a number of CRC (Cyclic Redundancy Check) bits for the CSI part 1, where $\beta_{offset}^{CSI,1}$ may denote beta offset value for the CSI part 1, here $Q_m$ may denote modulation order of the UCI transmitted in the PUSCH, where $c_0$ may denote a target code rate of the PUSCH without the UL-SCH, where $M_{sc}^{\Phi^{UCI}}(l)$ may denote a number of resource elements that can be used for transmission of the UCI in symbol index l, where $N_{symb,all}^{PUSCH}$ may denote a total number of symbols of the PUSCH.

In this embodiment, a sum of the number of the third coded modulation symbols and the number of the fourth coded modulation symbols may correspond to the number of the second coded modulation symbols.

As another example, when the CSI includes CSI part 1 only and the number of the first coded modulation symbols corresponds to $Q'_{ACK}$, a number of third coded modulation symbols for the CSI part 1 may satisfy Equation 3 below:

$$Q'_{CSI} = \sum_{l=0}^{N_{symb,all}^{PUSCH}-1} M_{sc}^{\Phi^{UCI}}(l) - Q'_{ACK},$$ [Equation 3]

where $M_{sc}^{\Phi^{UCI}}(l)$ may denote a number of resource elements that can be used for transmission of the UCI in symbol index l, where $N_{symb,all}^{PUSCH}$ may denote a total number of symbols of the PUSCH.

In this case, the number of the first coded modulation symbols may satisfy Equation 4 below:

$$Q'_{ACK} = \min\left\{\left\lceil \frac{\beta_{offset}^{ACK} \cdot (O_{ACK} + L_{ACK})}{c_0 \cdot Q_m} \right\rceil, \left\lceil \alpha \cdot \sum_{l=l_0}^{N_{symb,all}^{PUSCH}-1} M_{sc}^{\Phi^{UCI}}(l) \right\rceil \right\},$$ [Equation 4]

where $O_{ACK}$ may denote payload size for the acknowledgement information, where $L_{ACK}$ may denote a number of CRC (Cyclic Redundancy Check) bits for the acknowledgement information, where $\beta_{offset}^{ACK}$ may denote beta offset value for the acknowledgement information, where $c_0$ may denote a target code rate of the PUSCH without the UL-SCH, where $\alpha$ may denote a scaling value indicated by the scaling information.

In the configuration above, the PUSCH on which the UCI is transmitted may be determined according to the following rules.

For example, when a plurality of PUSCHs in which a transmission interval is overlapped with a physical uplink control channel (PUCCH) in which transmission of the UCI is scheduled includes one or more first PUSCHs scheduled by corresponding uplink grants and one or more second PUSCHs configured without corresponding uplink grants, the PUSCH in which the UCI is transmitted may be determined to be one of the one or more first PUSCHs.

More specifically, in this case, the PUSCH in which the UCI is transmitted may be determined to be a PUSCH to be transmitted first among the one or more first PUSCHs.

In another aspect of the present invention, a user equipment (UE) for transmitting uplink control information (UCI) to a base station (BS) in a wireless communication system includes a transmitter, a receiver, and a processor connected to the transmitter and the receiver to operate, wherein the processor is configured to receive from the BS, scaling information on acknowledgement information included in the UCI through higher layer signaling, determine a number of first coded modulation symbols for the acknowledgement information on physical uplink shared channel (PUSCH) without uplink shared channel (UL-SCH) on the basis of the scaling information, determine a number of second coded modulation symbols for channel state information (CSI) by subtracting the number of the first coded modulation symbols from a number of resource elements that can be used for transmission of the UCI including the acknowledgement information and the CSI, and transmit to the BS, the UCI including the acknowledgement information and the CSI on the PUSCH on the basis of the number of the first coded modulation symbols and the number of the second coded modulation symbols.

In another aspect of the present invention, a base station (BS) for receiving uplink control information (UCI) from a user equipment (UE) in a wireless communication system, the UE includes a transmitter, a receiver, and a processor connected to the transmitter and the receiver to operate, wherein the processor is configured to transmit to the UE, scaling information on acknowledgement information included in the UCI through higher layer signaling, and receive from the UE, the UCI including acknowledgement information and channel state information (CSI) on a physical uplink shared channel (PUSCH) without a uplink shared channel (UL-SCH). Herein, the UCI including the acknowledgement information and the CSI on the PUSCH on the basis of a number of first coded modulation symbols for the acknowledgement information and a number of second coded modulation symbols for the CSI, wherein the number of the first coded modulation symbols is determined on the basis of the scaling information, and wherein the number of the second coded modulation symbols is determined by subtracting the number of the first coded modulation symbols from a number of resource elements that can be used for transmission of the UCI including the acknowledgement information and the CSI.

It is to be understood that both the foregoing general description and the following detailed description of the present disclosure are exemplary and explanatory and are intended to provide further explanation of the disclosure as claimed.

As is apparent from the above description, the embodiments of the present disclosure have the following effects.

According to embodiments of the present invention, when a terminal transmits uplink control information on a PUSCH without uplink data (e.g., UL-SCH), the size of the acknowledgment information in the uplink control information may be set based on the scaling information configured by the base station.

Thereby, the base station may control the maximum number of coded modulation symbols for the acknowledgment information transmitted on the PUSCH. Accordingly, the base station may control the number of coded modulation symbols for channel state information included in the uplink control information so as to be greater than or equal to a certain value.

Correspondingly, the terminal may transmit, on the physical uplink shared channel, uplink control information including the acknowledgment information and channel state information having the number of coded modulation symbols based on the configuration of the base station.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

DETAILED DESCRIPTION OF THE INVENTION

Figure 1:
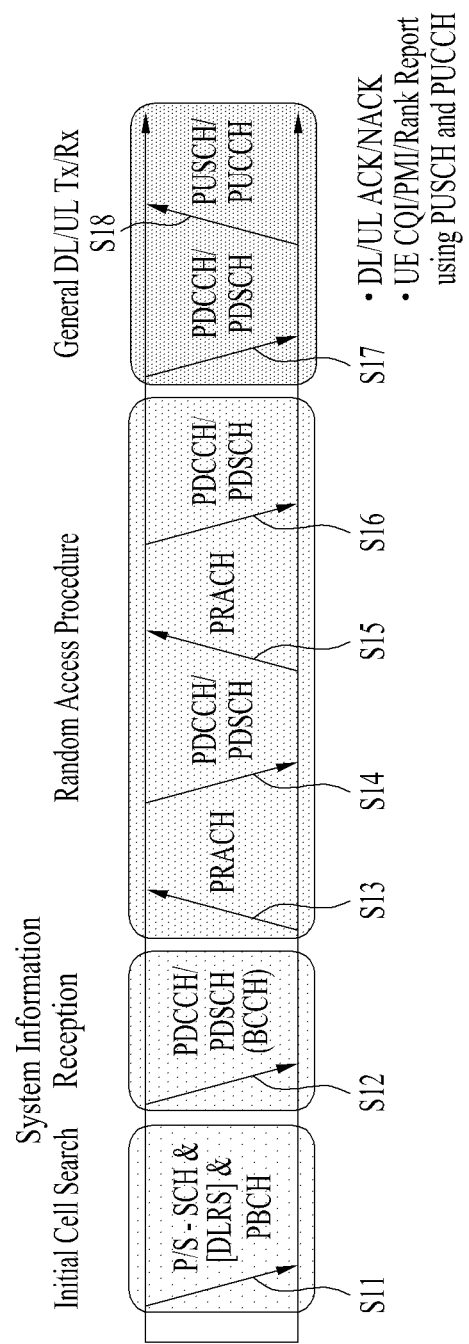
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, 3GPP 5G NR system, and a 3GPP2 system. In particular, the embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1.3GPP LTE/LTE-A System 1.1. Physical Channels and Signal Transmission and Reception Method Using the Same In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
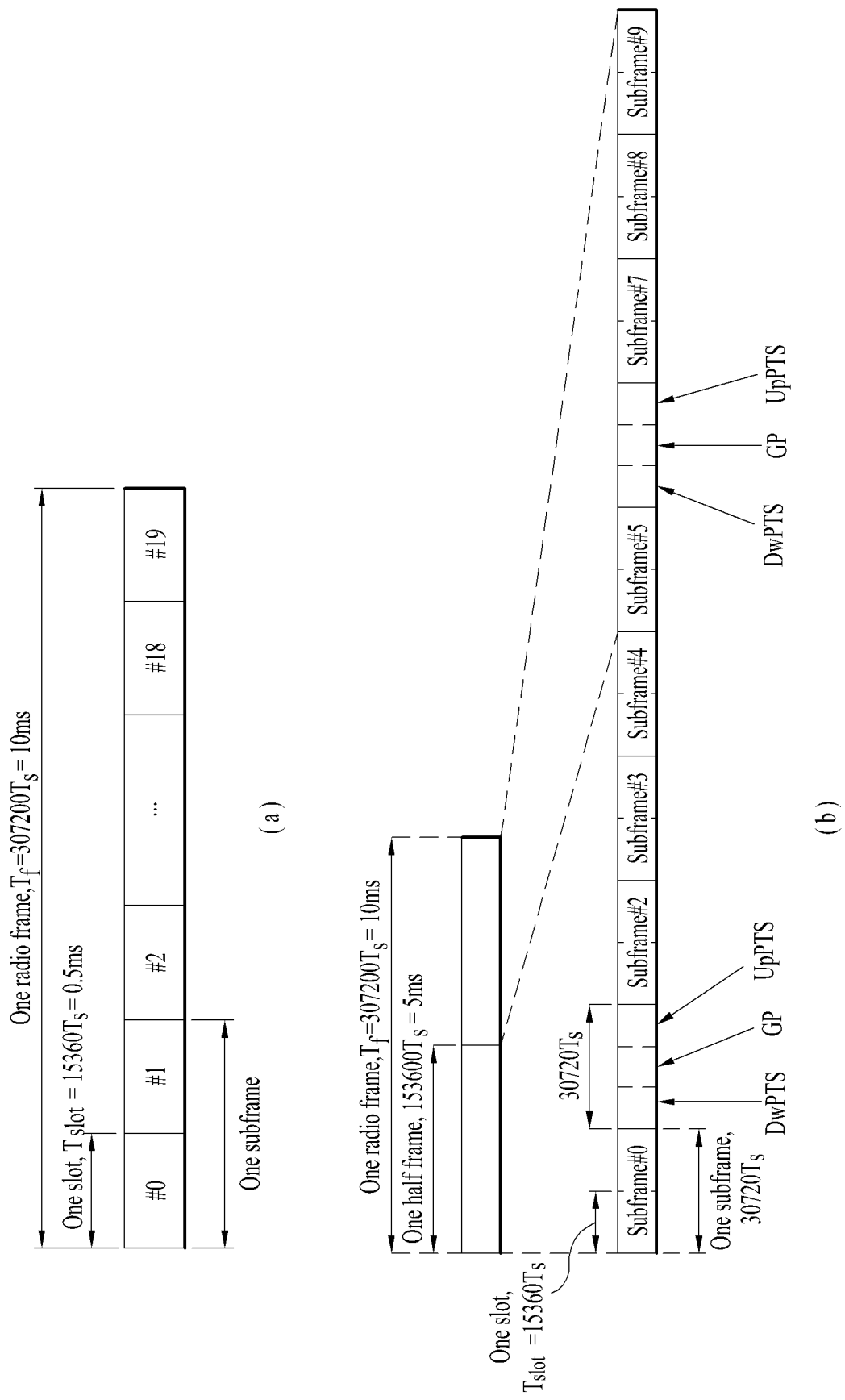
FIG. 2 is a diagram illustrating exemplary radio frame structures.

FIG. 2 illustrates exemplary radio frame structures used in embodiments of the present disclosure.

FIG. 2(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | | Extended cyclic prefix in downlink | |
| --- | --- | --- | --- | --- | --- | --- |
| | | UpPTS | | | UpPTS | |
| | | Normal | Extended | | | |
| Special Subframe configuration | DwPTS | cyclic prefix in uplink | cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In addition, in the LTE Rel-13 system, it is possible to newly configure the configuration of special subframes (i.e., the lengths of DwPTS/GP/UpPTS) by considering the number of additional SC-FDMA symbols, X, which is provided by the higher layer parameter named "srs-UpPtsAdd" (if this parameter is not configured, X is set to 0). In the LTE Rel-14 system, specific subframe configuration #10 is newly added. The UE is not expected to be configured with 2 additional UpPTS SC-FDMA symbols for special subframe configurations {3, 4, 7, 8} for normal cyclic prefix in downlink and special subframe configurations {2, 3, 5, 6} for extended cyclic prefix in downlink and 4 additional UpPTS SC-FDMA symbols for special subframe configurations {1, 2, 3, 4, 6, 7, 8} for normal cyclic prefix in downlink and special subframe configurations {1, 2, 3, 5, 6} for extended cyclic prefix in downlink.)

OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth.

Figure 4:
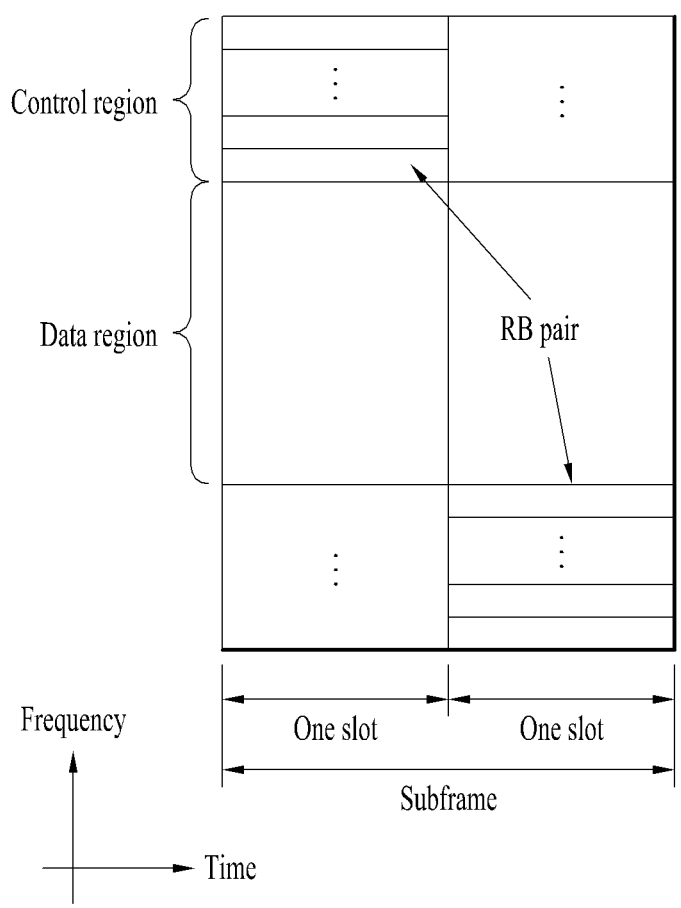
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
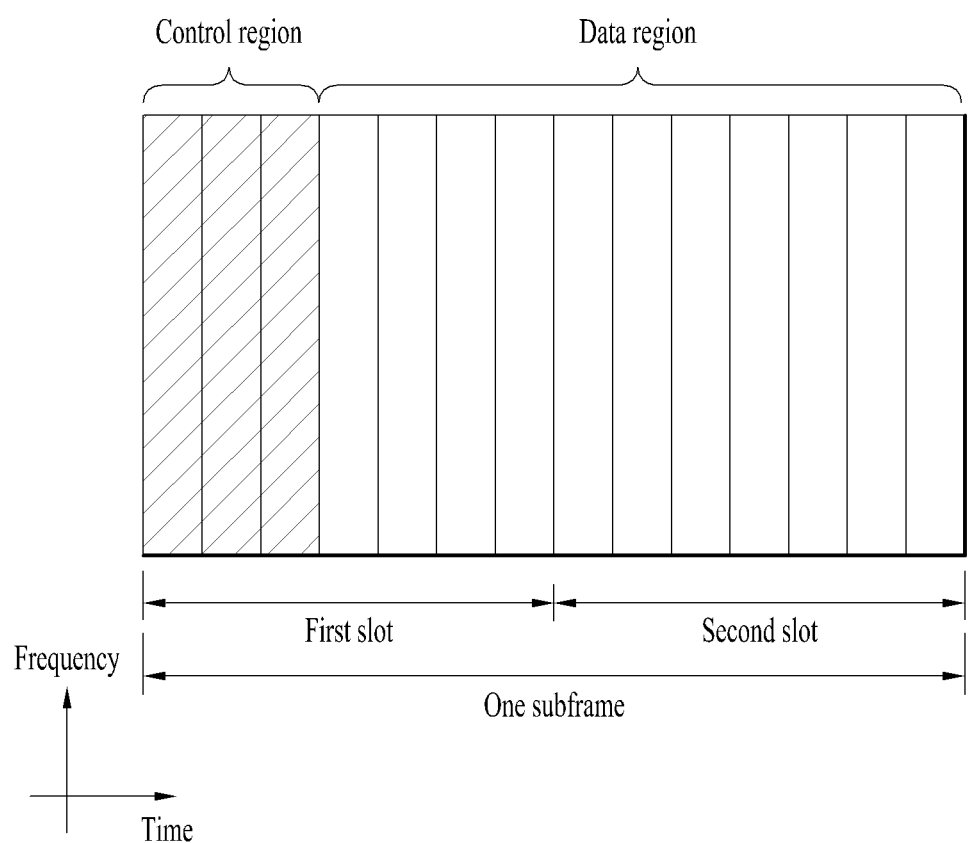
FIG. 5 is a diagram illustrating an exemplary structure of a downlink subframe.

FIG. 5 illustrates a structure of a DL subframe that may be used in embodiments of the present disclosure.

Referring to FIG. 5, up to three OFDM symbols of a DL subframe, starting from OFDM symbol 0 are used as a control region to which control channels are allocated and

TABLE 2

| | | Normal cyclic prefix in downlink | | | Extended cyclic prefix in downlink | |
| --- | --- | --- | --- | --- | --- | --- |
| Special | | UpPTS | | | UpPTS | |
| subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $(1 + X) \cdot 2192 \cdot T_s$ | $(1 + X) \cdot 2560 \cdot T_s$ | $7680 \cdot T_s$ | $(1 + X) \cdot 2192 \cdot T_s$ | $(1 + X) \cdot 2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $(2 + X) \cdot 2192 \cdot T_s$ | $(2 + X) \cdot 2560 \cdot T_s$ |
| 5 | $6592 \cdot T_s$ | $(2 + X) \cdot 2192 \cdot T_s$ | $(2 + X) \cdot 2560 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $12800 \cdot T_s$ | | | |

Figure 3:
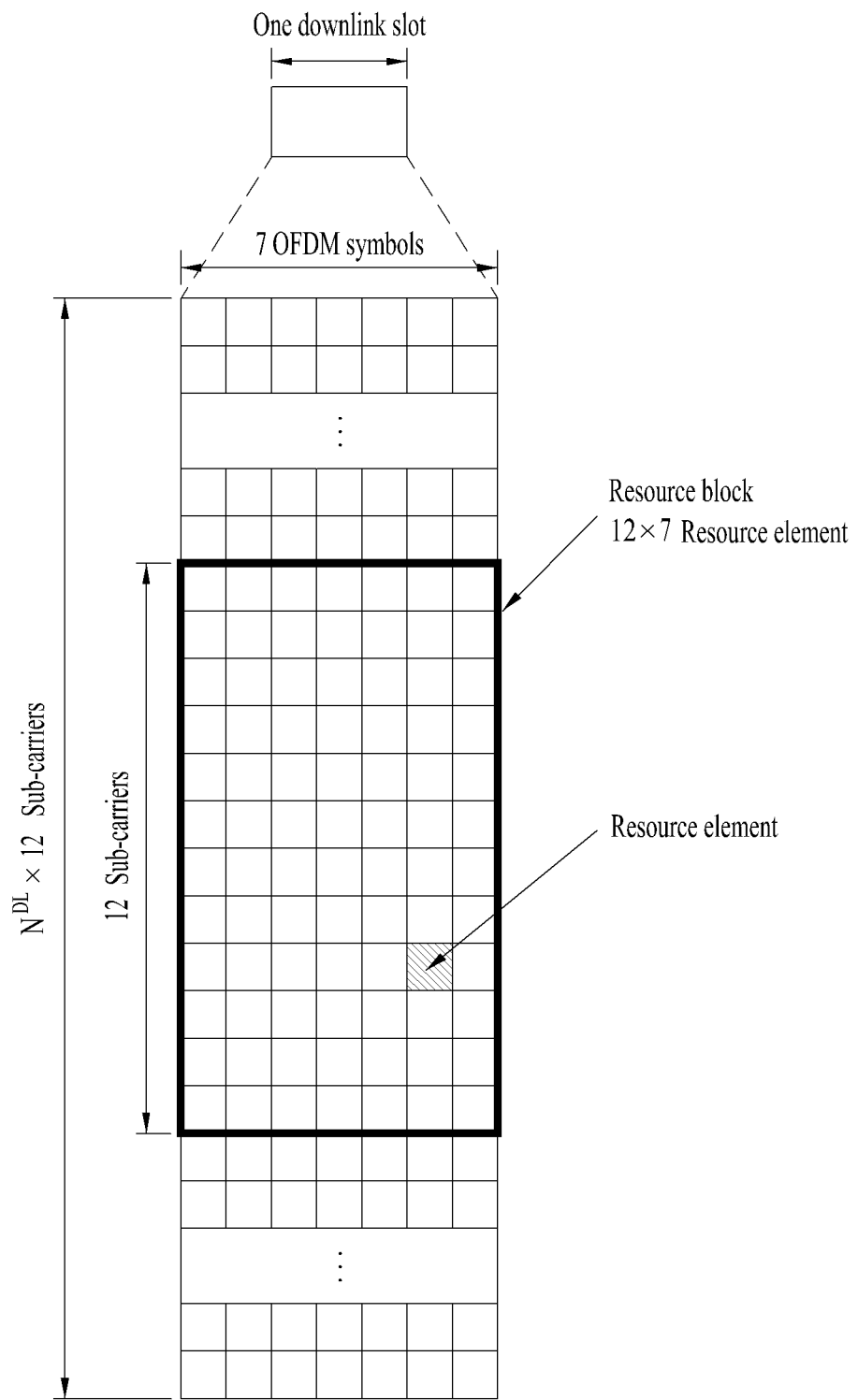
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has also been required. Moreover, a communication system design capable of supporting services/UEs sensitive to reliability and latency has been proposed.

As the new RAT considering the enhanced mobile broadband communication, massive MTC, Ultra-reliable and low latency communication (URLLC), and the like, a new RAT system has been proposed. In the present invention, the corresponding technology is referred to as the new RAT or new radio (NR) for convenience of description.

2.1. Numerologies

The NR system to which the present invention is applicable supports various OFDM numerologies shown in the following table. In this case, the value of μ and cyclic prefix information per carrier bandwidth part can be signaled in DL and UL, respectively. For example, the value of μ and cyclic prefix information per downlink carrier bandwidth part may be signaled though DL-BWP-mu and DL-MWP-cp corresponding to higher layer signaling. As another example, the value of μ and cyclic prefix information per uplink carrier bandwidth part may be signaled though UL-BWP-mu and UL-MWP-cp corresponding to higher layer signaling.

TABLE 3

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

2.2 Frame Structure

DL and UL transmission are configured with frames with a length of 10 ms. Each frame may be composed of ten subframes, each having a length of 1 ms. In this case, the number of consecutive OFDM symbols in each subframe is $N_{symb}^{subframe,\mu} = N_{symb}^{slot} N_{slot}^{subframe,\mu}$.

In addition, each subframe may be composed of two half-frames with the same size. In this case, the two half-frames are composed of subframes 0 to 4 and subframes 5 to 9, respectively.

Regarding the subcarrier spacing μ, slots may be numbered within one subframe in ascending order like $n_s^\mu \in \{0, \ldots, N_{slot}^{subframe, \mu} -1\}$ and may also be numbered within a frame in ascending order like $n_{s,f}^\mu \in \{0, \ldots, N_{slot}^{frame, \mu} -1\}$. In this case, the number of consecutive OFDM symbols in one slot ($N_{symb}^{slot}$) may be determined as shown in the following table according to the cyclic prefix. The start slot ($n_s^\mu$) of one subframe is aligned with the start OFDM symbol ($n_s^\mu N_{symb}^{slot}$) of the same subframe in the time dimension. Table 4 shows the number of OFDM symbols in each slot/frame/subframe in the case of the normal cyclic prefix, and Table 5 shows the number of OFDM symbols in each slot/frame/subframe in the case of the extended cyclic prefix.

TABLE 4

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 5

| μ | $N_{symb}^{slot}$ | $N_{slot}^{frame, \mu}$ | $N_{slot}^{subframe, \mu}$ |
|---|---|---|---|
| 2 | 12 | 40 | 4 |

In the NR system to which the present invention can be applied, a self-contained slot structure can be applied based on the above-described slot structure.

Figure 6:
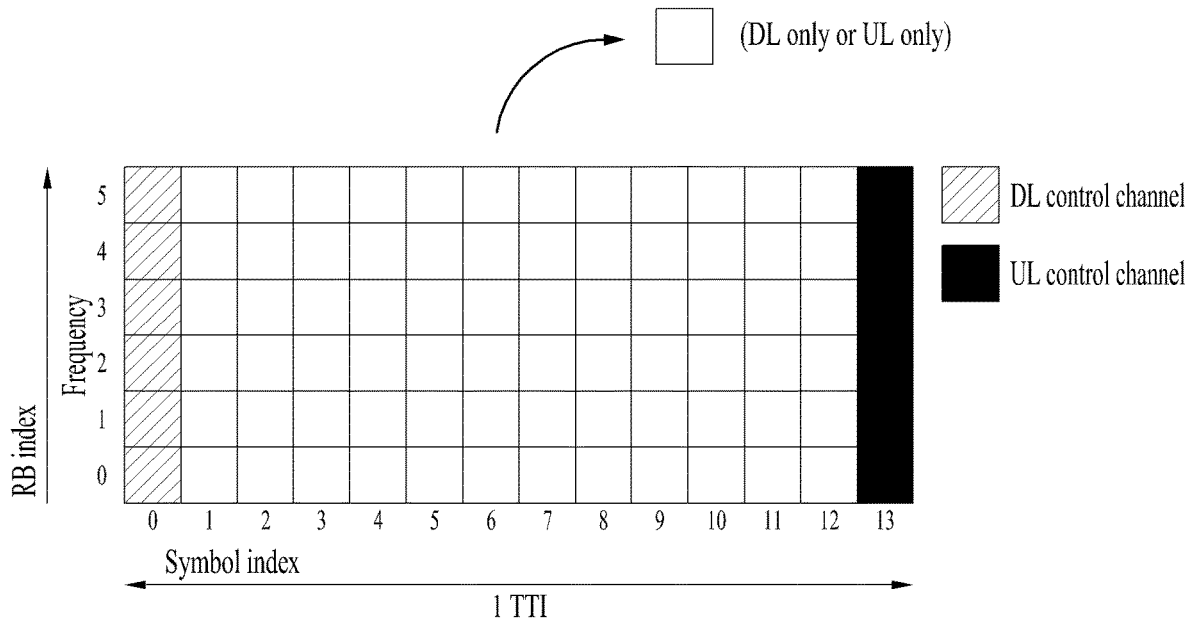
FIG. 6 is a diagram illustrating a self-contained subframe structure applicable to the present invention.

FIG. 6 is a diagram illustrating a self-contained slot structure applicable to the present invention.

In FIG. 6, the hatched area (e.g., symbol index=0) indicates a downlink control region, and the black area (e.g., symbol index=13) indicates an uplink control region. The remaining area (e.g., symbol index=1 to 13) can be used for DL or UL data transmission.

Based on this structure, the eNB and UE can sequentially perform DL transmission and UL transmission in one slot. That is, the eNB and UE can transmit and receive not only DL data but also UL ACK/NACK in response to the DL data in one slot. Consequently, due to such a structure, it is possible to reduce a time required until data retransmission in case a data transmission error occurs, thereby minimizing the latency of the final data transmission.

In this self-contained slot structure, a predetermined length of a time gap is required for the process of allowing the eNB and UE to switch from transmission mode to reception mode and vice versa. To this end, in the self-contained slot structure, some OFDM symbols at the time of switching from DL to UL are set as a guard period (GP).

Although it is described that the self-contained slot structure includes both the DL and UL control regions, these control regions can be selectively included in the self-contained slot structure. In other words, the self-contained slot structure according to the present invention may include either the DL control region or the UL control region as well as both the DL and UL control regions as shown in FIG. 6.

In addition, for example, the slot may have various slot formats. In this case, OFDM symbols in each slot can be divided into downlink symbols (denoted by 'D'), flexible symbols (denoted by 'X'), and uplink symbols (denoted by 'U').

Thus, the UE can assume that DL transmission occurs only in symbols denoted by 'D' and 'X' in the DL slot. Similarly, the UE can assume that UL transmission occurs only in symbols denoted by 'U' and 'X' in the UL slot.

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
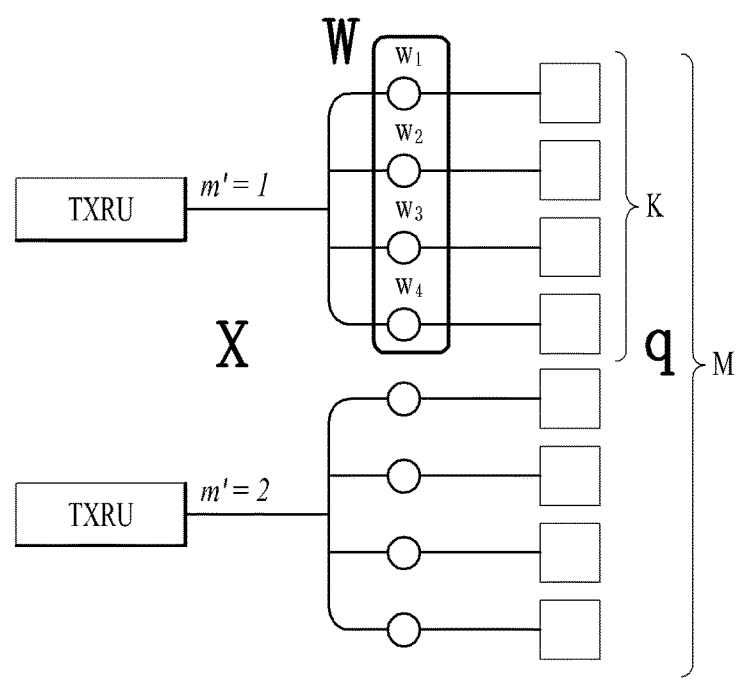
FIGS. 7 and 8 are diagrams illustrating representative connection methods for connecting TXRUs to antenna elements.
Figure 8:
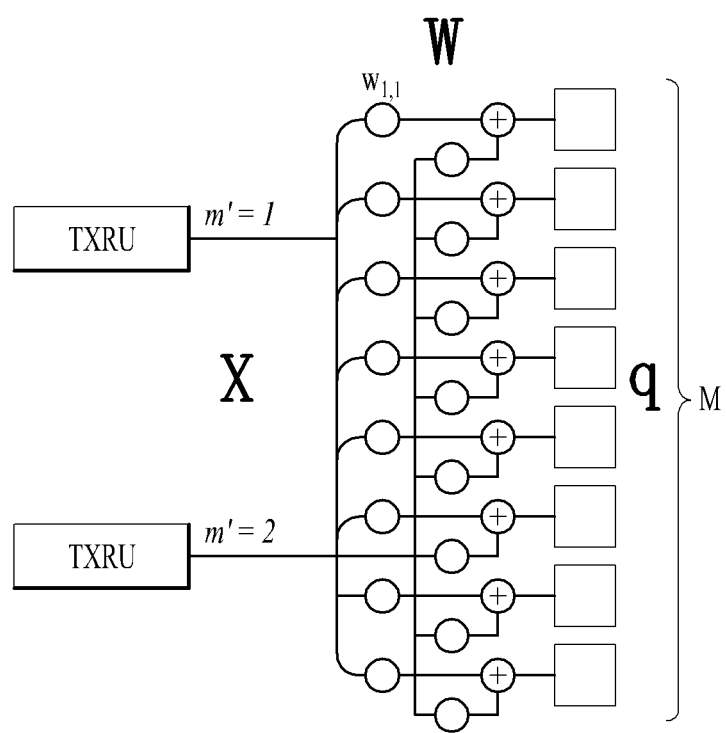

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to sub-arrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

When a plurality of antennas are used in the NR system to which the present invention is applicable, the hybrid beamforming method obtained by combining the digital beamforming and analog beamforming can be applied. In this case, the analog (or radio frequency (RF)) beamforming means the operation where precoding (or combining) is performed at the RF end. In the case of the hybrid beamforming, precoding (or combining) is performed at the baseband end and RF end, respectively. Thus, the hybrid beamforming is advantageous in that it guarantees the performance similar to the digital beamforming while reducing the number of RF chains and D/A (digital-to-analog) (or A/D (analog-to-digital) z converters.

For convenience of description, the hybrid beamforming structure can be represented by N transceiver units (TXRUs) and M physical antennas. In this case, the digital beamforming for L data layers to be transmitted by the transmitting end may be represented by the N*L (N by L) matrix. Thereafter, N converted digital signals are converted into analog signals by the TXRUs, and then the analog beamforming, which may be represented by the M*N (M by N) matrix, is applied to the converted signals.

Figure 9:
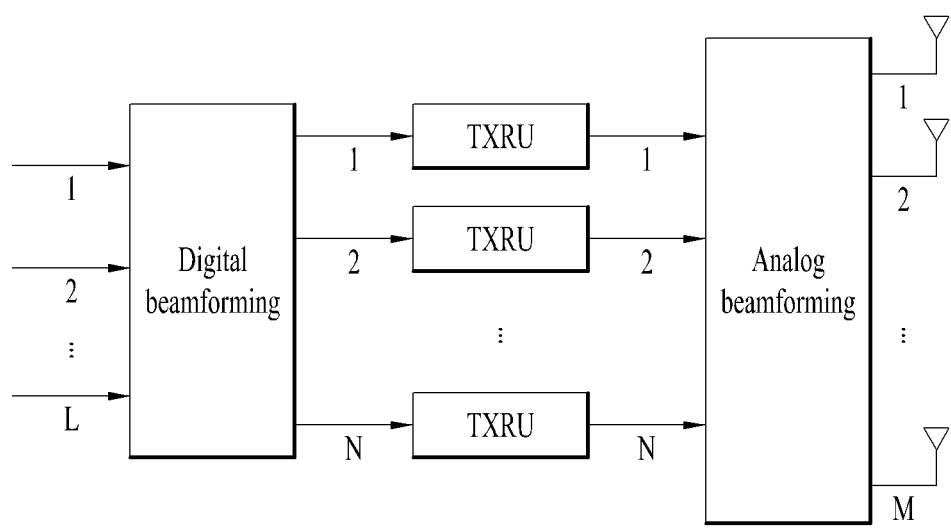
FIG. 9 is a schematic diagram illustrating a hybrid beamforming structure according to an embodiment of the present invention from the perspective of TXRUs and physical antennas.

FIG. 9 is a schematic diagram illustrating a hybrid beamforming structure according to an embodiment of the present invention from the perspective of TXRUs and physical antennas. In FIG. 9, it is assumed that the number of digital beams is L and the number of analog beams is N.

Additionally, a method for providing efficient beamforming to UEs located in a specific area by designing an eNB capable of changing analog beamforming on a symbol basis has been considered in the NR system to which the present invention is applicable. Further, a method of introducing a plurality of antenna panels where independent hybrid beamforming can be applied by defining N TXRUs and M RF antennas as one antenna panel has also been considered in the NR system to which the present invention is applicable.

When the eNB uses a plurality of analog beams as described above, each UE has a different analog beam suitable for signal reception. Thus, the beam sweeping operation where the eNB applies a different analog beam per symbol in a specific subframe (SF) (at least with respect to synchronization signals, system information, paging, etc.) and then perform signal transmission in order to allow all UEs to have reception opportunities has been considered in the NR system to which the present invention is applicable.

Figure 10:
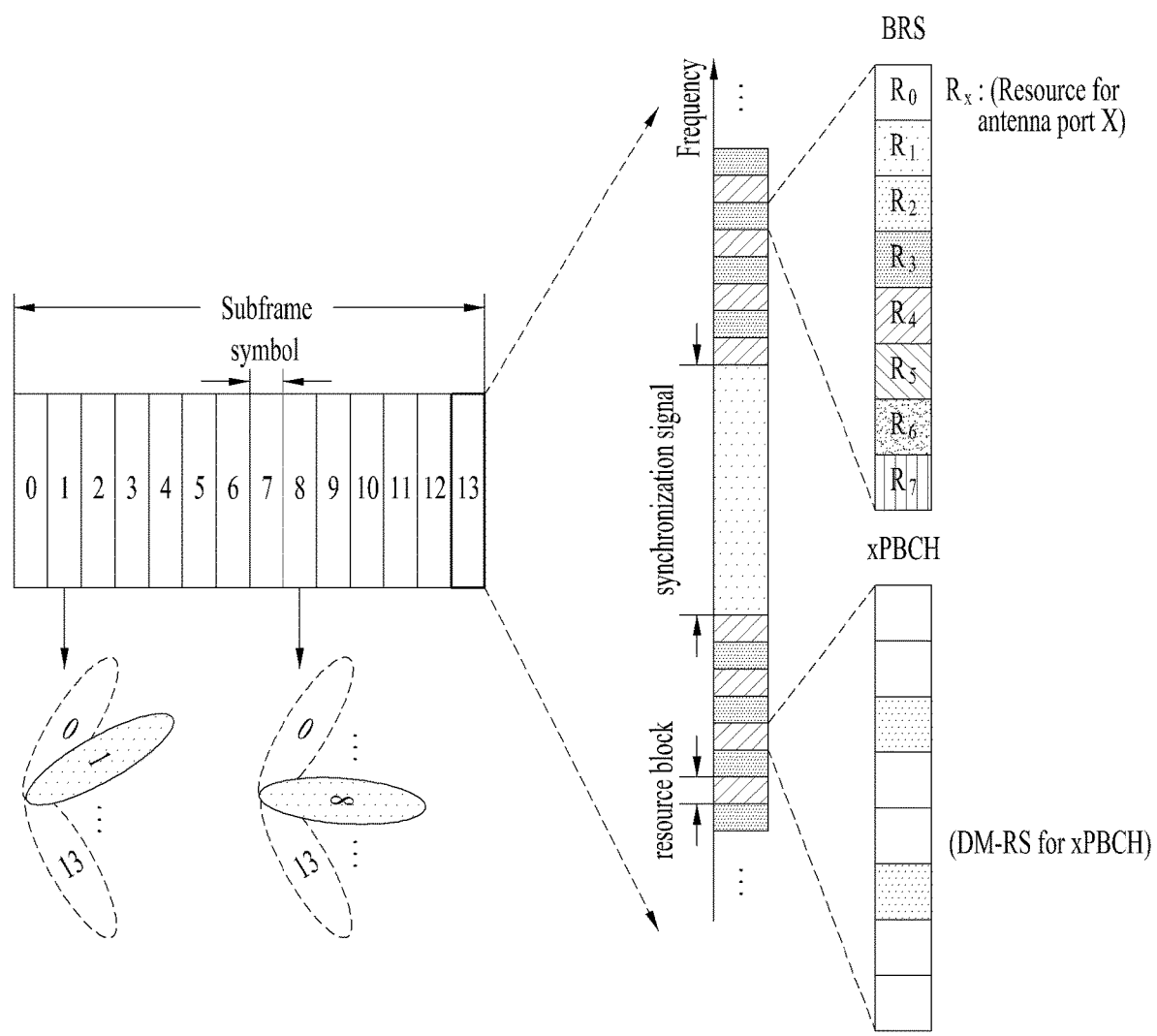
FIG. 10 is a diagram schematically illustrating the beam sweeping operation for synchronization signals and system information during a downlink (DL) transmission process according to an embodiment of the present invention.

FIG. 10 is a diagram schematically illustrating the beam sweeping operation for synchronization signals and system information during a downlink (DL) transmission process according to an embodiment of the present invention.

In FIG. 10, a physical resource (or channel) for transmitting system information of the NR system to which the present invention is applicable in a broadcasting manner is referred to as a physical broadcast channel (xPBCH). In this case, analog beams belonging to different antenna panels can be simultaneously transmitted in one symbol.

In addition, as shown in FIG. 10, the introduction of a beam reference signal (BRS) corresponding to the reference signal (RS) to which a single analog beam (corresponding to a specific antenna panel) is applied has been discussed as the configuration for measuring a channel per analog beam in the NR system to which the present invention is applicable. The BRS can be defined for a plurality of antenna ports, and each BRS antenna port may correspond to a single analog beam. In this case, unlike the BRS, all analog beams in the analog beam group can be applied to the synchronization signal or xPBCH unlike the BRS to assist a random UE to correctly receive the synchronization signal or xPBCH.

2.4. Bandwidth Part (BWP)

A bandwidth up to 400 MHz per component carrier (CC) may be supported in an NR system to which the present invention is applicable.

If a particular UE operates in this wideband CC and always operates with the RF module for the entire CC turned on, UE battery consumption of the particular UE may be large.

Alternatively, if a plurality of use cases (e.g., enhanced mobile broadband (eMBB), ultra-reliable low latency communication (URLLC), massive machine type communication (mMTC), etc.) is supportable within one wideband CC in an NR system to which the present invention is applicable, the NR system may support different numerologies (e.g., sub-carrier spacings) for respective frequency bands within the CC.

Alternatively, UEs operating in the NR system to which the present invention is applicable may have different capabilities for the maximum bandwidth per UE.

Given these various considerations, the BS of the NR system may direct the UE to operate within a partial bandwidth, rather than the full bandwidth of the wideband CC. In the following description, the partial bandwidth is referred to as a bandwidth part (BWP) for simplicity. Here, the BWP may be composed of resource blocks (RBs) consecutive in the frequency domain, and may correspond to one numerology (e.g., sub-carrier spacing, cyclic prefix (CP) length, slot/mini-slot duration, etc.).

The BS may configure a plurality of BWPs in one CC configured for the UE.

In one example, the BS may configure a first BWP that occupies a relatively small frequency range for a PDCCH monitoring slot. Here, the PDSCH indicated by the PDCCH may be scheduled on a second BWP larger than the first BWP.

Alternatively, if multiple UEs are densely populated in a particular BWP, the BS may configure different BWPs for some UEs to meet load balancing.

Alternatively, in consideration of frequency-domain inter-cell interference cancellation between neighboring cells, the BS may configure both side BWPs except for a middle spectrum of the entire bandwidth in the same slot.

Thus, the BS may configure at least one DL/UL BWP for the UE associated with the wideband CC, and the BS may activate at least one of the DL/UL BWP(s) configured at a specific time (through L1 signaling or medium access control (MAC) control element (CE) or radio resource control (RRC) signaling). The activated DL/UL BWP may be defined as an active DL/UL BWP.

Also, if the UE is in an initial access procedure, or an RRC connection has not been established yet, the UE may not fail to receive configuration for the DL/UL BWP from the BS. In this situation, the UE may assume a default DL/UL BWP. In this case, the DL/UL BWP assumed by the UE in the situation above may be defined as an initial active DL/UL BWP.

2.5. DCI Format in NR System

In the NR system to which the present invention is applicable, the following DCI formats may be supported. First, the NR system may support DCI format 0_0 and DCI format 0_1 as DCI formats for PUSCH scheduling and support DCI format 1_0 and DCI format 1_1 as DCI formats for PDSCH scheduling. The NR system may also support DCI format 2_0, DCI format 2_1, DCI format 2_2, and DCI format 2_3 as DCI formats for other purposes.

Here, DCI format 0_0 may be used to schedule a transmission block (TB)-based (or TB-level) PUSCH, and DCI format 0_1 may be used to schedule a transmission block (TB)-based (or TB-level) PUSCH or a code block group (CBG)-based (or CBG-level) PUSCH (if CBG-based signal transmission/reception is configured).

In addition, DCI format 1_0 may be used to schedule a TB-based (or TB-level) PDSCH, and DCI format 1_1 may be used to schedule TB-based (or TB-level) PDSCH or a CBG-based (or CBG-level) PUSCH (if CBG-based signal transmission/reception is configured).

Further, DCI format 2_0 is used for notifying the slot format, and the DCI format 2_1 may be used for notifying the PRB(s) and OFDM symbol(s) where UE may assume no transmission is intended for the UE). DCI format 2_2 may be used for transmission of transmission power control (TPC) commands of PUCCH and PUSCH, and DCI format 2_3 may be used for transmission of a group of TPC commands for SRS transmissions by one or more UEs.

Specific features of the DCI formats may be supported by 3GPP TS 38.212. That is, 3GPP TS 38.212 may be referenced for evident steps or parts not described among the DCI format-related features. In addition, all terms disclosed herein may be described by the aforementioned standard document.

2.6. Uplink Control Information on PUSCH 2.6.1. UCI Bit Sequence Generation 2.6.1.1. HARQ-ACK If only HARQ-ACK bits are transmitted on a PUSCH, the UCI bit sequence $a_0, a_1, a_2, a_3, \ldots, a_{A-1}$ is determined by setting $a_i = \tilde{o}_i^{ACK}$ for $i = 0, 1, \ldots, O^{ACK} - 1$ and $A = O^{ACK}$, where the HARQ-ACK bit sequence $$\tilde{o}_0^{ACK}, \tilde{o}_1^{ACK}, \ldots, \tilde{o}_{O^{ACK}-1}^{ACK}$$

is given by HARQ-ACK codebook determination described in Section 9.1 of 3GPP TS 38.213.

2.6.1.2. CSI

The bitwidth for PMI (Precoding Matrix Indicator) of CodebookType=TypeII is provided in Table 6, where the values of $(N_1, N_2)$, $(O_1, O_2)$, $L$, $N_{PSK}$, $M_1$, $M_2$, and $K^{(2)}$ are given by Resource settings for UE procedure for reporting CSI described in Section 5.2.1.2 of 3GPP TS 38.214. Below Table 6 describes PMI of PMI of codebookType=typeII.

TABLE 6

| | Information fields for wideband PMI | | | | | | Information fields per subband PMI | | | |
|---|---|---|---|---|---|---|---|---|---|---|
| | $i_{1,1}$ | $i_{1,2}$ | $i_{1,3,1}$ | $i_{1,4,1}$ | $i_{1,3,2}$ | $i_{1,4,2}$ | $i_{2,1,1}$ | $i_{2,1,2}$ | $i_{2,2,1}$ | $i_{2,2,2}$ |
| Rank = 1 SB Amp off | $\lceil \log_2(O_1 O_2) \rceil$ | $\left\lceil \log_2 \binom{N_1 N_2}{L} \right\rceil$ | $\lceil \log_2(2L) \rceil$ | $3(2L-1)$ | N/A | N/A | $(M_1 - 1) \cdot \log_2 N_{PSK}$ | N/A | N/A | N/A |
| Rank = 2 SB Amp off | $\lceil \log_2(O_1 O_2) \rceil$ | $\left\lceil \log_2 \binom{N_1 N_2}{L} \right\rceil$ | $\lceil \log_2(2L) \rceil$ | $3(2L-1)$ | $\lceil \log_2(2L) \rceil$ | $3(2L-1)$ | $(M_1 - 1) \cdot \log_2 N_{PSK}$ | $(M_2 - 1) \cdot \log_2 N_{PSK}$ | N/A | N/A |
| Rank = 1 sB Amp on | $\lceil \log_2(O_1 O_2) \rceil$ | $\left\lceil \log_2 \binom{N_1 N_2}{L} \right\rceil$ | $\lceil \log_2(2L) \rceil$ | $3(2L-1)$ | N/A | N/A | $\min(M_1, K^{(2)}) \cdot \log_2 N_{PSK} - \log_2 N_{PSK} + 2 \cdot (M_1 - \min(M_1, K^{(2)}))$ | N/A | $\min(M_1, K^{(2)}) - 1$ | N/A |
| Rank = 2 SB Amp on | $\lceil \log_2(O_1 O_2) \rceil$ | $\left\lceil \log_2 \binom{N_1 N_2}{L} \right\rceil$ | $\lceil \log_2(2L) \rceil$ | $3(2L-1)$ | $\lceil \log_2(2L) \rceil$ | $3(2L-1)$ | $\min(M_1, K^{(2)}) \cdot \log_2 N_{PSK} - \log_2 N_{PSK} + 2 \cdot (M_1 - \min(M_1, K^{(2)}))$ | $\min(M_2, K^{(2)}) \cdot \log_2 N_{PSK} - \log_2 N_{PSK} + 2 \cdot (M_2 - \min(M_1, K^{(2)}))$ | $\min(M_1, K^{(2)}) - 1$ | $\min(M_2, K^{(2)}) - 1$ |

The bitwidth for PMI of codebookType=typeII-PortSelection is provided in Table 7, where the values of $P_{CSI-RS}$, $d$, $L$, $N_{PSK}$, $M_1$, $M_2$, and $K^{(2)}$ are given by Type II Port selection Codebook for UE procedure for reporting CSI described in Subclause 5.2.2.2.4 of 3GPP TS 38.214. Below Table 7 describes PMI of codebookType=typeII-PortSelection.

TABLE 7

| | Information fields for wideband PMI | | | | | Information fields per subband PMI | | | |
| --- | --- | --- | --- | --- | --- | --- | --- | --- | --- |
| | $i_{1,1}$ | $i_{1,3,1}$ | $i_{1,4,1}$ | $i_{1,3,2}$ | $i_{1,4,2}$ | $i_{2,1,1}$ | $i_{2,1,2}$ | $i_{2,2,1}$ | $i_{2,2,2}$ |
| Rank = 1 SB Amp off | $\lceil \log_2(\frac{P_{CSI-RS}}{2d}) \rceil$ | $\lceil \log_2(2L) \rceil$ | $3(2L-1)$ | N/A | N/A | $(M_1-1) \cdot \log_2 N_{PSK}$ | N/A | N/A | N/A |
| Rank = 2 SB Amp off | $\lceil \log_2(\frac{P_{CSI-RS}}{2d}) \rceil$ | $\lceil \log_2(2L) \rceil$ | $3(2L-1)$ | $\lceil \log_2(2L) \rceil$ | $3(2L-1)$ | $(M_1-1) \cdot \log_2 N_{PSK}$ | $(M_2-1) \cdot \log_2 N_{PSK}$ | N/A | N/A |
| Rank = 1 sB Amp on | $\lceil \log_2(\frac{P_{CSI-RS}}{2d}) \rceil$ | $\lceil \log_2(2L) \rceil$ | $3(2L-1)$ | N/A | N/A | $\min(M_1, K^{(2)}) \cdot \log_2 N_{PSK} - \log_2 N_{PSK} + 2 \cdot (M_1 - \min(M_1, K^{(2)}))$ | N/A | $\min(M_1, K^{(2)}) - 1$ | N/A |
| Rank = 2 SB Amp on | $\lceil \log_2(\frac{P_{CSI-RS}}{2d}) \rceil$ | $\lceil \log_2(2L) \rceil$ | $3(2L-1)$ | $\lceil \log_2(2L) \rceil$ | $3(2L-1)$ | $\min(M_1, K^{(2)}) \cdot \log_2 N_{PSK} - \log_2 N_{PSK} + 2 \cdot (M_1 - \min(M_1, K^{(2)}))$ | $\min(M_2, K^{(2)}) \cdot \log_2 N_{PSK} - \log_2 N_{PSK} + 2 \cdot (M_2 - \min(M_1, K^{(2)}))$ | $\min(M_1, K^{(2)}) - 1$ | $\min(M_2, K^{(2)}) - 1$ |

For CSI on PUSCH, two UCI bit sequences are generated, $a_0^{(1)}, a_1^{(1)}, a_2^{(1)}, a_3^{(1)}, \ldots, a_{A^{(1)}-1}^{(1)}$ and $a_0^{(2)}, a_1^{(2)}, a_2^{(2)}, a_3^{(2)}, \ldots, a_{A^{(2)}-1}^{(2)}$. The CSI fields of all CSI reports, in the order from upper part to lower part in Table 11, are mapped to the UCI bit sequence $a_0^{(1)}, a_1^{(1)}, a_2^{(1)}, a_3^{(1)}, \ldots, a_{A^{(1)}-1}^{(1)}$ starting with $a_0^{(1)}$. The CSI fields of all CSI reports, in the order from upper part to lower part in Table 12, are mapped to the UCI bit sequence $a_0^{(2)}, a_1^{(2)}, a_2^{(2)}, a_3^{(2)}, \ldots, a_{A^{(2)}-1}^{(2)}$ starting with $a_0^{(2)}$.

Below Table 8 describes Mapping order of CSI fields of one CSI report, CSI part 1.

TABLE 8

| CSI report number | CSI fields |
| --- | --- |
| CSI report #n CSI part 1 | CRI or SSB index as in Table 11, if reported<br>Rank Indicator as in Tables 8/9/10, if reported<br>Layer Indicator as in Tables 8/9/10, if reported<br>Wideband CQI as in Tables 8/9/10, if reported<br>Subband differential CQI for the first TB as in Tables 8/9/10, if reported<br>Indicator of the number of non-zero wideband amplitude coefficients $M_1$ for layer l as in Table 10, if reported<br>RSRP as in Table 11, if reported<br>Differential RSRP as in Table 11, if reported |

Below Table 9 describes Mapping order of CSI fields of one CSI report, CSI part 2 wideband.

TABLE 9

| CSI report number | CSI fields |
| --- | --- |
| CSI report #n CSI part 2 wideband | Wideband CQI for the second TB as in Tables 8/9/10, if present and reported<br>PMI wideband information fields $X_1$, from left to right as in Tables 6/7, if reported<br>PMI wideband/partial band information fields $X_2$, from left to right as in Tables 6/7, if PMI-FormatIndicator = widebandPMI and if reported |

Below Table 10 describes Mapping order of CSI fields of one CSI report, CSI part 2 subband.

TABLE 10

| CSI report #n Part 2 subband | Subband differential CQI for the second TB of all even subbands with increasing order of subband number, as in Tables 8/9/10, if CQI-FormatIndicator = subbandCQI and if reported |
| --- | --- |

TABLE 10-continued

| | PMI subband information fields $X_2$ of all even subbands with increasing order of subband number, from left to right as in Tables 6/7, if PMI-FormatIndicator = subbandPMI and if reported<br>Subband differential CQI for the second TB of all odd subbands with increasing order of subband number, as in Tables 8/9/10, if CQI-FormatIndicator = subbandCQI and if reported<br>PMI subband information fields $X_2$ of all odd subbands with increasing order of subband number, from left to right as in Tables 6/7, if PMI-FormatIndicator = subbandPMI and if reported |
| --- | --- |

Below Table 11 describes Mapping order of CSI reports to UCI bit sequence $a_0^{(1)}, a_1^{(1)}, a_2^{(1)}, a_3^{(1)}, \ldots, a_{A^{(1)}-1}^{(1)}$, two-part CSI report(s).

TABLE 11

| UCI bit sequence | CSI report number |
| --- | --- |
| $a_0^{(1)}$ | CSI part 1 of CSI report #1 as in Table 8 |
| $a_1^{(1)}$ | CSI part 1 of CSI report #2 as in Table 8 |
| $a_2^{(1)}$ | ... |
| $a_3^{(1)}$ | CSI part 1 of CSI report #n as in Table 8 |
| . | |
| . | |
| . | |
| $a_{A^{(1)}-1}^{(1)}$ | |

CSI report #1, CSI report #2, . . . , CSI report # n in Table 11 correspond to the CSI reports in increasing order of CSI report priority values according to Priority rules for CSI reports described in Subclause 5.2.5 of 3GPP TS 38.214.

Below Table 12 describes Mapping order of CSI reports to UCI bit sequence $a_0^{(2)}, a_1^{(2)}, a_2^{(2)}, a_3^{(2)}, \ldots, a_{A^{(2)}-1}^{(2)}$, with two-part CSI report(s).

TABLE 12

| UCI bit sequence | CSI report number |
| --- | --- |
| $a_0^{(2)}$ | CSI report #1, CSI part 2 wideband, as in Table 9 |
| $a_1^{(2)}$ | if CSI part 2 exists for CSI report #1 |
| $a_2^{(2)}$ | CSI report #2, CSI part 2 wideband, as in Table 9 |
| $a_3^{(2)}$ | if CSI part 2 exists for CSI report #2 |
| . | ... |
| . | CSI report #n, CSI part 2 wideband, as in Table 9 |
| . | if CSI part 2 exists for CSI report #n |

TABLE 12-continued

| UCI bit sequence | CSI report number |
| --- | --- |
| $a_{A^{(2)}-1}^{(2)}$ | CSI report #1, CSI part 2 subband, as in Table 10 if CSI part 2 exists for CSI report #1<br>CSI report #2, CSI part 2 subband, as in Table 10 if CSI part 2 exists for CSI report #2<br>. . .<br>CSI report #n, CSI part 2 subband, as in Table 10 if CSI part 2 exists for CSI report #n |

CSI report #1, CSI report #2, . . . , CSI report # n in Table 12 correspond to the CSI reports in increasing order of CSI report priority values according to Priority rules for CSI reports described in Subclause 5.2.5 of 3GPP TS 38.214.

2.6.2. Code Block Segmentation and CRC (Cyclic Redundancy Check) Attachment

Denote the bits of the payload by $a_0, a_1, a_2, a_3, \ldots, a_{A-1}$, where A is the payload size. The procedure in 2.6.2.1 applies for $A \geq 12$ and the procedure in section 2.6.2.2 applies for $A \leq 11$.

2.6.2.1. UCI Encoded by Polar Code

Code block segmentation and CRC attachment is performed according to Section 6.3.1.2.1 of 3GPP TS 38.212, like below:

If the payload size $A \geq 12$, code block segmentation and CRC attachment is performed according to Polar coding described in Subclause 5.2.1 of 3GPP TS 38.212. If ($A \geq 360$ and $E \geq 1088$) or if $A \geq 1013$, $I_{seg} = 11$; otherwise $I_{seg} = 0$, where E is the rate matching output sequence length as given in UCI encoded by Polar code for Rate matching described in Subclause 6.3.1.4.1 of 3GPP TS 38.212.

If $12 \leq A \leq 19$, the parity bits $p_{r0}, p_{r1}, p_{r2}, \ldots, p_{r(L-1)}$ in Subclause 5.2.1 of 3GPP TS 38.212 are computed by setting L to 6 bits and using the generator polynomial $g_{CRC6}(D)$ in CRC calculation procedure described in Subclause 5.1 of 3GPP TS 38.212, resulting in the sequence $c_{r0}, c_{r1}, c_{r2}, c_{r3}, \ldots, c_{r(K_r-1)}$ where r is the code block number and $K_r$ is the number of bits for code block number r.

If $A \geq 20$, the parity bits $p_{r0}, p_{r1}, p_{r2}, \ldots, p_{r(L-1)}$ in Subclause 5.2.1 of 3GPP TS 38.212 are computed by setting L to 11 bits and using the generator polynomial $g_{CRC11}(D)$ in CRC calculation procedure described in Subclause 5.1 of 3GPP TS 38.212, resulting in the sequence $c_{r0}, c_{r1}, c_{r2}, c_{r3}, \ldots, c_{r(K_r-1)}$ where r is the code block number and $K_r$ is the number of bits for code block number r.

2.6.2.2. UCI Encoded by Channel Coding of Small Block Lengths

The procedure in Section 6.3.1.2.2 of 3GPP TS 38.212 applies, like below:

If the payload size $A \leq 11$, CRC bits are not attached. The output bit sequence is denoted by $c_0, c_1, c_2, c_3, \ldots, c_{K-1}$, where $c_i = a_i$ for $i = 0, 1, \ldots, A-1$ and $K = A$.

2.6.3. Channel Coding of UCI 2.6.3.1. UCI Encoded by Polar Code

Channel coding is performed according to UCI encoded by Polar code for Channel coding of UCI described in Section 6.3.1.3.1 of 3GPP TS 38.212, like below:

Information bits are delivered to the channel coding block. They are denoted by $c_{r0}, c_{r1}, c_{r2}, c_{r3}, \ldots, c_{r(K_r-1)}$, where r is the code block number, and $K_r$ is the number of bits in code block number r. The total number of code blocks is denoted by C and each code block is individually encoded by the following:

If $18 \leq K_r \leq 25$, the information bits are encoded via Polar coding according to Subclause 5.3.1, by setting $n_{max} = 10$, $I_{IL} = 0$, $n_{PC} = 3$, $n_{PC}^{wm} = 1$ if $E_r - K_r + 3 > 192$ and $n_{PC}^{wm} = 0$ if $E_r - K_r + 3 \leq 192$, where $E_r$ is the rate matching output sequence length as given in UCI encoded by Polar code for Rate matching described in Subclause 6.3.1.4.1 of 3GPP TS 38.212.

If $K_r > 30$, the information bits are encoded via Polar coding for channel coding according to Subclause 5.3.1 of 3GPP TS 38.212, by setting $n_{max} = 10$, $I_{IL} = 0$, $n_{PC} = 0$, and $n_{PC}^{wm} = 0$.

After encoding the bits are denoted by where $d_{r0}, d_{r1}, d_{r2}, d_{r3}, \ldots, d_{r(N_r-1)}$, where $N_r$ is the number of coded bits in code block number r.

2.6.3.2. UCI Encoded by Channel Coding of Small Block Lengths

Information bits are delivered to the channel coding block. They are denoted by $c_0, c_1, c_2, c_3, \ldots, c_{K-1}$, where K is the number of bits.

The information bits are encoded according to Section 5.3.3 of 3GPP TS 38.212, like below:

The bit sequence input for a given code block to channel coding is denoted by $c_0, c_1, c_2, c_3, \ldots, c_{K-1}$, where K is the number of bits to encode. After encoding the bits are denoted by $d_0, d_1, d_2, \ldots, d_{N-1}$.

After encoding the bits are denoted by $d_0, d_1, d_2, d_3, \ldots, d_{N-1}$, where N is the number of coded bits.

2.6.4. Rate Matching 2.6.4.1. UCI Encoded by Polar Code 2.6.4.1.1. HARQ-ACK

For HARQ-ACK transmission on PUSCH with UL-SCH, the number of coded modulation symbols per layer for HARQ-ACK transmission, denoted as $Q'_{ACK}$, is determined as following equation:

$$Q'_{ACK} = \min\left\{ \left\lceil \frac{(O_{ACK} + L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \sum_{l=0}^{N_{symb,all}^{PUSCH}-1} M_{sc}^{\Phi^{UCI}}(l) \right\}$$ [Equation 1]

where $O_{ACK}$ is the number of HARQ-ACK bits;

L is the number of CRC (Cyclic Redundancy Check) bits;

$M_{sc}^{PUSCH}$ is the scheduled bandwidth of the PUSCH transmission, expressed as a number of subcarriers;

$N_{symb}^{PUSCH}$ is the number of OFDM symbols of the PUSCH transmission, excluding all OFDM symbols used for DMRS (Demodulation Reference Signal);

$\beta_{offset}^{PUSCH} = \beta_{offset}^{HARQ-ACK}$;

$C_{UL-SCH}$ is the number of code blocks for UL-SCH of the PUSCH transmission;

$K_r$ is the r-th code block size for UL-SCH of the PUSCH transmission;

$M_{sc}^{PT-RS}$ is the number of subcarriers in an OFDM/SC-FDMA symbol that carries PTRS, in the PUSCH transmission;

$N_{symb}^{PTRS}$ is the number of OFDM symbols that carry PTRS, in the PUSCH transmission;

$M_{sc}^{\Phi^{UCI}}(l) = |\Phi_l^{UCI}|$ is the number of elements in set $\Phi_l^{UCI}$, where $\Phi_l^{UCI}$ is the set of resource elements available for transmission of UCI in OFDM symbol l, for $l = 0, 1, 2, \ldots, N_{symb,all}^{PUSCH} - 1$, and $N_{symb,all}^{PUSCH}$ is the total number of OFDM symbols of the PUSCH, including all OFDM symbols used for DMRS.

For HARQ-ACK transmission on PUSCH without UL-SCH, the number of coded modulation symbols per layer for HARQ-ACK transmission, denoted as $Q'_{ACK}$, is determined as following equation:

$$Q'_{ACK} = \min\left\{ \left\lceil \frac{(O_{ACK} + L) \cdot M_{sc}^{PUSCH} \cdot N_{symb}^{PUSCH} \cdot \beta_{offset}^{PUSCH}}{O_{CSI}} \right\rceil, \sum_{l=0}^{N_{symb,all}^{PUSCH}-1} M_{sc}^{\Phi^{UCI}}(l) \right\}$$ [Equation 2]

where
$O_{ACK}$ is the number of HARQ-ACK bits;
L is the number of CRC bits;
$O_{CSI}$ is the number of bits for CSI part 1;
$M_{sc}^{PUSCH}$ is the scheduled bandwidth of the PUSCH transmission, expressed as a number of subcarriers;
$N_{symb}^{PUSCH}$ is the number of OFDM symbols of the PUSCH transmission, excluding all OFDM/SC-FDMA symbols used for DMRS;
$\beta_{offset}^{PUSCH} = \beta_{offset}^{HARQ-ACK} / \beta_{offset}^{CSI-part1}$;
$M_{sc}^{PT-RS}$ is the number of subcarriers in an OFDM symbol that carries PTRS, in the PUSCH transmission;
$N_{symb}^{PTRS}$ is the number of OFDM symbols that carry PTRS, in the PUSCH transmission;
$M_{sc}^{\Phi^{UCI}}(l) = |\Phi_l^{UCI}|$ is the number of elements in set $\Phi_l^{UCI}$, where $\Phi_l^{UCI}$ is the set of resource elements available for transmission of UCI in OFDM symbol l, for l=0, 1, 2, ..., $N_{symb,all}^{PUSCH}-1$, and $N_{symb,all}^{PUSCH}$ is the total number of OFDM symbols of the PUSCH, including all OFDM symbols used for DMRS.

The input bit sequence to rate matching is $d_{r0}, d_{r1}, d_{r2}, d_{r3}, \ldots, d_{r(N_r-1)}$ where r is the code block number, and $N_r$ is the number of coded bits in code block number r.

Rate matching is performed according to Section 5.4.1 by setting $I_{BIL}=1$ and the rate matching output sequence length to $E_r = N_L \cdot Q'_{ACK} \cdot Q_m / C_{UCI}$, where
$C_{UCI}$ is the number of code blocks for UCI determined according to Polar coding for Code block segmentation and code block CRC attachment described in Section 5.2.1 of 3GPP TS 38.212;
$N_L$ is the number of transmission layers of the PUSCH;
$Q_m$ is the modulation order of the PUSCH.

The output bit sequence after rate matching is denoted as $f_{r0}, f_{r1}, f_{r2}, \ldots, f_{r(E_r-1)}$, where $E_r$ is the length of rate matching output sequence in code block number r.

2.6.4.1.2. CSI Part 1

For CSI part 1 transmission on PUSCH with UL-SCH, the number of coded modulation symbols per layer for CSI part 1 transmission, denoted as $Q'_{CSI-part1}$, determined as following equation:

$$Q'_{CSI,1} = \min\left\{ \left\lceil \frac{(O_{CSI,1} + L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \left( \left( \sum_{l=0}^{N_{symb,all}^{PUSCH}-1} M_{sc}^{\Phi^{UCI}}(l) \right) - Q'_{ACK} \right) \right\}$$ [Equation 3]

where
$O_{CSI,1}$ is the number of bits for CSI part 1;
L is the number of CRC bits;
$M_{sc}^{PUSCH}$ is the scheduled bandwidth of the PUSCH transmission, expressed as a number of subcarriers;
$N_{symb}^{PUSCH}$ is the number of OFDM symbols of the PUSCH transmission, excluding all OFDM symbols used for DMRS;

$\beta_{offset}^{PUSCH} = \beta_{offset}^{CSI-part1}$;
$C_{UL-SCH}$ is the number of code blocks for UL-SCH of the PUSCH transmission;
$K_r$ is the r-th code block size for UL-SCH of the PUSCH transmission;
$M_{sc}^{PT-RS}$ is the number of subcarriers in an OFDM symbol that carries PTRS, in the PUSCH transmission;
$N_{symb}^{PTRS}$ is the number of OFDM symbols that carry PTRS, in the PUSCH transmission;
$Q'_{ACK}$ is the number of coded modulation symbols per layer for HARQ-ACK transmitted on the PUSCH if number of HARQ-ACK information bits is more than 2, and $$Q'_{ACK} = \sum_{l=0}^{N_{symb,all}^{PUSCH}-1} \overline{M}_{sc,rvd}^{\Phi}(l)$$

if the number of HARQ-ACK information bits is 1 or 2 bits, where $\overline{\Phi}_l^{rvd}$ is the set of reserved resource elements for potential HARQ-ACK transmission in OFDM symbol l, for l=0, 1, 2, ..., $N_{symb,all}^{PUSCH}-1$ and $\overline{M}_{sc,rvd}^{\Phi}(l) = |\overline{\Phi}_l^{rvd}|$ is the number of elements in $\overline{\Phi}_l^{rvd}$;
$M_{sc}^{\Phi^{UCI}}(l) = |\Phi_l^{UCI}|$ is the number of elements in set $\Phi_l^{UCI}$, where $\Phi_l^{UCI}$ is the set of resource elements available for transmission of UCI in OFDM symbol l, for l=0, 1, 2, ..., $N_{symb,all}^{PUSCH}$ is the total number of OFDM symbols of the PUSCH, including all OFDM symbols used for DMRS.

The input bit sequence to rate matching is $d_{r0}, d_{r1}, d_{r2}, d_{r3}, \ldots, d_{r(N_r-1)}$ where r is the code block number, and $N_r$ is the number of coded bits in code block number r.

Rate matching is performed according to Rate matching for Polar code described in Section 5.4.1 of 3GPP TS 38.212 by setting $I_{BIL}=1$ and the rate matching output sequence length to $E_r = N_L \cdot Q'_{CSI,1} \cdot Q_m / C_{UCI}$, where
$C_{UCI}$ is the number of code blocks for UCI determined according to Polar coding for Code block segmentation and code block CRC attachment described in Section 5.2.1 of 3GPP TS 38.212;
$N_L$ is the number of transmission layers of the PUSCH;
$Q_m$ is the modulation order of the PUSCH.

The output bit sequence after rate matching is denoted as $f_{r0}, f_{r1}, f_{r2}, \ldots, f_{r(E_r-1)}$ where $E_r$ is the length of rate matching output sequence in code block number r.

2.6.4.1.3. CSI Part 2

For CSI part 2 transmission on PUSCH with UL-SCH, the number of coded modulation symbols per layer for CSI part 2 transmission, denoted as $Q'_{CSI-part2}$, is determined as following equation:

$$Q'_{CSI,2} = \min\left\{ \left\lceil \frac{(O_{CSI,2} + L) \cdot M_{sc}^{PUSCH} \cdot N_{symb}^{PUSCH} \cdot \beta_{offset}^{PUSCH}}{\sum_{r=0}^{C_{UL-SCH}-1} K_r} \right\rceil, \left( \left( \sum_{l=0}^{N_{symb,all}^{PUSCH}-1} M_{sc}^{\Phi^{UCI}}(l) \right) - Q'_{ACK} - Q'_{CSI,1} \right) \right\}$$ [Equation 4]

where
$O_{CSI,2}$ is the number of bits for CSI part 2;
L is the number of CRC bits;
$M_{sc}^{PUSCH}$ is the scheduled bandwidth of the PUSCH transmission, expressed as a number of subcarriers;

$N_{symb}^{PUSCH}$ is the number of OFDM symbols of the PUSCH transmission, excluding all OFDM/SC-FDMA symbols used for DMRS;

$\beta_{offset}^{PUSCH} = \beta_{offset}^{CSI-part2}$;

$C_{UL-SCH}$ is the number of code blocks for UL-SCH of the PUSCH transmission;

$K_r$ is the r-th code block size for UL-SCH of the PUSCH transmission;

$M_{sc}^{PT-RS}$ is the number of subcarriers in an OFDM/SC-FDMA symbol that carries PTRS, in the PUSCH transmission;

$N_{symb}^{PTRS}$ is the number of OFDM symbols that carry PTRS, in the PUSCH transmission;

$Q'_{ACK}$ is the number of coded modulation symbols per layer for HARQ-ACK transmitted on the PUSCH if number of HARQ-ACK information bits is more than 2, and $Q'_{ACK}=0$ if the number of HARQ-ACK information bits is 1 or 2 bits;

$Q'_{CSI,1}$ is the number of coded modulation symbols per layer for CSI part 1 transmitted on the PUSCH;

$M_{sc}^{\Phi^{UCI}}(l) = |\Phi_l^{UCI}|$ is the number of elements in set $\Phi_l^{UCI}$, where $\Phi_l^{UCI}$ is the set of resource elements available for transmission of UCI in OFDM symbol l, for l=0, 1, 2, ..., $N_{symb,all}^{PUSCH}-1$, and $N_{symb,all}^{PUSCH}$ is the total number of OFDM symbols of the PUSCH, including all OFDM symbols used for DMRS.

The input bit sequence to rate matching is $d_{r0}, d_{r1}, d_{r2}, d_{r3}, \ldots, d_{r(N_r-1)}$ where r is the code block number, and $N_r$ is the number of coded bits in code block number r.

Rate matching is performed according to Rate matching for Polar code described in Section 5.4.1 of 3GPP TS 38.212 by setting $I_{BIL}=1$ and the rate matching output sequence length to $E_r = N_L \cdot Q'_{CSI,2} \cdot Q_m / C_{UCI}$, where $C_{UCI}$ is the number of code blocks for UCI determined according to Polar coding for Code block segmentation and code block CRC attachment described in Section 5.2.1 of 3GPP TS 38.212;

$N_L$ is the number of transmission layers of the PUSCH;

$Q_m$ is the modulation order of the PUSCH.

The output bit sequence after rate matching is denoted as $f_{r0}, f_{r1}, f_{r2}, \ldots, f_{r(E_r-1)}$ where $E_r$ is the length of rate matching output sequence in code block number r.

2.6.4.2. UCI Encoded by Channel Coding of Small Block Lengths 2.6.4.2.1. HARQ-ACK For HARQ-ACK transmission on PUSCH with UL-SCH, the number of coded modulation symbols per layer for HARQ-ACK transmission, denoted as $Q'_{ACK}$, is determined according to Section 2.6.4.1.1, by setting the number of CRC bits L=0.

For HARQ-ACK transmission on PUSCH with UL-SCH, the number of coded modulation symbols per layer for HARQ-ACK transmission, denoted as $Q'_{ACK}$, is determined according to Section 2.6.4.1.1, by setting the number of CRC bits L=0.

The input bit sequence to rate matching is $d_0, d_1, d_2, \ldots, d_{N-1}$.

Rate matching is performed according to Rate matching for channel coding of small block lengths described in Section 5.4.3 of 3GPP TS 38.212, by setting the rate matching output sequence length $E=N_L \cdot Q'_{ACK} \cdot Q_m$, where $N_L$ is the number of transmission layers of the PUSCH;

$Q_m$ is the modulation order of the PUSCH.

The output bit sequence after rate matching is denoted as $f_0, f_1, f_2, \ldots, f_{E-1}$.

Herein, Rate matching for channel coding of small block lengths described in Section 5.4.3 of 3GPP TS 38.212 is like below:

The input bit sequence to rate matching is $d_0, d_1, d_2, \ldots, d_{N-1}$. The output bit sequence after rate matching is denoted as where $f_0, f_1, f_2, \ldots, f_{E-1}$, is the rate matching output length. The bit sequence $f_0, f_1, f_2, \ldots, f_{E-1}$ is obtained by the following:

for k=0 to E−1

$f_k = d_{k \bmod N}$;

end for 2.6.4.2.2. CSI Part 1

For CSI part 1 transmission on PUSCH with UL-SCH, the number of coded modulation symbols per layer for CSI part 1 transmission, denoted as $Q'_{CSI,1}$, is determined according to Section 2.6.4.1.2, by setting the number of CRC bits L=0.

Rate matching is performed according to Rate matching for channel coding of small block lengths described in Section 5.4.3 of 3GPP TS 38.212, by setting the rate matching output sequence length $E=N_L \cdot Q'_{CSI,1} \cdot Q_m$, where $N_L$ is the number of transmission layers of the PUSCH;

$Q_m$ is the modulation order of the PUSCH.

The output bit sequence after rate matching is denoted as $f_0, f_1, f_2, \ldots, f_{E-1}$.

Herein, Rate matching for channel coding of small block lengths described in Section 5.4.3 of 3GPP TS 38.212 is like below:

The input bit sequence to rate matching is $d_0, d_1, d_2, \ldots, d_{N-1}$. The output bit sequence after rate matching is denoted as $f_0, f_1, f_2, \ldots, f_{E-1}$, where E is the rate matching output sequence length. The bit sequence $f_0, f_1, f_2, \ldots, f_{E-1}$ is obtained by the following:

for k=0 to E−1

$f_k = d_{k \bmod N}$;

end for 2.6.4.2.3. CSI Part 2

For CSI part 2 transmission on PUSCH with UL-SCH, the number of coded modulation symbols per layer for CSI part 2 transmission, denoted as $Q'_{CSI,2}$, is determined according to Section 2.6.4.1.3, by setting the number of CRC bits L=0.

Rate matching is performed according to Rate matching for channel coding of small block lengths described in Section 5.4.3 of 3GPP TS 38.212, by setting the rate matching output sequence length $E=N_L \cdot Q'_{CSI,2} \cdot Q_m$, where $N_L$ is the number of transmission layers of the PUSCH;

$Q_m$ is the modulation order of the PUSCH.

The output bit sequence after rate matching is denoted as $f_0, f_1, f_2, \ldots, f_{E-1}$.

Herein, Rate matching for channel coding of small block lengths described in Section 5.4.3 of 3GPP TS 38.212 is like below:

The input bit sequence to rate matching is $d_0, d_1, d_2, \ldots, d_{N-1}$, The output bit sequence after rate matching is denoted as $f_0, f_1, f_2, \ldots, f_{E-1}$, where E is the rate matching output sequence length. The bit sequence $f_0, f_1, f_2, \ldots, f_{E-1}$ is obtained by the following:

for k=0 to E−1

$f_k = d_{k \bmod N}$;

end for 2.6.5. Code Block Concatenation

Code block concatenation is performed according to Code block concatenation for UCI on PUCCH described in Section 6.3.1.5 of 3GPP TS 38.212.

Herein, Code block concatenation for UCI on PUCCH described in Section 6.3.1.5 of 3GPP TS 38.212 is like below:

The input bit sequence for the code block concatenation block are the sequences $f_{r0}, f_{r1}, f_{r2}, \ldots, f_{r(E_r-1)}$, for r=0, ..., C−1 and where $E_r$ is the number of rate matched bits for the r-th code block.

Code block concatenation is performed according to Code block concatenation described in Subclause 5.5 of 3GPP TS 38.212.

The bits after code block concatenation are denoted by $g_0, g_1, g_2, g_3, \ldots, g_{G'-1}$, where $G' = \lfloor E_{UCI}/C_{UCI} \rfloor \cdot C_{UCI}$ with the values of $E_{UCI}$ and $C_{UCI}$ given in UCI encoded by Polar code for Rate matching described in Subclause 6.3.1.4.1 of 3GPP TS 38.212. Let G be the total number of coded bits for transmission and G=G'+mod($E_{UCI}$,$C_{UCI}$). Set $g_i$=0 for i=G', G'+1, . . . , G−1.

Herein, Code block concatenation described in Subclause 5.5 of 3GPP TS 38.212 is like below:

The input bit sequence for the code block concatenation block are the sequences $f_{rk}$, for r=0, . . . , C−1 and k=0, . . . , $E_r$−1, where $E_r$ is the number of rate matched bits for the r-th code block. The output bit sequence from the code block concatenation block is the sequence $g_k$ for k=0, . . . , G−1.

The code block concatenation consists of sequentially concatenating the rate matching outputs for the different code blocks. Therefore, Set k=0 and r=0
while r<C
Set j=0
while j<$E_r$
$g_k$=$f_{rj}$
k=k+1
j=j+1
end while
r=r+1
end while 2.6.6. Multiplexing of Coded UCI Bits to PUSCH The coded UCI bits are multiplexed onto PUSCH according to data and control multiplexing procedures described in Section 6.2.7 of 3GPP TS 38.212.

3. Proposed Embodiments

Hereinafter, the present invention will be described in more detail based on the technical idea disclosed above.

In this specification, a detailed description will be given of various UCI piggyback schemes for a UE in a wireless communication system composed of a BS and UEs when the UE supports the UCI piggyback operation of transmitting, in the region of the physical uplink shared channel (PUSCH) channel, which is a UL data transmission physical channel, uplink control information (UCI) that is to be transmitted on the physical uplink control channel (PUCCH).

As part of the 5G wireless communication system, the 3GPP standardization group is proceeding with standardization of a wireless communication system named NR. The NR system may support a plurality of logical networks in a single physical system. Accordingly, the NR system is designed to support services having various requirements (e.g., enhanced mobile broadband (eMBB), massive machine type communication (mMTC), ultra-reliability low latency communication (URLLC), etc.).

The NR system to which the present invention is applicable may support a PUCCH, which is a physical channel for UCI transmission. Here, the PUCCH may include a PUCCH (hereinafter, a long PUCCH) which is composed of a relatively large number of orthogonal frequency division multiplexing (OFDM) symbols (e.g., 4 or more symbols) to support a large UL coverage and a PUCCH (hereinafter, a short PUCCH) composed of a relatively small number of OFDM symbols (e.g., 1 symbol or 2 symbols) to support low latency transmission.

In addition, the NR system may support the OFDM scheme (or Multiple Access scheme) having an independent numerology in each time and frequency resource region.

In the NR system, UL transmission information may be broadly divided into UCI and data. In general, according to the characteristics of information, UCI transmission is performed using a PUCCH, which is a dedicated physical channel, and data transmission is performed using a PUSCH, which is a dedicated physical channel. In addition, if the BS is configured such that the UE is not allowed or does not transmit the PUCCH and the PUSCH simultaneously, PUSCH transmission may exist at the time of transmitting the UCI. In this case, the UE may transmit the UCI by piggybacking the UCI on the PUSCH instead of the PUCCH.

Hereinafter, the operation of the UE of transmitting the UCI in the PUSCH region is referred to as UCI piggyback.

Hereinafter, the numerology in the present invention refers to a concept including a symbol length and/or a subcarrier (SC) spacing of an OFDM signal.

Hereinafter, a transmission time interval (TTI) in the present invention may mean a scheduling time unit.

Hereinafter, in the present invention, A/N may refer to HARQ-ACK information.

In the present invention, the PUCCH for transmitting uplink control information (UCI) such as HARQ-ACK or CSI for the PDSCH scheduled through the DL assignment may be classified into PUCCH formats disclosed below according to the payload size and transmission duration (the number of PUCCH transmission symbols) of the UCI.

(1) PUCCH Format 0
Supportable UCI payload size: up to K bits (e.g., K=2)
Number of OFDM symbols constituting a single PUCCH: 1 to X symbols (e.g. X=2)
Transmission structure: It may be composed of only a UCI signal without DMRS, and a specific UCI state may be transmitted by selecting/transmitting one of a plurality of specific sequences.

(2) PUCCH Format 1
Supportable UCI payload size: up to K bits
Number of OFDM symbols constituting a single PUCCH: Y to Z symbols (e.g. Y=4, Z=14)
Transmission structure: DMRS and UCI may be configured in/mapped to different symbols in TDM form. The UCI may be formed by multiplying a specific sequence by a modulation (e.g., QPSK) symbol, and multiplexing between multiple UEs (within the same RB) may be supported by applying the cyclic shift/orthogonal cover code (CS/OCC) to both the UCI and the DMRS (3) PUCCH Format 2
Supportable UCI payload size: more than K bits
Number of OFDM symbols constituting a single PUCCH: 1 to X symbols
Transmission structure: DMRS and UCI may be configured in/mapped to the same symbol in FDM form and may be transmitted by applying only inverse fast Fourier transform (IFFT) to coded UCI bits without discrete Fourier transform (DFT).

(4) PUCCH Format 3
Supportable UCI payload size: more than K bits
Number of OFDM symbols constituting a single PUCCH: Y to Z symbols
Transmission structure: DMRS and UCI may be configured in/mapped to different symbols in TDM form, and be transmitted by applying DFT to coded UCI bits. Multiplexing between multiple UEs (within the same RB) may be supported by applying OCC to the UCI at the front end of DFT and applying CS (or instantaneous frequency division multiplexing (IFDM) mapping) to the DMRS.

(5) PUCCH Format 4
Supportable UCI payload size: more than K bits
Number of OFDM symbols constituting a single PUCCH: Y to Z symbols
Transmission structure: DMRS and UCI may be configured in/mapped to different symbols in TDM form and be transmitted by applying DFT to coded UCI bits without multiplexing between UEs.

In the present invention, a scheduling request (SR) may refer to a physical layer signal used for a UE to make a request to the BS for UL scheduling. In this case, positive SR means that there is a UL scheduling request, and the negative SR means that there is no UL scheduling request.

In the present invention, the semi-static HARQ-ACK codebook refers to a case where the HARQ-ACK payload size to be reported by the UE is semi-statically configured by a (UE-specific) higher layer signal, and the dynamic HARQ-ACK payload size refers to a case where the HARQ-ACK payload size to be reported by the UE is dynamically changeable by DCI or the like.

In the present invention, the UL-SCH may refer to UL data that may be transmitted on the PUSCH.

In the present invention, channel state information (CSI) may be divided into CSI part 1 and CSI part 2 according to an embodiment.

Here, CSI part 1 may include rank indicator (RI) information and broadband PMI/CQI information and have a constant payload size, but CSI part 2 1 may include a plurality of sub-band PMIs/CQIs and have a payload size changeable according to CSI part 1 information (i.e., the rank value).

In the present invention, the beta-offset value may be a design variable used to obtain the number of REs (or the number of modulation symbols) for transmission of specific UCI when the UCI is piggybacked on a PUSCH. The BS may indicate to the UE a beta-offset value through a (UE-specific) higher layer signal and/or DCI.

In the present invention, a counter downlink assignment index (DAI) (hereinafter referred to as a c-DAI) may indicate a specific index value in DCI (e.g., DL scheduling DCI) indicating an order of (scheduled) PDSCHs (or transport blocks (TBs) or code block groups (CBGs)), and a total DAI (hereinafter referred to as t-DAI) may indicate a specific index value in DCI (e.g., DL scheduling DCI) indicating the total number of PDSCHs (or TBs or CBGs) for which HARQ-ACK reporting is performed. When the UE configures a HARQ-ACK payload, it may configure input bits according to the c-DAI order.

Hereinafter, various UCI piggyback methods of a UE applicable to the present invention will be described in detail.

As an example, a detailed description will be given of the UCI piggyback operation in various cases including a case where the numerology configured on the PUCCH transmission resource is different from the numerology configured on the PUSCH transmission resource (e.g., the numerology for the PUCCH transmission carrier is different from the numerology for the PUSCH transmission carrier in the carrier aggregation environment). The present invention will now be described with reference to certain embodiments subjected to some conditions that are applicable to UCI piggyback operations of the UE. However, it should be noted that all the embodiments applicable to the present invention may include not only cases where the conditions are applied but also UCI piggyback operations of the UE applicable without being limited to the aforementioned conditions.

3.1. First UCI Piggyback Method

In this section, it is assumed that there exists one PUSCH in which (some) transmission intervals overlap for a specific PUCCH. In this case, the UE may transmit the UCI in the specific PUCCH on a PUSCH resource determined using the UCI piggyback operation as described below.

In addition, the numerology configured in the PUCCH transmission resource may be $SC=X_0$ and the numerology configured in the PUSCH transmission resource may be $SC=X_1$ (where $X_1 \neq X_0$). However, the UCI piggyback operation of the UE described in this section is not necessarily limited to the aforementioned condition.

(1) When the (minimum) transmission start time of the PUCCH is earlier than or equal to the PUSCH transmission start time:

Option 1-1: UCI piggyback may be performed for a time interval overlapping the PUCCH transmission interval in the PUSCH;

Option 1-2: UCI piggyback may be performed for the entire time interval in the PUSCH.

(2) When the (minimum) transmission start time of the PUCCH is later than the PUSCH transmission start time:

Option 2-1: Only PUCCH transmission may be performed without transmitting the PUSCH;

Option 2-2: UCI piggyback may be performed for the PUCCH transmission interval overlapping the PUCCH transmission interval;

Option 2-3: UCI piggyback may be performed for the time interval from the (minimum) transmission start time of PUCCH in the PUSCH to the transmission end time of the PUSCH;

Option 2-4: PUCCH transmission may be performed after puncturing of the PUSCH region for a time interval overlapping the PUCCH transmission interval in the PUSCH and PUSCH transmission may be performed in the remaining time interval.

Here, the minimum transmission start time of the PUCCH refers to the earliest transmission start time that could be applied to the corresponding PUCCH. Thus, the minimum transmission start time of the PUCCH may implicitly indicate the processing time of the UE. Here, the minimum transmission start time may be different from the actual transmission start time of the UE.

The PUCCH may be a PUCCH for transmission of HARQ-ACK (or HARQ-ACK and CSI). For example, if the PUCCH is a PUCCH for CSI transmission, the UE may perform UCI piggyback for the entire time interval in the PUSCH (irrespective of the (minimum) transmission start time of the PUCCH).

If the UE performs UCI piggyback at a time later than the PUSCH transmission start time, the UE may perform UCI mapping after puncturing the PUSCH region. In the opposite case (i.e., if the UE performs UCI piggyback at a time earlier than the PUSCH transmission start time), the UE may perform UCI mapping after rate-matching or puncturing of the PUSCH region.

UCI mapping may vary depending on the UCI piggyback target time interval in the PUSCH.

The NR system to which the present invention is applicable may support the following four cases for the PUCCH (cell) and the PUSCH (cell). In the following description, the numerology (or SC) and the transmission time interval (TTI) configured for the PUCCH transmission resource (or cell or carrier) are denoted by $SC_0$ and $TTI_0$, and the numerology (or SC) and the TTI configured for PUSCH transmission resource (or cell or carrier) are denoted by $SC_1$ and $TTI_1$, respectively.

Case 1: $SC_0=SC_1$, $TTI_0=TTI_1$
Case 2: $SC_0 \neq SC_1$, $TTI_0=TTI_1$
Case 3: $SC_0=SC_1$, $TTI_0 \neq TTI_1$
Case 4: $SC_0 \neq SC_1$, $TTI_0 \neq TTI_1$ The first UCI piggyback method described above may be applied to all four cases. That is, when the PUCCH resource overlaps the PUSCH resource in the time domain or the PUCCH transmission TTI (or slot) overlaps the PUSCH transmission TTI (or slot) in the time domain, the UE may transmit the UCI using the first UCI piggyback method described above, regardless of the SC and TTI relationship between the PUCCH cell and the PUSCH cell.

Figure 11:
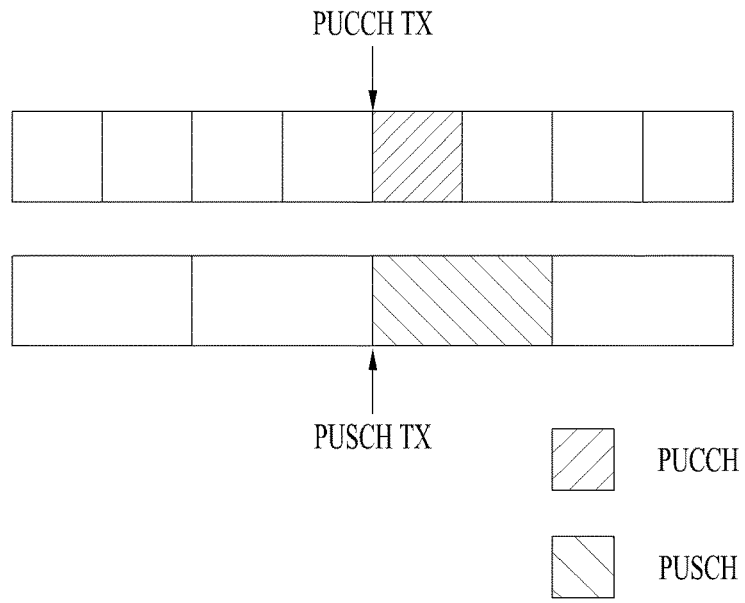
FIGS. 11 to 13 are diagrams illustrating a case where a PUCCH and a PUSCH overlap each other according to an embodiment of the present invention.
Figure 12:
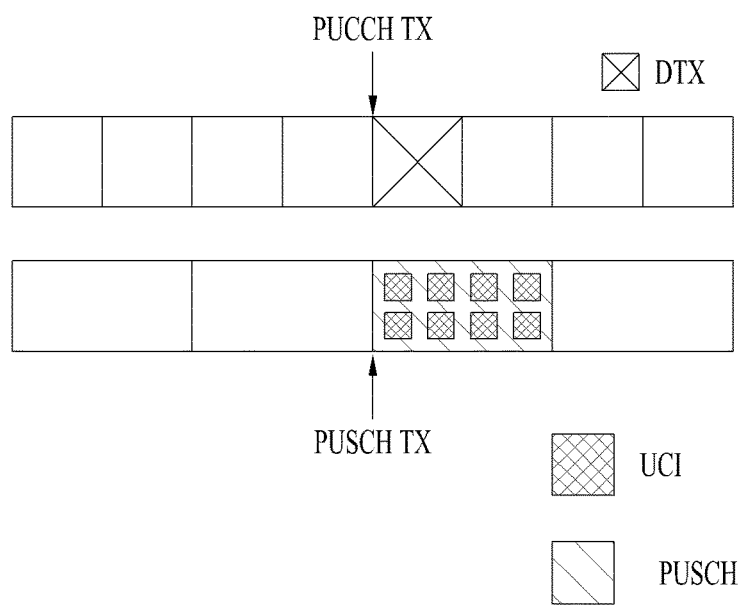
Figure 13:
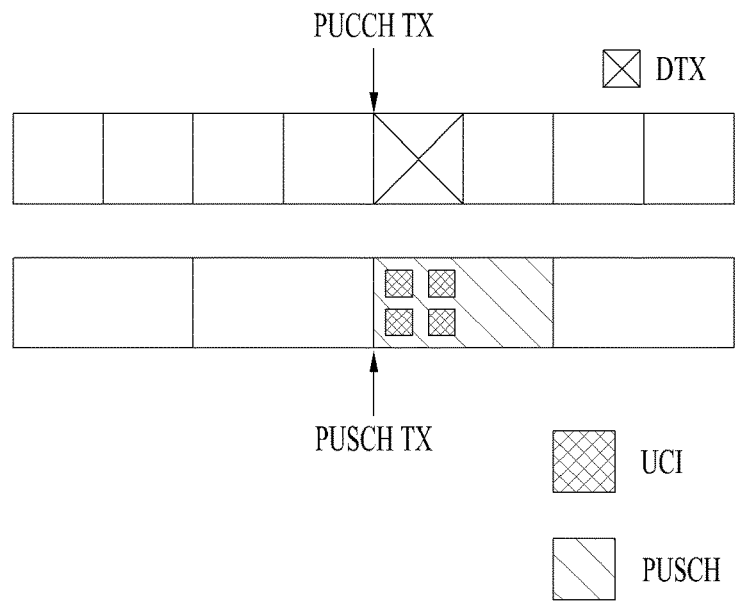

FIGS. 11 to 13 are diagrams illustrating a case where a PUCCH and a PUSCH overlap each other according to an embodiment of the present invention.

According to the embodiment, the numerology ($SC=X_0$) configured in the PUCCH transmission resource may be greater than the numerology ($SC=X_1$) configured in the PUSCH transmission resource (i.e., $X_0 > X_1$), and the transmission interval of (long) PUCCH may overlap that of the PUSCH as shown in FIGS. 11 to 13.

When the (minimum) transmission time of the PUCCH is earlier than or equal to the transmission time of the PUSCH as shown in FIG. 11, the UE may expect the same processing time (=given time for processing such as PDSCH decoding+ UCI encoding) for the UCI piggyback of the UCI for the PUCCH from the PUSCH transmission start time as in transmitting the UCI on the PUCCH or greater processing time. Therefore, the UE may perform UCI piggyback from the PUSCH transmission start time as shown in FIG. 11.

In addition, the UE may perform UCI piggyback for the entire PUSCH interval as shown in FIG. 12, or may (limitedly) perform UGI piggyback only for the time interval corresponding to the PUCCH within the PUSCH considering the processing time of the BS as shown in FIG. 13.

Figure 14:
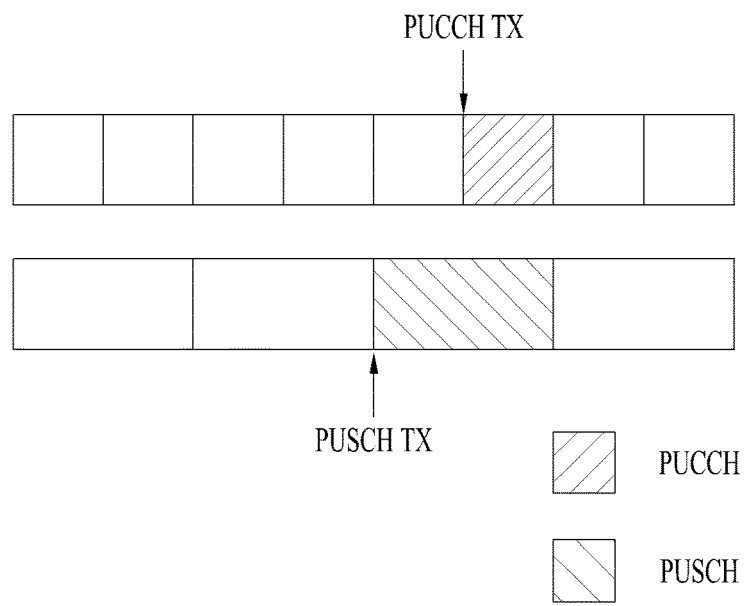
FIGS. 14 and 15 are diagrams illustrating a case where a PUCCH and a PUSCH overlap each other according to another embodiment of the present invention.
Figure 15:
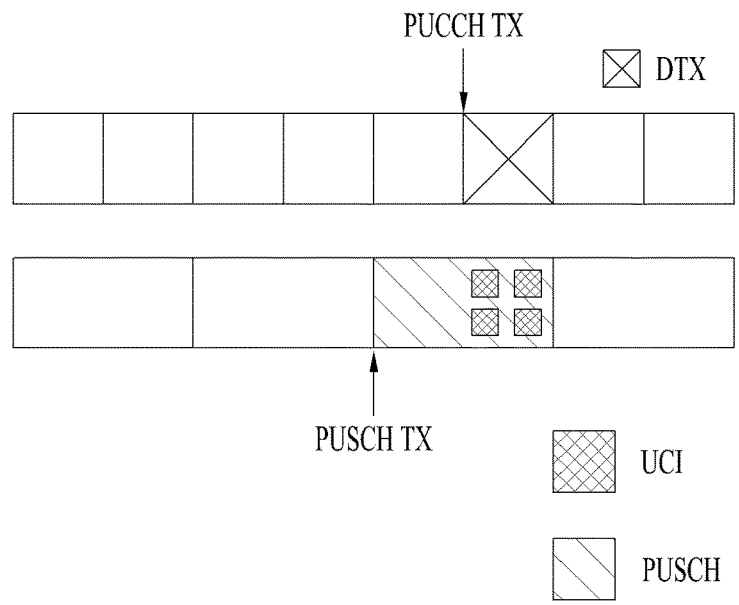

FIGS. 14 and 15 are diagrams illustrating a case where a PUCCH and a PUSCH overlap each other according to another embodiment of the present invention.

According to the embodiment, the numerology (SC=$X_0$) configured in the PUCCH transmission resource may be greater than the numerology (SC=$X_1$) configured in the PUSCH transmission resource (i.e., $X_0$>$X_1$), and the transmission interval of (long) PUCCH may overlap that of the PUSCH, as shown in FIGS. 14 and 15.

If the PUCCH transmission time is later than the PUSCH transmission time as shown in FIG. 14, the UE may have a shorter processing time for the UCI piggybacking operation of the UCI for the PUCCH from the PUSCH transmission start time than when the UCI is transmitted on the PUCCH.

If the PUCCH transmission time is indicated as a time at which the minimum processing time of the UE can be ensured, the UE may fail to perform UCI piggyback from the PUSCH transmission start time due to lack of processing time.

Therefore, the UE may perform UCI piggyback from the start time of PUCCH transmission as shown in FIG. 14. Alternatively, the UE may perform UCI piggyback only for a time interval corresponding to the PUCCH in the PUSCH, as shown in FIG. 15.

Alternatively, the UE may perform UCI piggyback for a time interval from the PUCCH transmission start time to the PUSCH transmission end time.

Figure 16:
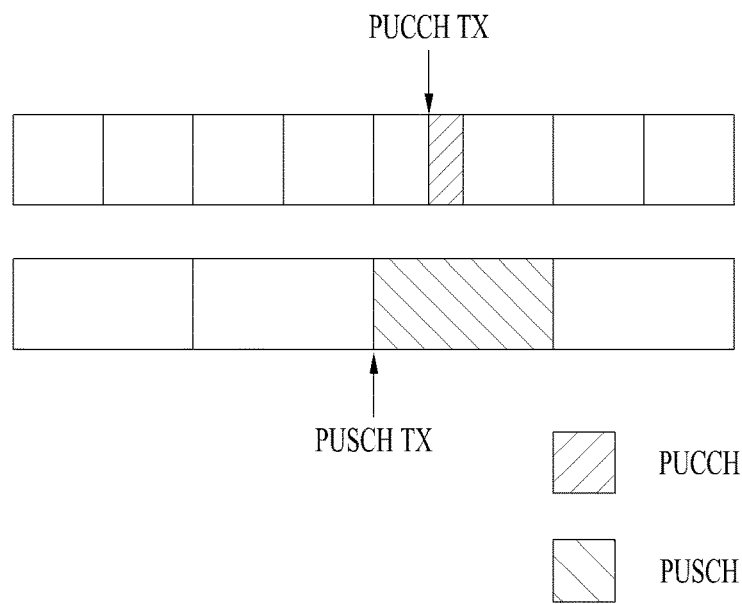
FIGS. 16 to 18 are diagrams illustrating a case where a PUCCH and a PUSCH overlap each other according to yet another embodiment of the present invention.
Figure 17:
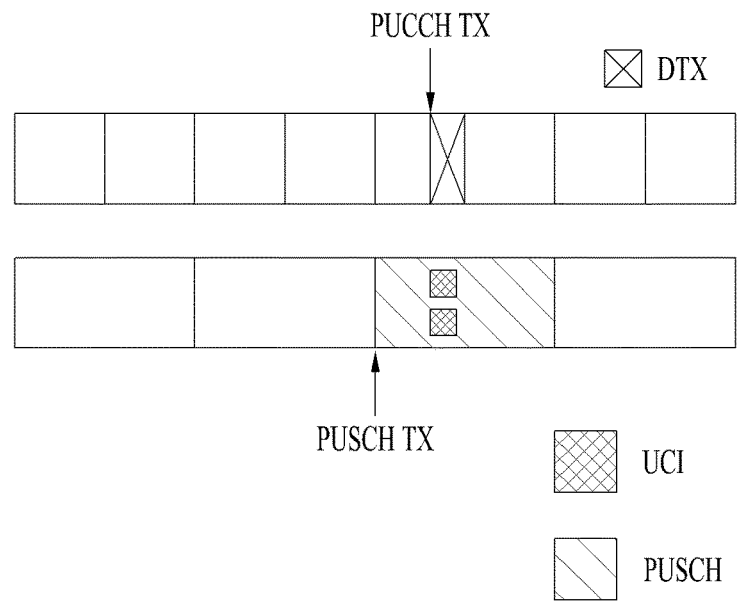
Figure 18:
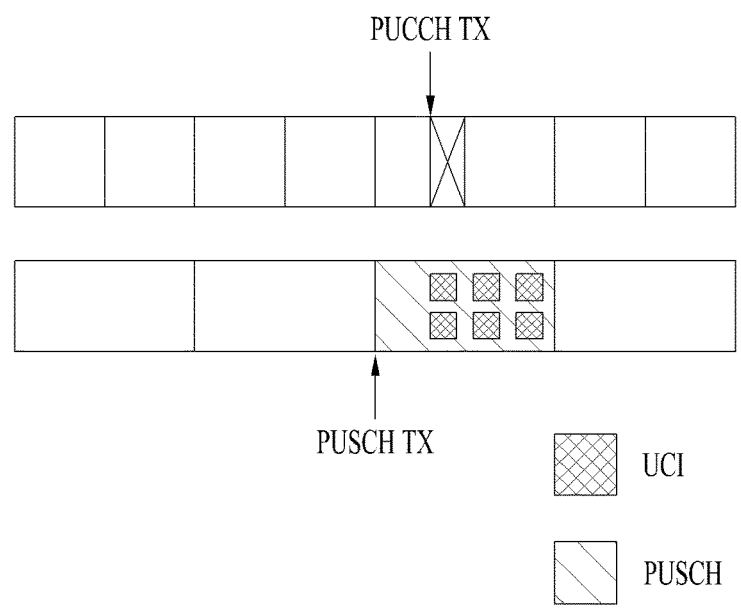

FIGS. 16 to 18 are diagrams illustrating a case where a PUCCH and a PUSCH overlap each other according to yet another embodiment of the present invention.

According to the embodiment, the numerology (SC=$X_0$) configured in the PUCCH transmission resource may be greater than the numerology (SC=$X_1$) configured in the PUSCH transmission resource (i.e., $X_0$>$X_1$), and the transmission interval of (short) PUCCH may overlap that of the PUSCH as shown in FIGS. 16 to 18.

In the case of FIG. 16, similarly to the case of FIG. 14, the UE may perform UCI piggyback after the PUCCH transmission start time. Alternatively, as shown in FIG. 17, the UE may perform UCI piggyback only for a time interval corresponding to the PUCCH within the PUSCH. Alternatively, as shown in FIG. 18, the UE may perform UCI piggyback for a time interval from the PUCCH transmission start time to the PUSCH transmission end time.

Figure 19:
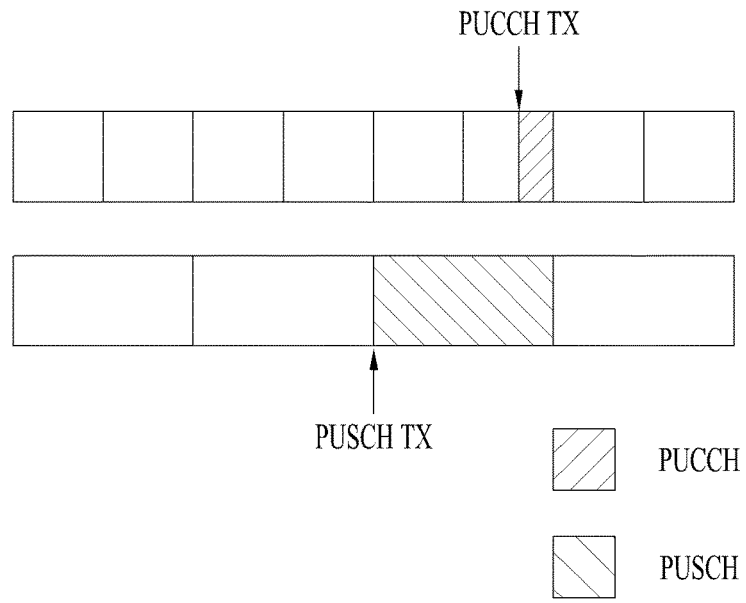
FIGS. 19 and 20 are diagrams illustrating a case where a PUCCH and a PUSCH overlap each other according to yet another embodiment of the present invention.
Figure 20:
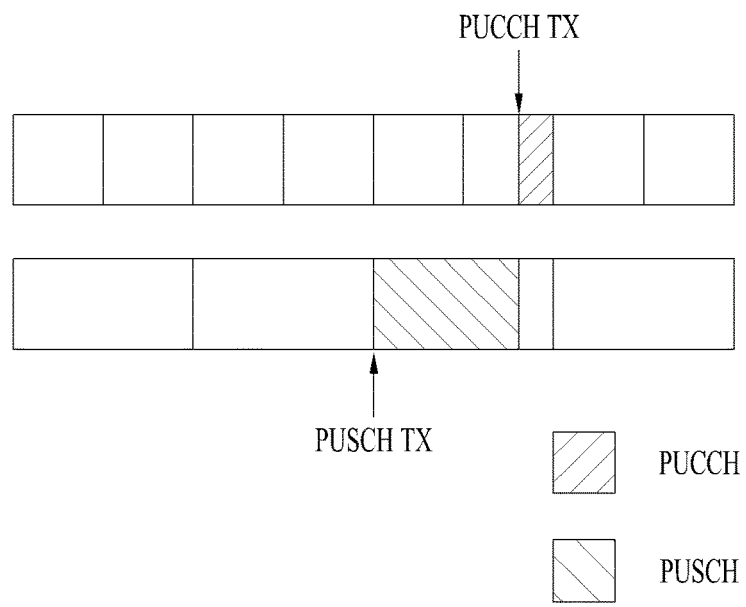

FIGS. 19 and 20 are diagrams illustrating a case where a PUCCH and a PUSCH overlap each other according to yet another embodiment of the present invention.

In addition, if the PUCCH transmission interval is shorter than or equal to a predetermined time length (e.g., X or fewer symbols, where X is a predetermined value), the UE may puncture the time interval corresponding to the PUCCH transmission interval within the PUSCH and transmit the PUSCH and PUCCH by performing time division multiplexing (TDM).

For example, suppose that the numerology (SC=$X_0$) configured in the PUCCH transmission resource is greater than the numerology (SC=$X_1$) configured in the PUSCH transmission resource (i.e., $X_0$>$X_1$), and the UE transmits HARQ-ACK on a short PUCCH.

In this case, as shown in FIG. 19, the transmission interval of the (short) PUCCH may overlap that of the PUSCH. In this case, the UE may perform UCI piggyback only for a time interval corresponding to the PUCCH within the PUSCH. Alternatively, as shown in FIG. 20, the UE may puncture the PUCCH transmission interval within the PUSCH, and transmit the PUSCH and the PUCCH by performing TDM.

The first UCI piggyback method described above may be applied in combination with other proposed methods of the present invention as long as they do not conflict with each other.

3.2. Second UCI Piggyback Method

In this section, it is assumed that there is a plurality of PUCCHs overlapping (a part of) the time interval of a specific PUSCH. In this case, the UE may transmit the UCI in the PUCCH through a PUSCH resource based on a UCI piggyback operation described below.

In addition, the numerology configured in the PUCCH transmission resource may be SC=$X_0$ and the numerology configured in the PUSCH transmission resource may be SC=$X_1$ (where $X_1 \neq X_0$). However, the UCI piggyback operation of the UE described in this section is not necessarily limited to the aforementioned condition.

(1) Option 1: Only PUCCH transmission may be performed without transmitting the PUSCH;

(2) Option 2: the operation of the first UCI piggyback method may be performed for each PUCCH and the PUSCH;

When a plurality of UCIs corresponding to the plurality of PUCCHs is piggybacked on one PUSCH using the second UCI piggyback method described above, the plurality of UCIs may be separately coded for each PUCCH, and then piggybacked and transmitted on the same PUSCH. Thereby, when UCI piggyback of a plurality of PUCCHs is performed on one PUSCH and the DCIs indicating the plurality of PUCCHs are different from each other, the BS may expect a UCI payload size and configuration indicated for each PUCCH, regardless of whether the DCI of the UE is missing or not.

Further, when a plurality of UCIs corresponding to a plurality of PUCCHs is piggybacked on one PUSCH using the second UCI piggyback method, the location of reserved RE(s) for piggyback in the PUSCH may be configured differently for each PUCCH (each slot (or TTI) index in which the corresponding PUCCH is transmitted).

In addition, the location of the reserved RE(s) for each PUCCH in the PUSCH may be configured differently according to the transmission duration of the PUSCH (the number of symbols allocated to the PUSCH). In this case, the reserved RE(s) for different PUCCHs may be distinguished from each other in terms of time and frequency. Only RE(s) corresponding to PUCCHs having UCI to be transmitted among the reserved RE(s) may be used for actual UCI piggyback, and the other reserved RE(s) may not be used for UCI piggyback.

Figure 21:
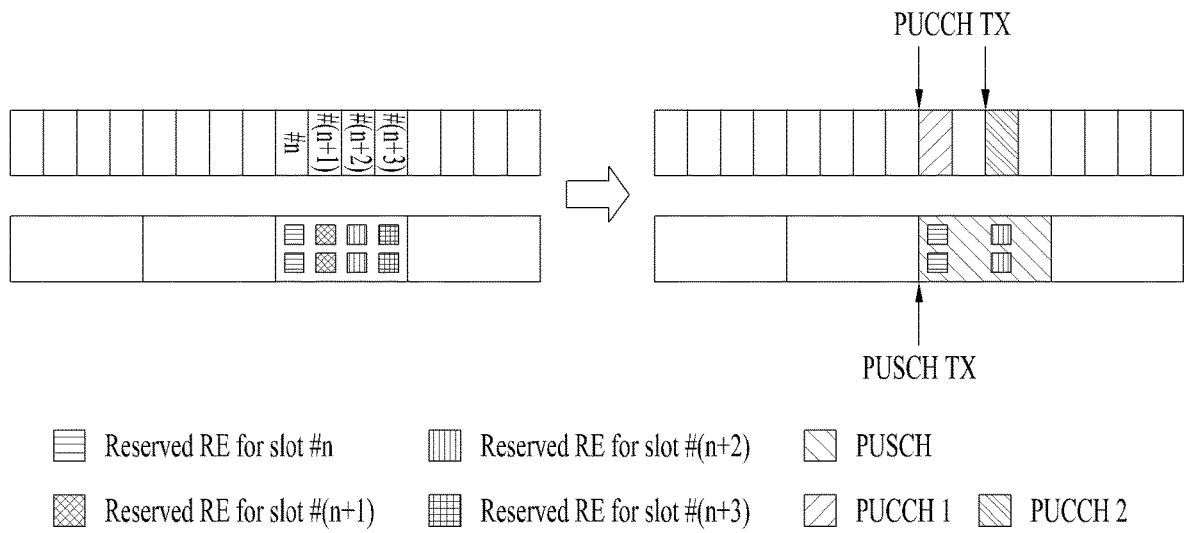
FIG. 21 is a diagram schematically illustrating a case where one PUSCH slot overlaps four PUCCH slots according to the present invention.

FIG. 21 is a diagram schematically illustrating a case where one PUSCH slot overlaps four PUCCH slots according to the present invention.

As a specific example, when four PUCCH slots overlap one PUSCH slot as shown in FIG. 21, four reserved RE(s) for UCI piggyback may be defined according to the slot indexes through which the PUCCHs are to be transmitted, and the UE may perform UCI piggyback using the reserved RE(s) corresponding to the slots in which PUCCHs are actually transmitted.

As shown in FIG. 21, when PUCCHs are transmitted in slots # n and #(n+2), the UE may perform UCI piggyback in the reserved REs corresponding to PUCCH slots # n and # (n+2) in the PUSCH. In this case, RE(s) reserved for PUCCH slots #(n+1) and #(n+3) may be used for UL data (e.g., PUSCH) mapping/transmission.

Herein, the plurality of PUCCHs may include a short PUCCH and a long PUCCH.

The NR system to which the present invention is applicable may support the following four cases for the PUCCH (cell) and the PUSCH (cell). In the following description, the numerology (or SC) and the transmission time interval (TTI) configured for the PUCCH transmission resource (or cell or carrier) are denoted by $SC_0$ and $TTI_0$, and the numerology (or SC) and the TTI configured for PUSCH transmission resource (or cell or carrier) are denoted by $SC_1$ and $TTI_1$, respectively.

Case 1: $SC_0=SC_1$, $TTI_0=TTI_1$
Case 2: $SC_0 \neq SC_1$, $TTI_0=TTI_1$
Case 3: $SC_0=SC_1$, $TTI_0 \neq TTI_1$
Case 4: $SC_0 \neq SC_1$, $TTI_0 \neq TTI_1$ The second UCI piggyback method described above may be applied to all four cases. In other words, the second UCI piggyback method described above may be applied regardless of the SC and TTI relationship between the PUCCH cell and the PUSCH cell when the PUCCH resource overlaps the PUSCH resource in the time domain or the PUCCH transmission TTI (or slot) overlaps the PUSCH transmission TTI (or slot) in the time domain.

Figure 22:
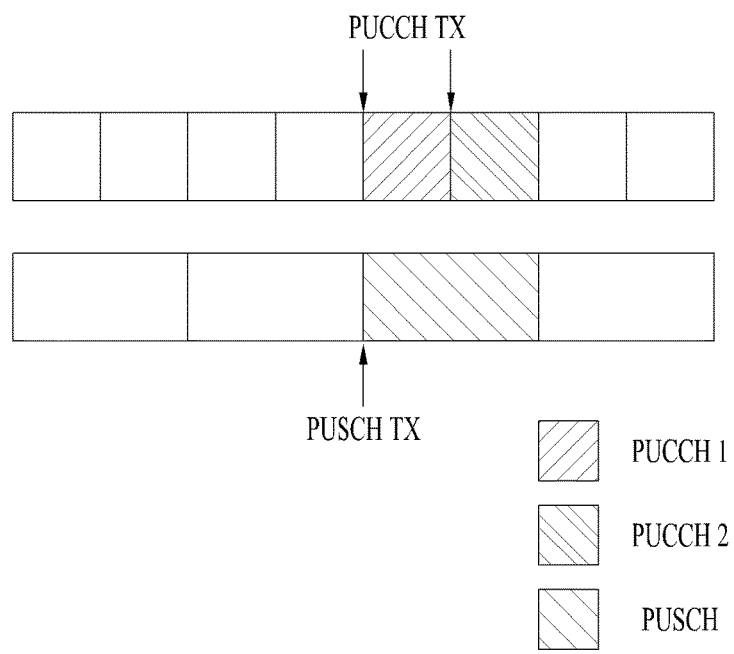
FIGS. 22 and 23 are diagrams illustrating a case where a plurality of PUCCHs overlaps a PUSCH according to an embodiment of the present invention.
Figure 23:
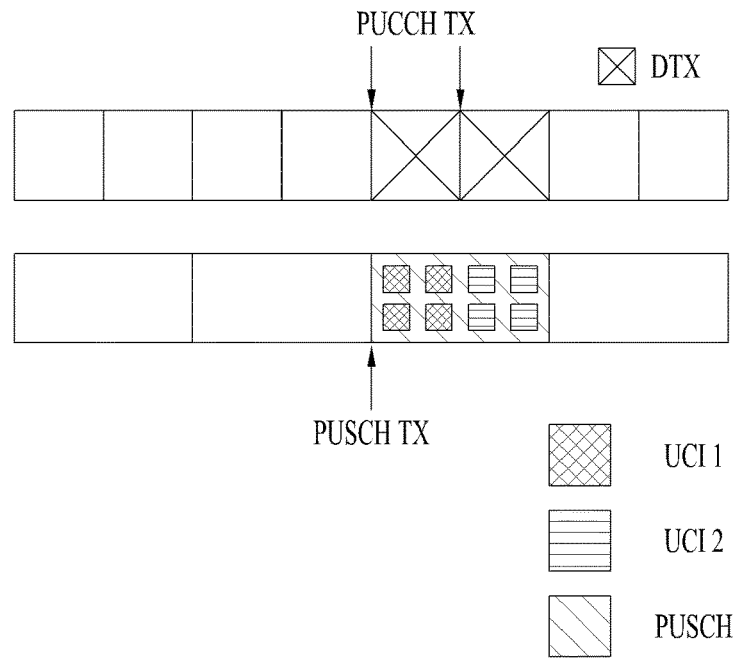

FIGS. 22 and 23 are diagrams illustrating a case where a plurality of PUCCHs overlaps a PUSCH according to an embodiment of the present invention.

According to the embodiment, the numerology ($SC=X_0$) configured in the PUCCH transmission resource may be greater than the numerology ($SC=X_1$) configured in the PUSCH transmission resource (i.e., $X_0>X_1$), and the transmission intervals of two or more long PUCCHs may overlap the transmission interval of a specific (single) PUSCH as shown in FIGS. 22 and 23.

In this case, the UE may transmit only the PUCCHs without performing PUSCH transmission (e.g., by dropping the PUSCH), or may implement various UCI piggyback methods proposed in the present invention (e.g., the first UCI piggyback method) for each PUCCH and the PUSCH. For example, as illustrated in FIG. 23, the UE may perform UCI piggyback of UCI for each PUCCH in time intervals corresponding to PUCCH transmission intervals for each PUCCH within the PUSCH.

Figure 24:
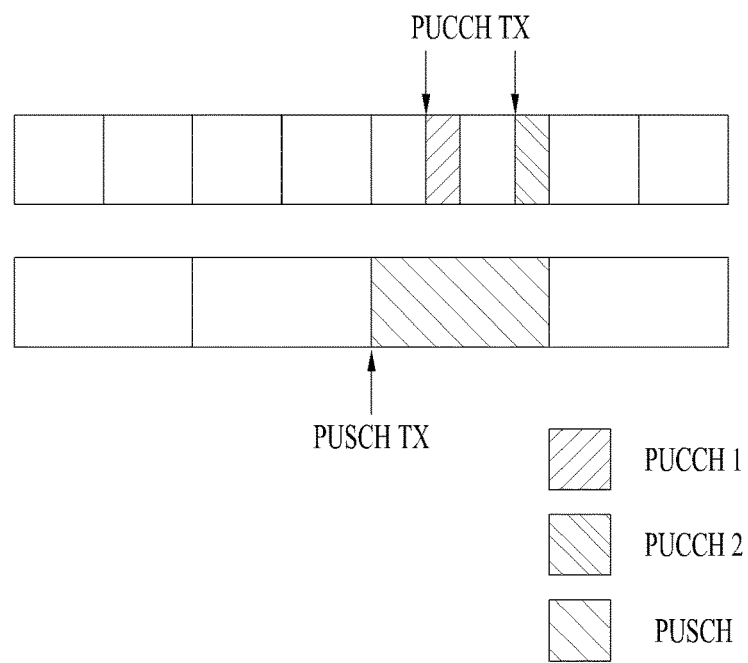
FIGS. 24 and 25 are diagrams illustrating a case where a plurality of PUCCHs overlaps a PUSCH according to another embodiment of the present invention.
Figure 25:
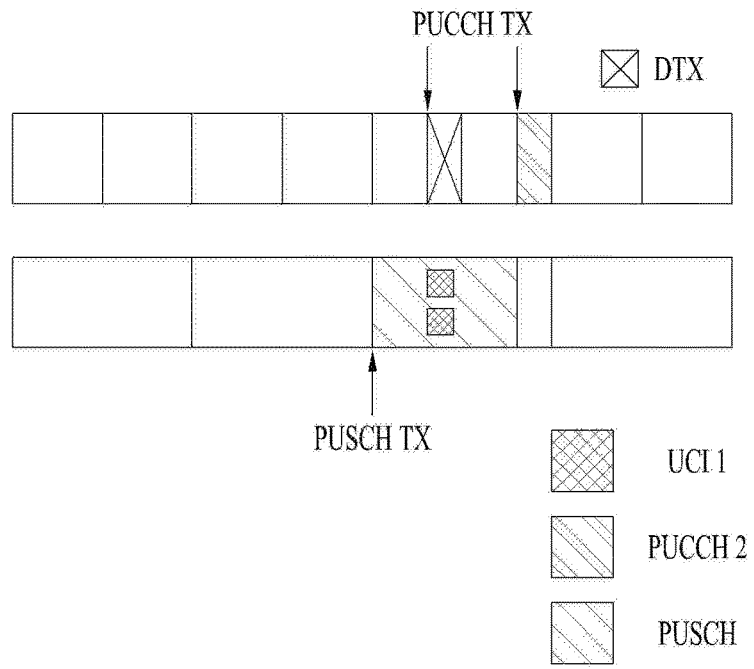

FIGS. 24 and 25 are diagrams illustrating a case where a plurality of PUCCHs overlaps a PUSCH according to another embodiment of the present invention.

According to the embodiment, the numerology ($SC=X_0$) configured in the PUCCH transmission resource may be less than the numerology ($SC=X_1$) configured in the PUSCH transmission resource (i.e., $X_0<X_1$), and the transmission intervals of two or more short PUCCHs may overlap the transmission interval of a specific (single) PUSCH as shown in FIGS. 24 and 25.

Even in this case, the UE may transmit only the PUCCHs without performing PUSCH transmission (e.g., by dropping the PUSCH), or may implement various UCI piggyback methods (e.g., the first UCI piggyback method) proposed in the present invention for each PUCCH and the PUSCH. For example, as illustrated in FIG. 25, the UE may perform UCI piggyback of PUCCH 1 UCI in a time interval corresponding to the PUCCH transmission interval in the PUSCH as a PUCCH 1 transmission method, and may puncture a PUSCH region and transmit PUCCH 2 in a TDM scheme as a PUCCH 2 transmission method.

The second UCI piggyback method described above may be applied in combination with other proposed methods of the present invention as long as they do not conflict with each other.

3.3. Third UCI Piggyback Method

In this section, it is assumed that there is a plurality of PUCCHs overlapping (a part of) the time interval of a specific PUSCH. In this case, the UE may transmit the UCI in the PUCCH through a PUSCH resource based on a UCI piggyback operation described below.

In addition, the numerology configured in the PUCCH transmission resource may be $SC=X_0$ and the numerology configured in the PUSCH transmission resource may be $SC=X_1$ (where $X_1 \neq X_0$). However, the UCI piggyback operation of the UE described in this section is not necessarily limited to the aforementioned condition.

The UE may perform the UCI piggyback operation for the PUCCH and the earliest (or latest) PUSCH among the plurality of PUSCHs using various UCI piggyback methods (e.g., the first UCI piggyback method) proposed by the present invention.

The NR system to which the present invention is applicable may support the following four cases for the PUCCH (cell) and the PUSCH (cell). In the following description, the numerology (or SC) and the transmission time interval (TTI) configured for the PUCCH transmission resource (or cell or carrier) are denoted by $SC_0$ and $TTI_0$, and the numerology (or SC) and the TTI configured for PUSCH transmission resource (or cell or carrier) are denoted by $SC_1$ and $TTI_1$, respectively.

Case 1: $SC_0=SC_1$, $TTI_0=TTI_1$
Case 2: $SC_0 \neq SC_1$, $TTI_0=TTI_1$
Case 3: $SC_0=SC_1$, $TTI_0 \neq TTI_1$
Case 4: $SC_0 \neq SC_1$, $TTI_0 \neq TTI_1$ The third UCI piggyback method described above may be applied to all the four cases. In other words, the third UCI piggyback method may be applied regardless of the SC and TTI relationship between the PUCCH cell and the PUSCH cell when the PUCCH resource overlaps the PUSCH resource in the time domain or the PUCCH transmission TTI (or slot) overlaps the PUSCH transmission TTI (or slot) in the time domain.

Figure 26:
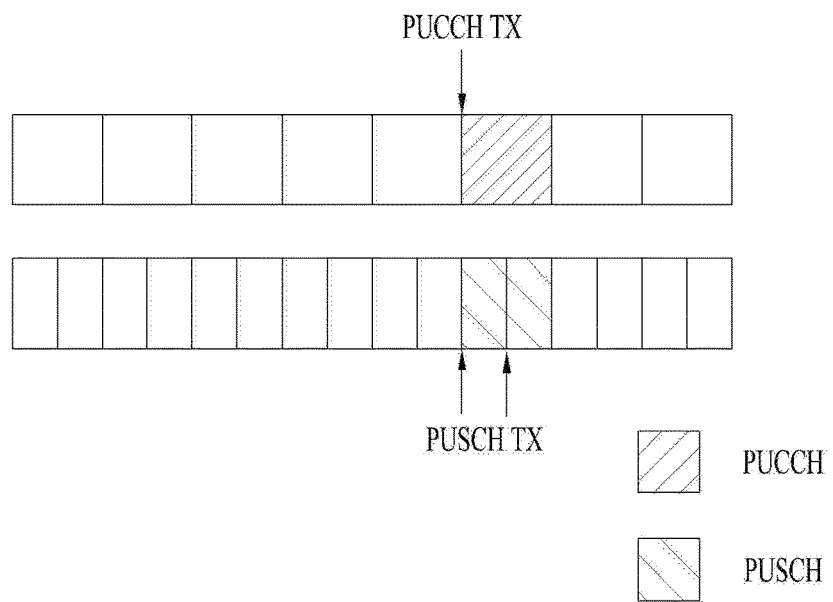
FIGS. 26 to 28 are diagrams illustrating a case where one PUCCH overlaps a plurality of PUSCHs according to an embodiment of the present invention.
Figure 27:
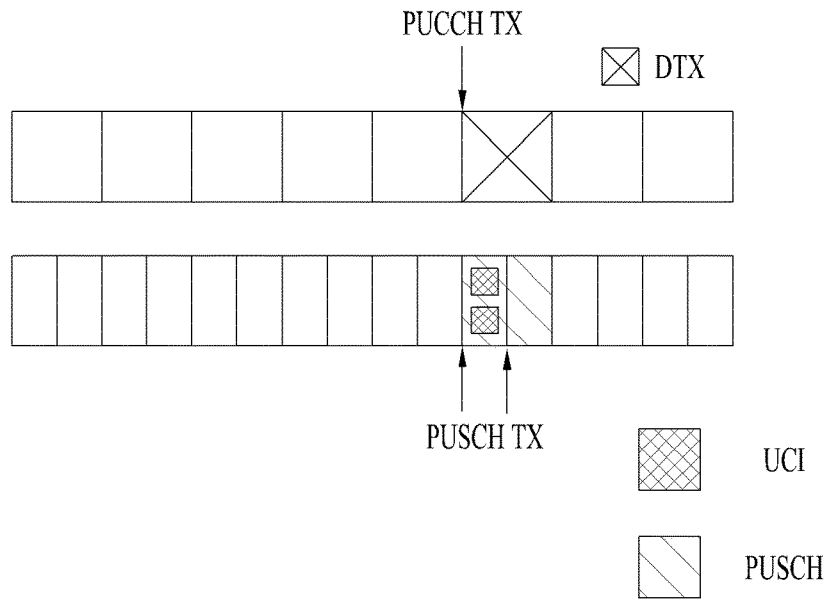
Figure 28:
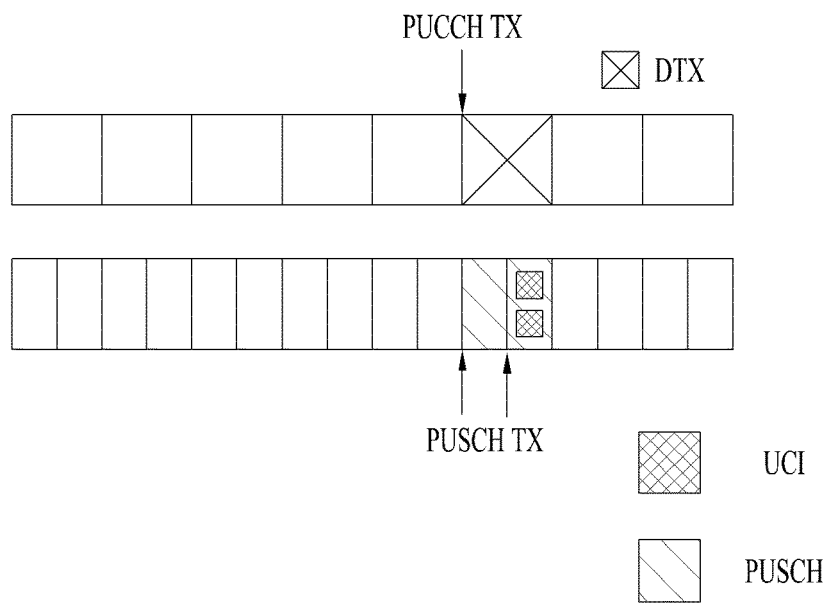

FIGS. 26 to 28 are diagrams illustrating a case where one PUCCH overlaps a plurality of PUSCHs according to an embodiment of the present invention.

According to the embodiment, the numerology ($SC=X_0$) configured in the PUCCH transmission resource may be less than the numerology ($SC=X_1$) configured in the PUSCH transmission resource (i.e., $X_0<X_1$), and the transmission interval of a single long PUCCH for transmitting HARQ-ACK may overlap the transmission intervals of two or more PUSCHs as shown in FIGS. 26 to 28. In this case, the UE may piggyback and transmit the UCI in the PUCCH on one of a plurality of PUSCHs whose transmission intervals overlap the transmission interval of the PUCCH. For example, the UE may perform UCI piggyback on the earliest PUSCH among the plurality of PUSCHs as shown in FIG. 27 or perform UCI piggyback on the latest PUSCH among the plurality of PUSCHs as shown in FIG. 28.

The third UCI piggyback method described above may be applied in combination with other proposed methods of the present invention as long as they do not conflict with each other.

3.4. Fourth UCI Piggyback Method

When the UE piggybacks the UCI for the PUCCH on the PUSCH, the UE may UCI piggyback by applying rate matching or puncturing on the PUSCH region according to the relationship between the slot length (or TTI) for the PUCCH and the slot length (or TTI) for the PUSCH as follows.

(1) If Slot length (or TTI) for PUCCH≥slot length (or TTI) for PUSCH,
  the UE may perform UCI mapping after rate matching applied to the PUSCH region, or may perform UCI mapping according to rate-matching or puncturing that is configured (by the BS or the network).

(2) If Slot length (or TTI) for PUCCH<Slot length (or TTI) for PUSCH,
  the UE may perform UCI mapping after applying puncturing to the PUSCH region Here, the UCI may be HARQ-ACK and/or CSI.

As a specific example, it is assumed that the SC applied to the PUCCH transmission resource (or carrier) is 15 kHz, while the SC applied to the PUSCH transmission resource (or carrier) is 30 kHz. In this case, the slot for PUCCH transmission is shorter than the slot for PUSCH transmission. In this case, the PUCCH transmission timing and the PUSCH transmission timing from the DCI for scheduling the PUCCH/PUSCH may be expressed by the number of slots. Thus, if there are a PUCCH and a PUSCH whose resources overlap each other at the same time point in the time domain, the time at which the UL grant for the PUSCH is indicated may be much earlier than the time at which DL assignment for the PUCCH is indicated.

Therefore, in preparing the PUSCH transmission by the UE, it may be difficult for the UE to reflect the UCI to be transmitted on the PUCCH in the data encoding process within the PUSCH in advance. Therefore, in order to reduce UE implementation complexity, in UCI-piggybacking the PUCCH on the PUSCH, the UE may perform UCI mapping after the puncturing operation rather than the rate-matching operation (for PUSCH resource).

On the other hand, if the slot for PUCCH transmission is longer than the slot for PUSCH transmission, there may be a PUCCH and a PUSCH whose resources overlap each other at the same time point in the time domain. In this case, the time at which the UL grant for the PUSCH is indicated may be much later than the time at which the DL assignment for the PUCCH is indicated. Therefore, in this case, in UCI-piggybacking the PUCCH on the PUSCH, the UE may perform UCI mapping after the rate-matching operation (for PUSCH resource).

The fourth UCI piggyback method described above may be applied in combination with other proposed methods of the present invention as long as they do not conflict with each other.

3.5. Fifth UCI Piggyback Method

When the UE piggybacks the UCI for the PUCCH on the PUSCH, the UE may perform PUSCH selection from among a plurality of PUSCHs whose transmission intervals overlap the transmission interval of the PUCCH as follows.

(1) Sub-rule(s) for priorities may be defined as follows.

(A) Sub-rule #1: Priorities may be defined in terms of subcarrier spacing (SCS)/TTI length as follows.

(A-1) A PUSCH having the same SCS/TTI length as the PUCCH>a PUSCH having a larger SCS or a smaller TTI length than the PUCCH (where a PUSCH having a smaller difference in SCS/TTI length from the PUCCH shall have a higher priority)>a PUSCH having a smaller SCS or a larger TTI length than the PUCCH (where a PUSCH having a smaller difference in SCS/TTI length from the PUCCH shall have a higher priority);

(A-2) a PUSCH having the same SCS/TTI length as the PUCCH>a PUSCH having a smaller SCS or a larger TTI length than the PUCCH (where a PUSCH having a smaller difference in SCS/TTI length from the PUCCH shall have a higher priority)>a PUSCH having a larger SCS or a smaller TTI length than the PUCCH (where a PUSCH having a smaller difference in SCS/TTI length from the PUCCH shall have a higher priority);

(A-3) a PUSCH having a larger SCS or a smaller TTI length shall have a higher priority; or (A-4) a PUSCH having a smaller SCS or a larger TTI length shall have a higher priority.

(B) Sub-rule #2: Priorities may be defined in terms of transmission start time as follows.

(B-1) A PUSCH having the same transmission start time same as the PUCCH>a PUSCH having a transmission start time later than that of the PUCCH (where a PUSCH having a smaller difference in transmission start time from the PUCCH shall have a higher priority)>a PUSCH having a transmission start time earlier than that of the PUCCH (where a PUSCH having a smaller difference in transmission start time from the PUCCH shall have a higher priority); or (B-2) a PUSCH having a later transmission start time shall have a higher priority (C) Sub-rule #3: Priorities may be defined in terms of DMRS density as follows.

A PUSCH having a higher DM-RS density>a PUSCH having a lower DM-RS density.

(D) Sub-rule #4: Priorities may be defined in terms of waveform as follows.

DFT-s-OFDM>CP-OFDM (E) Sub-rule #5: Priorities may be defined in terms of CC index (at which the PUSCH is transmitted) as follows.

Low CC index>High CC index (F) Sub-rule #6: Priorities may be defined in terms of transmission schemes as follows.

A MIMO PUSCH>a non-MIMO PUSCH (G) Sub-rule #7: Priorities may be defined according to presence or absence of aperiodic CSI report as follows.

A PUSCH with an aperiodic CSI report>a PUSCH without an aperiodic CSI report (H) Sub-rule #8: Priorities may be defined in terms of transmission duration (the number of symbols) as follows.

A PUSCH having a large transmission duration (number of symbols)>a PUSCH having a small transmission duration (number of symbols)

(I) Sub-rule #9: Priorities may be defined according to whether or not a UL grant is involved as follows.

A PUSCH scheduled from the UL grant>a PUSCH transmitted based on the SPS scheme without a corresponding UL grant.

(2) Final rule about priorities

A PUSCH having the highest priority shall be selected by sequentially applying a plurality of specific sub-rules(s) among the sub-rule(s) described above.

For one example, the UE selects PUSCH(s) having the highest priority from the perspective of Sub-rule # X (for the entire PUSCH(s)).

Then, if one PUSCH is selected, the UE piggybacks the UCI on the corresponding PUSCH and transmits the same.

Alternatively, if a plurality of PUSCHs is selected, the UE may apply Sub-rule # Y only to the corresponding PUSCHs as in the following step.

The UE selects PUSCH(s) having the highest priority from the perspective of Sub-rule # Y (for the selected PUSCH(s)).

If one PUSCH is selected, the UE piggybacks the UCI on the PUSCH and transmits the same.

If a plurality of PUSCHs is selected, the UE may apply Sub-rule # Z only to the corresponding PUSCHs as in the following step.

Specifically, the UE may apply Sub-rule # Z by repeating the method of selecting PUSCH(s) having the highest priority from the perspective of Sub-rule # Z (for the selected PUSCH(s)).

More specifically, it is assumed that a plurality of PUSCH (s) having a transmission interval overlapping that of a PUCCH is transmitted on a plurality of carriers at the time when the UE transmits the PUCCH in a carrier aggregation (CA) environment. In this case, if the UE desires to piggyback the UCI of the PUCCH on a specific PUSCH, a rule used for the UE to select the UCI piggyback target PUSCH should be defined.

At this time, the NR system to which the present invention is applicable may support different settings of SCS, TTI length, DM-RS density, waveform, etc. for each carrier (or each PUSCH) based on the flexible transmission structure.

Therefore, according to the present invention, a priority sub-rule may be determined in terms of each element, and finally, the UE may perform UCI piggyback by selecting one PUSCH by sequentially applying the plurality of sub-rules.

Figure 29:
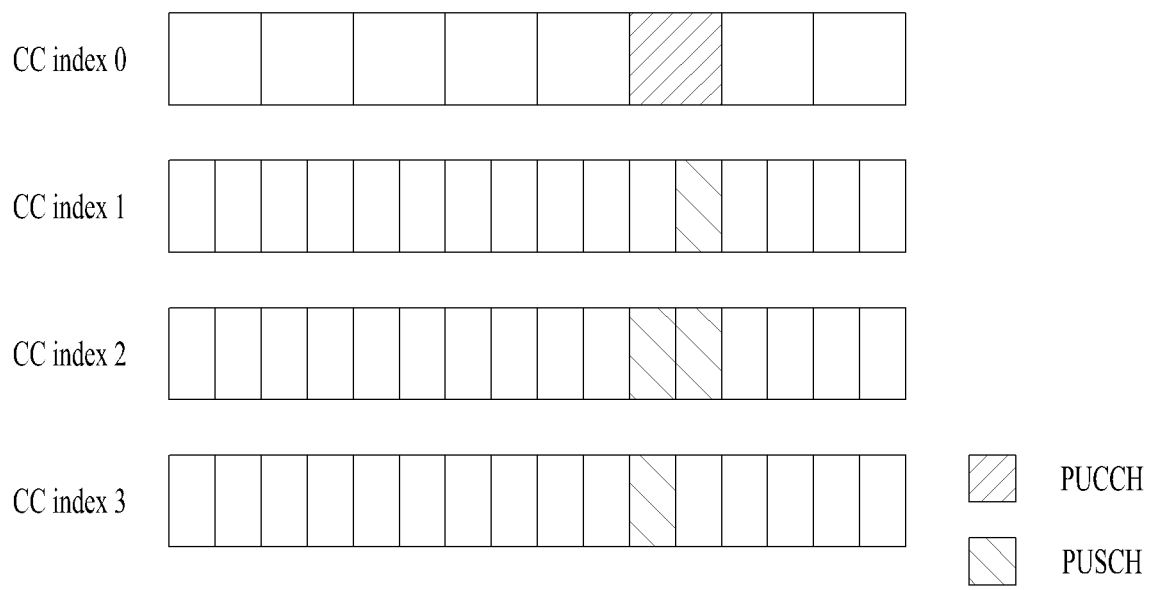
FIG. 29 is a diagram schematically illustrating a PUSCH selection method according to an embodiment of the present invention.

FIG. 29 is a diagram schematically illustrating a PUSCH selection method according to an embodiment of the present invention.

As shown in FIG. 29, according to an embodiment applicable to the present invention, the UE may select PUSCH(s) having the highest priority from among all PUSCHs from the perspective of SCS/TTI length (e.g., Sub-rule #1). Then, if there is a plurality of selected PUSCHs, the UE may select PUSCH(s) having the highest priority from the perspective of transmission start time (e.g., Sub-rule #2). Then, if there is still a plurality of selected PUSCH(s), the UE may select a PUSCH having the highest priority from the perspective of the CC index (e.g., Sub-rule #5). In this case, the UE may select the first PUSCH in CC index #2 of FIG. 29 as a UCI piggyback target.

Additionally, when the UE piggybacks the UCI for the PUCCH on the PUSCH, the priorities of a plurality of PUCCHs whose transmission intervals overlap the transmission interval of the PUCCH may be configured (from the perspective of UCI piggyback) follows.

1) As the UL grant to PUSCH timing becomes shorter, the priority becomes higher.

2) Payload size of a UCI piggyback target UCI is proportional to priority.

The priority rules may be regarded as a sub-rule for determining a final PUSCH selection rule in the fifth UCI piggyback method described above.

Additionally, all TTI (or slot or SCS) combinations for PUCCH and PUSCH may be configurable for a UE that supports simultaneous PUCCH/PUSCH transmission. In this case, if PUCCH TTI (or slot)<PUSCH TTI (or slot) (or PUCCH SCS>PUSCH SCS), simultaneous PUCCH/PUSCH transmission may be set to "ON" for the UE supporting simultaneous PUCCH/PUSCH transmission. For a UE that does not support simultaneous PUCCH/PUSCH transmission, only a case where PUCCH TTI (or slot) >=PUSCH TTI (or slot) (or PUCCH SCS<=PUSCH SCS) may be configured.

Alternatively, a rule may be defined such that a UE supporting a combination of PUCCH TTI (or slot)>PUSCH TTI (or slot) (or PUCCH SCS<PUSCH SCS) is basically configured to support simultaneous PUCCH/PUSCH transmission (for example, the capability of simultaneous PUCCH/PUSCH transmission may be a prerequisite).

In addition, the UCI piggyback target may be confined to a PUCCH component carrier (CC) (i.e., a CC for transmitting the PUCCH) or to CC(s) having the same subcarrier spacing (SCC)/TTI as the PUCCH CC.

The fifth UCI piggyback method described above may be applied in combination with other proposed methods of the present invention as long as they do not conflict with each other.

3.6. Sixth UCI Piggyback Method

When the UE piggybacks the UCI for the PUCCH on the PUSCH, a TTI applied to the PUCCH (hereinafter, PUCCH TTI) and a TTI applied to the PUSCH (PUSCH TTI) may have a relationship of PUCCH TTI<PUSCH TTI. In this case, the UE may perform UCI piggyback for a plurality of PUCCHs on a single PUSCH as follows.

For example, when there is a plurality of PUCCH TTIs overlapping a specific (single) PUSCH TTI, the UE may transmit the UCI of the PUCCHs transmitted in the plurality of PUCCH TTIs by piggybacking the UCI on the PUSCH transmitted in the specific (single) PUSCH TTI.

At this time, the BS may indicate, through a UL grant, one or more of the following kinds of information about the plurality of PUCCH TTIs subject to UCI piggyback on the (corresponding) PUSCH to the UE.

(1) Whether PUCCH piggyback is to be performed for each PUCCH TTI:

For example, the BS may indicate whether or not UCI piggyback is to be performed for N PUCCH TTIs through an N-bit bitmap in the UL grant.

(2) Whether (PUSCH data) rate matching for UCI transmission is to be performed for each PUCCH TTI:

For example, in generating PUSCH data, the UE may perform PUSCH data rate-matching considering only coded UCI bits corresponding to the PUCCH TTIs for which the BS has indicated rate-matching through the UL grant.

For example, the UCI may be HARQ-ACK information.

Additionally, using an extension version of the above-described method, the UE may perform UCI piggyback of a plurality of PUCCHs (e.g., a long PUCCH and a short PUCCH) in a single slot on a single PUSCH even in the case of PUCCH TTI=PUSCH TTI.

Figure 30:
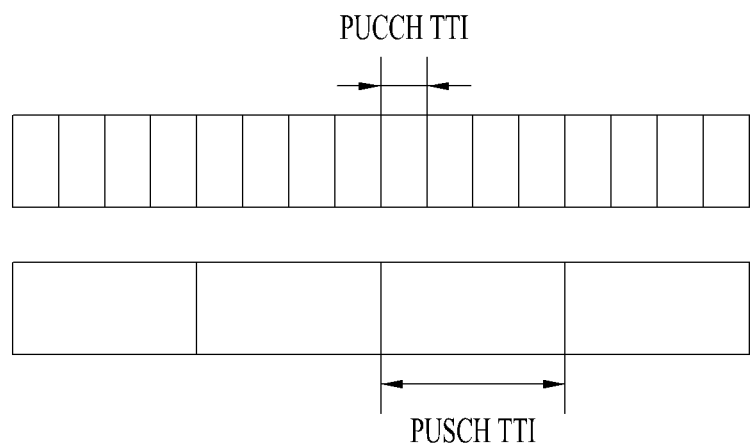
FIG. 30 is a diagram illustrating a case where PUSCH TTI and PUCCH TTI are different from each other according to the present invention.

FIG. 30 is a diagram illustrating a case where PUSCH TTI and PUCCH TTI are different from each other according to the present invention.

As shown in FIG. 30, when the PUSCH TTI is four times the PUCCH TTI, the resource ratio of PUCCH to PUSCH is four to one in the same time interval. In consideration of this resource ratio between the PUCCH and the PUSCH, the number of PUCCH TTIs that may be UCI-piggybacked on a single PUSCH may be set to 4. Otherwise, the PUSCH resource for performing UCI piggyback may be insufficient from the perspective of PUCCH.

In the case where the UE performs UCI piggyback for a plurality of PUCCH TTIs on a single PUSCH and applies rate-matching (for PUSCH data) for UCI piggyback transmission as described above, the BS may indicate, through UL grant to the UE, presence or absence of UCI for each of the plurality of PUCCH TTIs which may be subjected to UCI piggyback in the PUSCH or whether or not (PUSCH data) rate-matching for UCI transmission per PUCCH TTI is to be performed for the plurality of PUCCH TTIs for which there is a UCI for each of a plurality of PUCCH TTIs. Then, when the PUSCH data is generated, the UE may perform PUSCH data rate-matching, considering only the coded UCI bits corresponding to the PUCCH TTIs for which the BS has indicated rate-matching through the UL grant. For example, when PUCCH TTI<PUSCH TTI and UCI piggyback for a plurality of PUCCHs is performed on a single PUSCH, the UE may perform (PUSCH data) rate-matching for HARQ-ACK (in UCI piggyback). In this case, the BS may indicate, through a UL grant, whether or not rate matching is to be performed for each of a plurality of PUCCH TTIs.

The sixth UCI piggyback method described above may be applied in combination with other proposed methods of the present invention as long as they do not conflict with each other.

3.7. Seventh UCI Piggyback Method

When the UE piggybacks the UCI for the PUCCH on the PUSCH, and a TTI applied to the PUCCH (hereinafter, PUCCH TTI) and a TTI applied to the PUSCH (PUSCH TTI) have a relationship of PUCCH TTI>PUSCH TTI, the UE may perform UCI piggyback as follows.

UCI piggyback of UCI of a specific PUCCH may be performed through all PUSCHs scheduled in a plurality of PUSCH TTIs overlapping the PUCCH TTI (in which transmission of the corresponding PUCCH is expected).

Here, UCI piggyback on the plurality of PUSCHs may refer to a method of performing UCI piggyback by repeating the same UCI for a plurality of PUSCHs or by distributing the UCI to a plurality of PUSCHs.

If the UE detects a UL grant for scheduling a PUSCH during PUCCH encoding or transmission, the UE may operate as follows.

(1) If the scheduling PUSCH does not overlap the PUCCH in the time domain, the UE may transmit the PUSCH and the PUCCH using a TDM scheme;

(2) If the scheduling PUSCH overlaps the PUCCH in the time domain, PUSCH transmission may be dropped.

Alternatively, the UE may not expect/assume scheduling for a PUSCH that overlaps the PUCCH in the time domain, during PUCCH encoding or transmission.

As a specific example, as shown in FIG. 26, when a specific (single) PUCCH overlaps a plurality of PUSCHs in the time domain, the UE may piggyback the UCI for the PUCCH on the earliest or latest PUSCH among the plurality of PUSCHs as in the third UCI piggyback method described above, or may perform UCI piggyback on all of the plurality of PUSCHs using another method.

That is, the UE may piggyback the UCI of a specific PUCCH on all multiple PUSCHs actually scheduled in multiple PUSCH TTIs overlapping the PUCCH TTI (for which transmission of the PUCCH is expected). At this time, the UE may perform UCI piggyback by repeating the same UCI on the plurality of PUSCHs or may perform UCI piggyback of some coded bits of UCI on each PUSCH (in the plurality of PUSCHs) such that the UCI is distributed to the plurality of PUSCHs. If the UE has already transmitted the PUCCH or has started encoding thereof, the UE may ignore or not expect scheduling for the PUSCH(s) overlapping the PUCCH in the time domain.

The seventh UCI piggyback method described above may be applied in combination with other proposed methods of the present invention as long as they do not conflict with each other.

3.8. Eighth UCI Piggyback Method

When a PUCCH resource on which the UE is instructed to transmit HARQ-ACK (or CSI) in response to a specific DL assignment (=DL scheduling DCI) (or PDSCH) partially or fully overlaps a PUSCH resource that is scheduled by UL grant (=UL scheduling DCI) in the time domain, the UE may perform UL transmission according to the temporal order of reception of the DL assignment (or PDSCH) and the UL grant as follows.

(1) If the DL assignment (or PDSCH) is earlier than the UL grant or the DL assignment (or PDSCH) and the UL grant are received at the same time (or slot), the UE may omit PUCCH transmission and transmit the UCI supposed to be transmitted on the PUCCH by piggybacking the UCI on the PUSCH.

However, in the following cases, the UE may omit UCI transmission and transmit only data:

the payload size of the data to be transmitted on the PUSCH is less than the payload size of the UCI;

there are no (available) data transmission resource elements (REs) in the PUSCH calculated on the assumption of UCI piggyback or the number thereof is less than or equal to a certain value.

(2) If the DL assignment (or PDSCH) is later than the UL grant, the UE may omit PUSCH transmission and perform PUCCH transmission.

Here, the UCI piggyback may refer to an operation of transmitting UCI by utilizing some REs in the PUSCH.

The downlink control information (DCI) may refer to control information that is dynamically indicated to the UE by the BS.

More specifically, if the UE receives a DL assignment (or PDSCH) prior to the UL grant, this may mean that the BS has scheduled PUCCH transmission through the UL grant even though it knows that the resource for the PUSCH to be transmitted by the UE will collide with the resource of the PUCCH (that has been scheduled first). In this case, the preference for PUSCH transmission may be higher than for PUCCH transmission.

Accordingly, in this case, the UE may omit PUCCH transmission and perform PUSCH transmission by piggybacking, on the PUSCH, the UCI originally intended to be transmitted on the PUCCH. However, if the UE desires to piggyback the UCI on the PUSCH but the payload of the UCI is larger than the payload of data (e.g., UL-SCH) to be transmitted on the PUSCH (or if all REs in the PUSCH are allocated for UCI transmission), the UE may omit UCI transmission and perform UL data transmission on the PUSCH.

In the case opposite to the configuration above, namely, if the UE receives the UL grant before the DL assignment (or PDSCH), this may mean that the BS has instructed PUCCH transmission even though it knows that the resource for the PUCCH to be transmitted by the UE will collide with the resource of the PUSCH (that has been scheduled first). In this case, the preference for PUCCH transmission may be higher than for PUSCH transmission. Thus, the UE may perform PUCCH transmission, omitting PUSCH transmission.

In addition, When a PUCCH resource on which the UE is instructed to transmit HARQ-ACK (or CSI) in response to a specific DL assignment (=DL scheduling DCI) (or PDSCH) partially or fully overlaps the semi-persistent scheduling (SPS) PUSCH (or UL grant-free PUSCH) resource in the time domain, the UE may perform UL transmission as follows.

(A) If DL assignment (or PDSCH) is earlier than $T-T_0$ or the DL assignment (or PDSCH) reception time is at the same time (or slot) as $T-T_0$, the UE may omit PUCCH transmission and transmit the UCI supposed to be transmitted on the PUCCH by piggybacking the UCI on the PUSCH.

However, if the following conditions are satisfied, the UE may omit UCI transmission and transmit only data:

the payload size of the data to be transmitted on the PUSCH is less than the payload size of the UCI;

there are no (available) data transmission resource elements (REs) (in the PUSCH) calculated on the assumption of UCI piggyback or the number thereof is less than or equal to a certain value.

(B) If the DL assignment (or PDSCH) is later than $T-T_0$, the UE may omit PUSCH transmission and perform PUCCH transmission.

Here, T may denote a PUSCH transmission start time, and $T_0$ may denote a time-domain offset value on which the BS and the UE have pre-agreed or which is set for the UE by the BS.

As an example applicable to the present invention, To may be one of the following values.

1) a fixed value in units of slots (e.g., $T_0$=4);

2) the transmission period of the SPS PUSCH (or UL grant free PUSCH) or a value proportional to the transmission period; and 3) a value separately set for SPS PUSCH (or UL grant free PUSCH)

In the configuration above, there is no UL grant corresponding to the SPS PUSCH (or UL grant-free PUSCH), and therefore the UE may not determine whether the UL transmission preferred by the BS is PUSCH transmission or PUCCH transmission based on the temporal order of the DL assignment (or PDSCH) and the UL grant unlike the eighth UCI piggyback method described above.

Therefore, in the case of the SPS PUSCH (UL grant-free PUSCH), when the DL assignment (or PDSCH) is received time $T_0$ before the PUSCH transmission start time, the UE according to the present invention may omit PUCCH transmission and transmit the UCI supposed to be transmitted on the PUCCH by piggybacking the UCI on the PUSCH, on the assumption that the BS prioritizes PUSCH transmission.

On the other hand, if a DL assignment (or PDSCH) is received within the $T_0$ time interval before PUSCH transmission, the UE may perform PUCCH transmission after omitting PUSCH transmission on the assumption that the BS prioritizes PUCCH transmission.

Additionally, when a PUCCH resource (hereinafter, PUCCH 1) on which the UE is instructed to transmit HARQ-ACK (or CSI) in response to a specific DL assignment (=DL scheduling DCI) (or PDSCH) partially or fully overlaps a PUCCH resource (hereinafter, PUCCH 2) for (periodic/semi-persistent) CSI (or SR) transmission in the time domain, the UE according to the present invention may perform UL transmission as follows.

A) If the DL assignment (or PDSCH) is earlier than $T_A$-$T_B$ or the DL assignment (or PDSCH) reception time is at the same time (or slot) as $T_A$-$T_B$, the UE may omit PUCCH 2 transmission and transmit the CSI (or SR) and the HARQ-ACK on PUCCH 1 (or the PUCCH for HARQ-ACK transmission) by performing UCI multiplexing thereon.

However, if the following conditions are satisfied, the UE may omit CSI (or SR) transmission and transmit only HARQ-ACK:

there are no (available) HARQ-ACK transmission resource elements (REs) (in the PUCCH) calculated on the assumption of UCI multiplexing or the number thereof is less than or equal to a certain value.

B) If the DL assignment (or PDSCH) is later than $T_A$-$T_B$,

The UE may omit CSI (or SR) transmission and transmit only HARQ-ACK on PUCCH 1.

Here, $T_A$ may denote a PUCCH 2 transmission start time, and $T_B$ may denote a time-domain offset value on which the BS and the UE have pre-agreed or which is set for the UE by the BS.

As an example applicable to the present invention, $T_B$ may be one of the following values:

a fixed value in units of slots (e.g., $T_B$=4);
the transmission period of PUCCH 2 or a value proportional to the transmission period; and
a value separately set for PUCCH 2.

The PUCCH resource (PUCCH 1) for transmission of HARQ-ACK may be PUCCH format 2/3/4.

In addition, in the NR system to which the present invention is applicable, a UE operation performed in the case where a PUCCH resource for HARQ-ACK transmission collides with a PUCCH resource for periodic/semi-persistent CSI transmission may be defined similarly to the case of SPS PUSCH. In this case, if the DL assignment (or PDSCH) is later than $T_A$-$T_B$, the UE may assume that the BS certainly has a high preference for HARQ-ACK transmission. On the other hand, if the DL assignment (or PDSCH) is earlier than $T_A$-$T_B$ or the DL assignment (or PDSCH) reception time and $T_A$-$T_B$ are the same time (or slot), the UE may determine that the BS has a high preference for CSI transmission. In this case, the UE may transmit HARQ-ACK and CSI together on the PUCCH resource for HARQ-ACK transmission which is capable of supporting a more flexible UCI payload size.

Additionally, when a PUCCH resource (hereinafter, PUCCH 3) on which the UE is instructed to transmit HARQ-ACK (or CSI) in response to a specific DL assignment (=DL scheduling DCI) (or PDSCH) partially or fully overlaps a PUCCH resource (hereinafter, PUCCH 4) for (periodic/semi-persistent) CSI (or SR) transmission in the time domain, the UE according to the present invention may perform UL transmission as follows.

<1> If $T_C$-$T_D$ is earlier than the DL assignment (or PDSCH) or $T_C$-$T_D$ and the DL assignment (or PDSCH) reception time are the same time (or slot), the UE may omit PUCCH 4 transmission and transmit the CSI (or SR) and the HARQ-ACK on PUCCH 3 (or the PUCCH for HARQ-ACK transmission) by performing UCI multiplexing thereon.

However, if the following condition is satisfied, the UE may omit CSI (or SR) transmission and transmit only HARQ-ACK:

there are no (available) HARQ-ACK transmission resource elements (REs) (in the PUCCH) calculated on the assumption of UCI multiplexing or the number thereof is less than or equal to a certain value.

<2> If $T_C$-$T_D$ is later than the DL assignment (or PDSCH), the UE may perform UL transmission according to one of the following options.

<2-1> Opt. 1 the UE omits HARQ-ACK transmission and transmits only CSI (or SR) on PUCCH 4.

<2-2> Opt. 2

If the UCI (UCI for PUCCH 4) is CSI, the UE omits CSI transmission and transmits only HARQ-ACK on PUCCH 3.

If the UCI (UCI for PUCCH 4) is SR, HARQ-ACK transmission is omitted, and only SR is transmitted on PUCCH 4.

<2-3> Opt. 3

If the UCI (UCI for PUCCH 4) is CSI, the UE omits PUCCH 4 transmission and transmits the CSI (or SR) and HARQ-ACK on PUCCH 3 (or a PUCCH for HARQ-ACK transmission) by performing UCI multiplexing thereon. Here, the UE may utilize a resource in a DL slot which is at or earlier than the DL assignment reception time corresponding to PUCCH 3 as a resource (hereinafter, CSI reference resource) that is referenced for CSI calculation.

If the UCI (UCI for PUCCH 4) is SR, HARQ-ACK transmission is omitted, and only SR is transmitted on PUCCH 4.

In the description above, $T_C$ may denote a PUCCH 4 transmission start time, and $T_D$ may denote a time-domain offset value on which the BS and the UE have pre-agreed or which is set for the UE by the BS.

As an example applicable to the present invention, $T_D$ may be one of the following values:

a fixed value in units of slots (e.g., $T_D$=4);
the transmission period of PUCCH 4 or a value proportional to the transmission period; and
a value separately set for PUCCH 4.

In the configuration above, the PUCCH resource (PUCCH 3) for transmission of HARQ-ACK may be PUCCH format 2/3/4.

In addition, in the NR system to which the present invention is applicable, a UE operation performed in the case where a PUCCH resource for HARQ-ACK transmission collides with a PUCCH resource for periodic/semi-persistent CSI transmission may be defined similarly to the case of SPS PUSCH.

In this case, if the DL assignment (or PDSCH) is earlier than the DL assignment (or PDSCH) or $T_C$-$T_D$ and the DL assignment (or PDSCH) reception time are the same time (or slot), the UE may transmit the CSI and the HARQ-ACK together, assuming that the BS prioritizes HARQ-ACK transmission over the CSI.

If $T_C$-$T_D$ is later than the DL assignment (or PDSCH), the UE may basically transmit HARQ-ACK, assuming that the HARQ-ACK has a higher priority than the CSI. However, the UE may omit CSI transmission because UE processing time required for (updated) CSI transmission may be insufficient. However, if PUCCH 4 carries SR and there is no DL assignment corresponding to PUCCH 3 within at least the time interval corresponding to t=$T_C$-$T_D$ and t=$T_C$, the UE may omit HARQ-ACK transmission and transmit only SR on PUCCH 4, assuming that SR transmission has higher priority.

Additionally, when a PUCCH resource (hereinafter, PUCCH 5) on which the UE is instructed to transmit HARQ-ACK for a semi-persistent scheduling (SPS) PDSCH partially or fully overlaps a PUCCH resource (hereinafter, PUCCH 6) for (periodic/semi-persistent) CSI (or SR) transmission in the time domain, the UE may perform UL transmission as follows.

<A> If $T_2-T_{2,0}$ is earlier than $T_1-T_{1,0}$ or $T_2-T_{2,0}$ and $T_1-T_{1,0}$ are the same time (or slot), the UE may omit PUCCH 6 transmission and transmit the CSI (or SR) and the HARQ-ACK on PUCCH 5 (or the PUCCH for HARQ-ACK transmission) by performing UCI multiplexing thereon.

However, if the following conditions are satisfied, the UE may omit CSI (or SR) transmission and transmit only HARQ-ACK:

there are no (available) HARQ-ACK transmission resource elements (REs) (in the PUCCH) calculated on the assumption of UCI multiplexing or the number thereof is less than or equal to a certain value.

<B> If $T_2-T_{2,0}$ is later than $T_1-T_{1,0}$, the UE may perform UL transmission according to one of the following options.

<B-1> Opt. 1 the UE omits HARQ-ACK transmission and transmits only CSI (or SR) on PUCCH 6.

<B-2> Opt. 2

If the UCI (UCI for PUCCH 2) is CSI, the UE omits CSI transmission and transmits only HARQ-ACK on PUCCH 5.

If the UCI (UCI for PUCCH 6) is SR, the UE omits HARQ-ACK transmission and transmits only SR to PUCCH 6

<B-3> Opt. 3

If the UCI (UCI for PUCCH 6) is CSI, the UE omits PUCCH 6 transmission and transmits CSI (or SR) and HARQ-ACK on PUCCH 5 (or a PUCCH for HARQ-ACK transmission) by performing UCI multiplexing thereon. Here, the UE may utilize a resource in a DL slot which is at or earlier than the time of $T_1-T_{1,0}$ as a resource (hereinafter, CSI reference resource) that is referenced for CSI calculation.

If the UCI (UCI for PUCCH 6) is SR, the UE omits HARQ-ACK transmission and transmits only SR on PUCCH 6.

In the configuration above, the PUCCH resource (PUCCH 5) for transmission of HARQ-ACK may be PUCCH format 2/3/4.

In addition, $T_1$ and $T_2$ may denote transmission start times of PUCCH 5 and PUCCH 6, respectively. $T_{1,0}$ and $T_{2,0}$ may denote time-domain offset values on which the BS and the UE have pre-agreed or which are set for the UE by the BS.

As an example applicable to the present invention, $T_{1,0}$ or $T_{2,0}$ may be set to one of the following values.

a fixed value in units of slots (e.g., $T_{1,0}$ or $T_{2,0}$=4);

the transmission period of PUCCH 5 (or PUCCH 6) or a value proportional to the transmission period; and a value separately set for PUCCH 5 (or PUCCH 6).

As a specific example, if two PUCCH resources for different UCI types overlap in the time domain and both correspond to periodic transmission or SPS transmission, the UE may determine that the UCI of a PUCCH with a shorter period has a higher priority and prioritize the corresponding UCI transmission.

Additionally, when a PUCCH resource on which the UE is instructed to transmit HARQ-ACK for a semi-persistent scheduling (SPS) PDSCH (or a (periodic/semi-persistent) PUCCH resource configured for CSI transmission) partially or fully overlaps a semi-persistent scheduling (SPS) PUSCH (or UL grant-free PUSCH) resource in the time domain, the UE may perform UL transmission as follows.

1> If $T_{DL}-T_{DL,0}$ is earlier than $T_{UL}-T_{UL,0}$, or $T_{DL}-T_{DL,0}$ and $T_{UL}-T_{UL,0}$ are the same time (or slot), the UE may omit PUCCH transmission and transmit the UCI supposed to be transmitted on the PUCCH by piggybacking the UCI on the PUSCH.

However, if the following conditions are satisfied, the UE may omit UCI transmission and transmit only data:

the payload size of the data to be transmitted on the PUSCH is less than the payload size of the UCI;

there are no (available) data transmission resource elements (REs) (in the PUSCH) calculated on the assumption of UCI piggyback or the number thereof is less than or equal to a certain value.

2> If $T_{DL}-T_{DL,0}$ is later than $T_{UL}-T_{UL,0}$, the UE may omit PUSCH transmission and perform PUCCH transmission.

Here, $T_{DL}$ and $T_{UL}$ may denote transmission start times of PUCCH and PUSCH, respectively. $T_{DL,0}$ and $T_{UL,0}$ may denote time-domain offset values on which the BS and the UE have pre-agreed or which are set for the UE by the BS.

As an example applicable to the present invention, $T_{DL,0}$ or $T_{UL,0}$ may be set to one of the following values.

a fixed value in units of slots (e.g., $T_{DL,0}$ or $T_{UL,0}$=4);

the transmission period of the PUCCH (or PUSCH) or a value proportional to the transmission period; and a value separately set for the PUCCH (or PUSCH)

As a specific example, if the PUCCH and PUCCH resources overlap in the time domain and both perform periodic transmission or SPS transmission, the UE may determine that UL transmission having a shorter period has higher priority and prioritizes the corresponding UL transmission.

In summary of the configuration above, when a PUCCH or PUSCH (hereinafter, CH 1) transmitted in a periodic (or SPS) manner collides with a PUCCH or PUSCH (hereinafter, CH 2) transmitted in a periodic (or SPS) manner (different from that of CH 1), the UE according to the present invention may transmit a channel having a shorter transmission period.

Hereinafter, generalized configurations applicable to the present invention will be described in detail below.

[Generalization: PUCCH-PUSCH]

When the resource of a PUCCH transmitted in response according to specific DCI partially or fully overlaps the resource of a PUSCH transmitted according to a UL grant in the time domain, the UE may perform UL transmission as follows.

A> If $T_{PUCCH}$ is earlier than $T_{PUSCH}$, or $T_{PUCCH}$ and $T_{PUSCH}$ are the same time (or slot), the UE may omit PUCCH transmission and transmit the UCI supposed to be transmitted on the PUCCH by piggybacking the UCI on the PUSCH.

However, if the following conditions are satisfied, the UE may omit UCI transmission and transmit only data:

the payload size of the data to be transmitted on the PUSCH is less than the payload size of the UCI;

there are no (available) data transmission resource elements (REs) (in the PUSCH) calculated on the assumption of UCI piggyback or the number thereof is less than or equal to a certain value.

B> $T_{PUCCH}$ is later than $T_{PUSCH}$, the UE may omit PUSCH transmission and perform PUCCH transmission.

Here, $T_{PUCCH}$ may be a DCI (or PDSCH) reception time corresponding to the PUCCH transmission.

In addition, $T_{PUSCH}$ may be a UL grant reception time corresponding to the PUSCH transmission.

Additionally, when the resource of a PUCCH transmitted in a periodic or semi-persistent scheduling (SPS) manner partially or fully overlaps the resource of a PUSCH transmitted according to the UL grant in the time domain, the UE may perform UL transmission as follows.

[1] If $T_{PUCCH,1}$ is earlier than $T_{PUSCH,1}$, or $T_{PUCCH,1}$ and $T_{PUSCH,1}$ are the same time (or slot), the UE may omit PUCCH transmission and transmit the UCI supposed to be transmitted on the PUCCH by piggybacking the UCI on the PUSCH.

However, if the following conditions are satisfied, the UE may omit UCI transmission and transmit only data:
the payload size of the data to be transmitted on the PUSCH is less than the payload size of the UCI;
there are no (available) data transmission resource elements (REs) (in the PUSCH) calculated on the assumption of UCI piggyback or the number thereof is less than or equal to a certain value.

[2] If $T_{PUCCH,1}$ is later than $T_{PUSCH,1}$,
the UE may perform UL transmission according to one of the following options.

[2-1] Opt. 1: the UE omits PUSCH transmission and performs PUCCH transmission.

[2-2] Opt. 2: the UE omits PUCCH transmission and transmits the UCI supposed to be transmitted on the PUCCH by piggybacking the UCI on the PUSCH.

[2-3] Opt. 3: the UE performs Opt. 1 or Opt. 2 depending on the type of UCI to be transmitted on the PUCCH.

As a specific example, if the UCI is CSI, the UE performs Opt. 2. Otherwise, the UE performs Opt. 1.

Here, $T_{PUCCH,1}$ may be as follows:
a point in time (e.g., $T_X$-$T_{X,0}$) earlier than the PUCCH transmission start time (e.g., $T_X$) by a certain time (e.g., $T_{X,0}$).

Here, $T_{X,0}$ may be one of the following values.
a fixed value in units of slots (or OFDM symbols) (e.g., $T_{X,0}$=4);
the transmission period of the PUCCH or a value proportional to the transmission period; and
a value separately set for the PUCCH.

$T_{PUSCH,1}$ may be a UL grant reception time corresponding to the PUSCH transmission.

Additionally, when the resource of a PUCCH transmitted in a periodic or semi-persistent scheduling (SPS) manner partially or fully overlaps the resource of a PUSCH transmitted in a periodic or semi-persistent scheduling (SPS) manner in the time domain, the UE may perform UL transmission as follows.

[A] If $T_{PUCCH,2}$ is earlier than $T_{PUSCH,2}$, or $T_{PUCCH,2}$ and $T_{PUSCH}$ are the same time (or slot),
the UE may omit PUCCH transmission and transmit the UCI supposed to be transmitted on the PUCCH by piggybacking the UCI on the PUSCH.

However, if the following conditions are satisfied, the UE may omit UCI transmission and transmit only data:
the payload size of the data to be transmitted on the PUSCH is less than the payload size of the UCI;
there are no (available) data transmission resource elements (REs) (in the PUSCH) calculated on the assumption of UCI piggyback or the number thereof is less than or equal to a certain value.

[B] If $T_{PUCCH,2}$ is later than $T_{PUSCH,2}$,
the UE may perform UL transmission according to one of the following options.

[B-1] Opt. 1: the UE omits PUSCH transmission and performs PUCCH transmission.

[B-2] Opt. 2: the UE omits PUCCH transmission and transmit the UCI supposed to be transmitted on the PUCCH by piggybacking the UCI on the PUSCH.

[B-3] Opt. 3: the UE performs Opt. 1 or Opt. 2 depending on the type of UCI to be transmitted on the PUCCH.

As a specific example, if the UCI is CSI, the UE performs Opt. 2. Otherwise, the UE performs Opt. 1.

Here, $T_{PUCCH,2}$ may be as follows:
a point in time (e.g., $T_Y$-$T_{Y,0}$) earlier than the PUCCH transmission start time (e.g., $T_Y$) by a certain time (e.g., $T_{Y,0}$).

As an example applicable to the present invention, $T_{Y,0}$ may be one of the following values.
a fixed value in units of slots (or OFDM symbols) (e.g., $T_{Y,0}$=4);
the transmission period of the PUCCH or a value proportional to the transmission period; and
a value separately set for the PUCCH.

Here, $T_{PUSCH,2}$ may be as follows:
a point in time (e.g., $T_Z$-$T_{Z,0}$) earlier than the PUCCH transmission start time (e.g., $T_Z$) by a certain time (e.g., $T_{Z,0}$).

As an example applicable to the present invention, $T_{Z,0}$ may be one of the following values.
a fixed value in units of slots (or OFDM symbols) (e.g., $T_{Z,0}$=4);
the transmission period of the PUCCH or a value proportional to the transmission period; and
a value separately set for the PUCCH.

In one embodiment of the present invention, $T_{PUCCH}$, $T_{PUCCH1}$, and $T_{PUCCH2}$ may be considered as times at which the corresponding PUCCH transmission is triggered, and $T_{PUSCH}$, $T_{PUSCH1}$, and $T_{PUSCH2}$ may be considered as times at which corresponding PUSCH transmission is triggered, respectively.

Here, if $T_{PUSCH}$ (or $T_{PUSCH1}$, $T_{PUSCH2}$) is later than or at the same time as $T_{PUCCH}$ (or $T_{PUCCH1}$, $T_{PUCCH2}$), this may be interpreted as indicating PUSCH scheduling even if presence of the PUCCH is known. Accordingly, the UE may determine that the BS has a high preference for PUSCH transmission, and thus may omit PUCCH transmission and transmit the UCI supposed to be transmitted on the PUCCH by piggybacking the UCI on the PUSCH.

In the opposite case, the UE may determine that the BS has performed PUSCH scheduling without considering PUCCH transmission, and thus may prioritize PUCCH transmission over PUSCH transmission. In this case, when the UE performs UCI piggyback on the PUSCH, the UE processing time for UCI transmission may not be guaranteed. Therefore, the UE may transmit only the UCI on the PUCCH, omitting PUSCH transmission.

[Generalization: PUCCH-PUCCH]

Additionally, when the resource of a PUCCH (PUCCH A) (for transmission of UCI A) partially or fully overlaps the resource of a PUCCH (PUCCH B) (for UCI B transmission) transmitted in a periodic or semi-persistent scheduling (SPS) manner in the time domain, the UE may perform UL transmission as follows.

1] If $T_F$ is earlier than $T_E$, or $T_F$ and $T_E$ are the same time (or slot),
the UE may omit PUCCH transmission and transmit UCI A and UCI B on PUCCH A (or a PUCCH for UCI A transmission) by performing UCI multiplexing thereon.

However, if the following condition is satisfied, the UE may transmit UCI A only, omitting UCI B transmission.
there are no (available) UCI A transmission resource elements (REs) (in the PUCCH) calculated on the assumption of UCI multiplexing or the number thereof is less than or equal to a certain value.

2] If $T_F$ is later than $T_E$,
the UE may perform UL transmission according to one of the following options.

2-1] Opt. 1
The UE omits UCI A transmission and transmits only UCI B on PUCCH B.

2-2] Opt. 2
The UE omits UCI B transmission and transmits only UCI A on PUCCH A.

2-3] Opt. 3
The UE transmits UCI A and UCI B on PUCCH A (or a PUCCH for UCI A transmission) by performing UCI multiplexing thereon.

2-4] Opt. 4
The UE performs Opt. 1 or Opt. 2 depending on the priorities of UCI A and UCI B. For example, if the priority relationship of UCI A>UCI B is established, the UE performs Opt. 2. Otherwise, the UE performs Opt. 1.

2-5] Opt. 5

The UE performs Opt. 1 or Opt. 3 depending on the types of UCI A and UCI B. For example, when UCI A is HARQ-ACK, the UE may perform Opt. 1 if UCI B is SR and may perform Opt. 3 if UCI B is CSI.

In the configurations above, the UE may utilize a resource in a DL slot which is at or earlier than the time of $T_E$ as a resource (hereinafter, CSI reference resource) that is referenced for CSI calculation.

Here, $T_E$ may be a DCI (or PDSCH) reception time corresponding to transmission of PUCCH A.

In the present invention, $T_F$ may be as follows:
a point in time (e.g., $T_{PUCCH}$-$T_{PUCCHB,0}$) earlier than the PUCCH B transmission start time (e.g., $T_{PUCCHB}$) by a certain time (e.g., $T_{PUCCHB,0}$).

Here, $T_{PUCCHB,0}$ may be one of the following values:
a fixed value in units of slots (or OFDM symbols) (e.g., $T_{PUCCHB,0}=4$);
the transmission period of PUCCH B or a value proportional to the transmission period; and
a value separately set for PUCCH B.

Additionally, when the resource of a PUCCH (PUCCH C) (for transmission of UCI C) transmitted in a periodic or semi-persistent scheduling (SPS) manner partially or fully overlaps the resource of a PUCCH (PUCCH D) (for UCI D transmission) transmitted in a periodic or semi-persistent scheduling (SPS) manner in the time domain, the UE may perform UL transmission as follows.

A] If $T_H$ is earlier than $T_G$, or $T_H$ and $T_G$ are the same time (or slot),
the UE may omit transmission of PUCCH D and transmit UCI C and UCI D on PUCCH C (or a PUCCH for UCI C transmission) by performing UCI multiplexing thereon.

However, if the following condition is satisfied, the UE may transmit UCI C only, omitting UCI D transmission.
there are no (available) UCI C transmission resource elements (REs) (in the PUCCH) calculated on the assumption of UCI multiplexing or the number thereof is less than or equal to a certain value.

B] If $T_H$ is later than $T_G$,
the UE may perform UL transmission according to one of the following options.

B-1] Opt. 1
The UE omits UCI C transmission and transmits only UCI D on PUCCH D.

B-2] Opt. 2
The UE omits UCI D transmission and transmits only UCI C on PUCCH C

B-3] Opt. 3
The UE transmits UCI C and UCI D on PUCCH C (or a PUCCH for UCI C transmission) by performing UCI multiplexing thereon.

B-4] Opt. 4
The UE performs Opt. 1 or Opt. 2 depending on the priorities of UCI C and UCI D. For example, if the priority relationship of UCI C>UCI D is established, the UE performs Opt. 2. Otherwise, the UE performs Opt. 1.

B-5] Opt. 5
The UE performs Opt. 1 or Opt. 3 depending on the types of UCI C and UCI D. For example, when UCI C is HARQ-ACK, the UE may perform Opt. 1 if UCI D is SR and may perform Opt. 3 if UCI D is CSI.

In the configurations above, the UE may utilize a resource in a DL slot which is at or earlier than the time of $T_G$ as a resource (hereinafter, CSI reference resource) that is referenced for CSI calculation.

Here, $T_G$ may be as follows:
a point in time (e.g., $T_{PUCCHC}$-$T_{PUCCHC,0}$) earlier than the PUCCH C transmission start time (e.g., $T_{PUCCHC}$) by a certain time (e.g., $T_{PUCCHC,0}$).

For example, $T_{PUCCHC,0}$ may be one of the following values.
a fixed value in units of slots (or OFDM symbols) (e.g., $T_{PUCCHC,0}=4$);
P the transmission period of PUCCH C or a value proportional to the transmission period; and
a value separately set for PUCCH C.

Here, $T_H$ may be as follows:
a point in time (e.g., $T_{PUCCHD}$-$T_{PUCCHD,0}$) earlier than the PUCCH D transmission start time (e.g., $T_{PUCCHD}$) by a certain time (e.g., $T_{PUCCHD,0}$).

For example, $T_{PUCCHD,0}$ may be one of the following values:
a fixed value in units of slots (or OFDM symbols) (e.g., $T_{PUCCHD,0}=4$);
the transmission period of PUCCH D or a value proportional to the transmission period; and
a value separately set for PUCCH D.

In addition, the UE may determine HARQ-ACK transmission REs based on puncturing on the PUSCH in order for the UE to perform UCI piggyback of HARQ-ACK and CSI on the PUSCH. At this time, in order to prevent HARQ-ACK from puncturing the CSI transmission resource, reserved REs may be configured, and the UE may not perform CSI mapping in the reserved REs (in this case, HARQ-ACK is transmitted in the reserved REs).

Here, a reference HARQ-ACK payload size for calculating the reserved REs may vary depending on RRC connection setup (or semi-static/dynamic codebook configuration for HARQ-ACK).

For example, a UE prior to RRC connection setup (or a semi-static/dynamic codebook configuration for HARQ-ACK) may calculate the number of reserved REs on the assumption of $X_1$ bits of HARQ-ACK. After RRC connection setup (or semi-static/dynamic codebook configuration for HARQ-ACK), the UE may calculate the number of reserved REs on the assumption of $X_2$ ($\neq X_1$) bits of HARQ-ACK. As a specific example, $X_1=1$ and $X_2=2$.

According to the operation as described above, a maximum of $X_1$ bits is expected as the HARQ-ACK payload size before RRC connection setup (or semi-static/dynamic codebook configuration for HARQ-ACK), while a maximum of $X_2$ bits is expected as the HARQ-ACK payload size after RRC connection setup (or semi-static/dynamic codebook configuration for HARQ-ACK). Therefore, an unnecessarily large number of reserved REs may not be generated.

The eighth UCI piggyback method described above may be applied in combination with other proposed methods of the present invention as long as they do not conflict with each other.

3.9. Ninth UCI Piggyback Method

When a PUCCH resource (hereinafter, A/N PUCCH) for transmission of HARQ-ACK to be transmitted by the UE partially or fully overlaps a (UL grant-based) (UCI piggyback target) PUSCH resource in the time domain, the UE may perform transmission by determining whether or not UCI piggyback is to be performed as follows.

(1) Opt. 1

(1-1) If the UL grant is indicated after $T_{A/N}$-$T_1$ (or at the corresponding time) (hereinafter referred to as Condition 1),
the UE transmits HARQ-ACK and UL-SCH on the PUSCH by UCI-piggybacking HARQ-ACK.

(1-2) If the UL grant is indicated before $T_{A/N}$-$T_1$ (or at the corresponding time):
Opt. 1-1: the UE omits PUSCH transmission and transmits HARQ-ACK on the A/N PUCCH;
Opt. 1-2: the UE omits PUSCH transmission corresponding to the UL grant.

At this time, if there is a PUSCH that satisfies Condition 1, the UE may transmit the HARQ-ACK and the UL-SCH together on the corresponding PUSCH by UCI-piggybacking the HARQ-ACK.

If there is no PUSCH satisfying Condition 1, the UE may omit PUSCH transmission and transmit the HARQ-ACK on the A/N PUCCH.

(2) Opt. 2

(2-1) If the UL grant is indicated after (or at the same time as) reception of (all) DL assignments (or PDSCHs) corresponding to the PUCCH (hereinafter referred to as Condition 2):

the UE transmits HARQ-ACK and UL-SCH on the PUSCH by UCI-piggybacking the HARQ-ACK.

(2-2) If the UL grant is indicated at a time before reception of (at least one) DL assignment (or PDSCH) corresponding to the PUCCH:

Opt. 2-1: the UE omits PUSCH transmission and transmits HARQ-ACK on the A/N PUCCH;

Opt. 2-2: the UE omits PUSCH transmission corresponding to the UL grant.

At this time, if there is a PUSCH that satisfies Condition 1, the UE may transmit the A/N and UL-SCH on the corresponding PUSCH by UCI-piggybacking the HARQ-ACK.

If there is no PUSCH satisfying Condition 1, the UE may omit PUSCH transmission and transmit the HARQ-ACK on the A/N PUCCH.

Here, $T_{A/N}$ may denote an A/N PUCCH transmission time, and $T_1$ may correspond to one of the following:

(minimum) PDSCH-to-HARQ-ACK timing set for the UE;

PDSCH-to-HARQ-ACK timing for a PDSCH (for HARQ-ACK transmission) received by the UE for the last time; and (minimum) PDSCH-to-HARQ-ACK timing (or UE processing time) according to UE capability.

Alternatively, $T_{A/N}-T_1$ may be a starting point of HARQ-ACK encoding.

Here, the PDSCH-to-HARQ-ACK timing may refer to a duration from the PDSCH end time to the HARQ-ACK transmission time.

However, UCI piggyback may always be exceptionally applied to the semi-persistent scheduling (SPS) PUSCH or the PUSCH scheduled through fallback DCI (because the total DAI value in the DL DCI is referenced in determining the HARQ-ACK payload size).

In the NR system according to an embodiment of the present invention, the PDSCH-to-HARQ-ACK timing and the UL grant-to-PUSCH timing may be variably set. Accordingly, the DL assignment indicating HARQ-ACK transmission on a PUCCH overlapping the PUSCH resource in the time domain may be received after the UL grant for scheduling the PUSCH resource is received.

However, in the case where HARQ-ACK is transmitted on the PUSCH, it may be necessary to indicate the payload size of the HARQ-ACK to be UCI-piggybacked on the PUSCH using a specific indicator (e.g., UL DAI) in the UL grant such that there is no different understanding of the HARQ-ACK payload size between the BS and the UE. Therefore, the UE may expect that DL assignments transmitted after the UL grant will not indicate HARQ-ACK transmission on the PUSCH scheduled with the UL grant. In addition, if the PUCCH partially overlaps the PUCCH resources for HARQ-ACK transmission in the time domain, the UE may expect that all the DL assignments indicating HARQ-ACK transmission on the PUCCH will precede the UL grant. This is because, if the BS schedules the PUSCH, the BS may know presence of (previous) DL assignments that trigger HARQ-ACK transmission. In other words, when the BS schedules the PUSCH as in the case described above, the UE may assume (or consider) that the BS intended for HARQ-ACK to be transmitted on the PUSCH. Therefore, if the UE is likely to fail to UCI-piggyback the HARQ-ACK on the PUSCH, the BS should not transmit the corresponding UL grant.

Accordingly, when a PUCCH resource (hereinafter, A/N PUCCH) for transmission of HARQ-ACK to be transmitted by the UE partially or fully overlaps a (UL grant-based) PUSCH resource in the time domain, the UE according to the present invention may operate as follows.

If the UL grant is indicated after (or at the same time as) reception of (all) DL assignments (or PDSCHs) corresponding to the PUCCH, the UE transmits HARQ-ACK on the PUSCH by UCI-piggybacking the HARQ-ACK.

Otherwise, the UE may transmit the PUCCH, determining that there is an indication error (e.g., error) of the BS or omitting PUSCH transmission.

At this time, for the PUSCH scheduled through the non-fallback DCI, whether or not to perform UCI piggyback may be determined according to the relative relationship between the PUSCH and the (HARQ-ACK transmission) PUCCH in terms of starting symbol, PUCCH duration, and UL/DL grant timing. However, for the SPS PUSCH or the PUSCH scheduled through the fallback DCI, it may be determined (or configured) that UCI piggyback is always performed regardless of the above relationship.

The ninth UCI piggyback method described above may be applied in combination with other proposed methods of the present invention as long as they do not conflict with each other.

3.10. Tenth UCI Piggyback Method

When a PUCCH resource (hereinafter, CSI PUCCH) for transmission of CSI to be transmitted by the UE fully or partially overlaps a PUSCH resource in the time domain, the UE may determine a CSI reference resource for CSI calculation as follows:

the (time-domain) CSI reference resource for the CSI is the earliest (valid) DL slot that is present at the time before $T_{PUSCH}-T_2$ (or the corresponding time) and present at the time before $T_{CSI}-T_{CQI}$ (or the corresponding time).

Here, $T_{PUSCH}$ may denote a PUSCH transmission time, and $T_2$ may be one of the following.

(1) For a UL grant-based PUSCH:

Opt. 1: UL grant-to-PUSCH timing indicated to the UE;

Opt. 2: (minimum) UL grant-to-PUSCH timing set for the UE;

Opt. 3: (minimum) UL grant-to-PUSCH timing according to UE capability (or implementation).

(2) For a semi-persistent scheduling (SPS) PUSCH:

Opt. 1: a value on which the UE and the BS have pre-agreed;

Opt. 2: a value set by the BS through a higher layer signal;

Opt. 3: the period of the SPS PUSCH or a value proportional to the period;

Opt. 4: options applied to the UL grant-based PUSCH;

Opt. 5: UL grant-to-PUSCH timing indicated through SPS activation DCI.

Here, $T_{CSI}$ may denote a CSI PUCCH transmission time, and $T_{CQI}$ may be a value on which the BS and the UE have pre-agreed or which is set for the UE by the BS.

In addition, the CSI reference resource may refer to a time resource that is referenced for CSI calculation, and the (valid) DL slot may refer to a slot configured as a DL slot, and/or a slot that is not included in a measurement gap and/or a slot that is included in the same DL bandwidth part (BWP) as the DL BWP in which CSI reporting is performed.

The UL grant-to-PUSCH timing may refer to a duration from the UL grant to the PUSCH transmission time.

Specifically, if CSI PUCCH and PUSCH resources overlap each other in the time domain and the time taken for CSI calculation does not limit the UE processing time for PUSCH transmission, CSI may be UCI-piggybacked and transmitted on the PUSCH. That is, the UE may always UCI-piggyback and transmit the CSI on the PUSCH, and adjust the CSI reference resource, which is a reference for CSI calculation, such that the CSI reference resource is present before the minimum UL timing for PUSCH transmission.

For example, suppose that the CSI reference resource given when CSI-only transmission is assumed is later than the PUSCH encoding start time. In this case, if the UE performs PUCCH encoding after CSI calculation (considering rate-matching for the CSI), encoding may be performed later than when PUSCH encoding is performed without the CSI. Therefore, in this case, the UE processing time up to the PUSCH transmission time may not be guaranteed.

In order to address this issue, the present invention proposes that, when CSI PUCCH and PUSCH resources overlap each other in the time domain, the UE always UCI-piggyback and transmit the CSI on the PUSCH and the CSI reference resource be changed to be earlier than the (minimum) UL grant-to-PUSCH timing with respect to the PUSCH.

Specifically, in the NR system applicable to the present invention, the CSI reference resource may be defined as follows.

[CSI Reference Resource Definition]

The CSI reference resource for a serving cell is defined as follows:

In the frequency domain, the CSI reference resource is defined by the group of downlink physical resource blocks corresponding to the band to which the derived CQI value relates.

In the time domain, for a UE configured with a single CSI resource set for the serving cell, the CSI reference resource is defined by a single downlink slot $n-n_{CQI\_ref}$, where for periodic and semi-persistent CSI reporting $n_{CQI\_ref}$ is the smallest value greater than or equal to [TBD], such that it corresponds to a valid downlink slot.

where for aperiodic CSI reporting, if the UE is indicated by the DCI to report CSI in the same slot as the CSI request, $n_{CQI\_ref}$ is such that the reference resource is in the same valid downlink slot as the corresponding CSI request, otherwise $n_{CQI\_ref}$ is the smallest value greater than or equal to [TBD], such that slot $n-n_{CQI\_ref}$ corresponds to a valid downlink slot.

Here, $n_{CQI\_ref}$ may be set to be greater than the (minimum) UL grant-to-PUSCH timing such that CSI calculation of the UE does not affect the UE processing time for PUSCH encoding.

In addition, in the configuration above, n may denote a slot in which the CSI is transmitted.

The tenth UCI piggyback method described above may be applied in combination with other proposed methods of the present invention as long as they do not conflict with each other.

3.11. Eleventh UCI Piggyback Method

The UE may perform UCI-piggyback based on puncturing on the PUSCH for HARQ-ACK whose size is less than or equal to X (e.g., X=2) bits, and perform UL transmission based on rate-matching for the PUSCH for HARQ-ACK whose size is greater than X bits. In this case, in order to determine the location/number of reserved HARQ-ACK REs to which CSI part 1 is not mapped, the UE may assume the HARQ-ACK payload size of Y bits according to cases as follows.

(1) Y=0:

when the PUSCH (which is a UCI piggyback target) is scheduled with fallback DCI;

when the PUSCH (which is a UCI piggyback target) is an SPS PUSCH;

when the semi-static HARQ-ACK codebook is configured.

(2) Y=1:

when it is before RRC connection.

(3) Y=2:

when a dynamic HARQ-ACK codebook is configured.

Alternatively, if there is a total DAI (in the DL assignment) or a UL DAI (in the UL grant) and thus there is no mismatch in the HARQ-ACK payload size between the UE and the BS, the UE may determine the locations/number of (reserved) HARQ-ACK REs by interpreting Y as a value indicated by the total DAI or the UL DAI. However, if the total DAI (in the DL assignment) or the UL DAI (in the UL grant) is not present, the UE may determine the locations/number of (reserved) HARQ-ACK REs, assuming that Y is a specific value.

Here, the number of (reserved) HARQ-ACK REs may be determined based on the value of Y and the beta-offset value.

More specifically, in the NR system according to an embodiment of the present invention, when the HARQ-ACK can be transmitted based on puncturing on the PUSCH, the positions of REs in which HARQ-ACK transmission is expected may be reserved first and CSI (e.g., CSI part 1) may not be RE-mapped to the reserved REs in order to prevent the HARQ-ACK from puncturing the REs for CSI (e.g., CSI part 1) transmission.

In determining the locations/number of (reserved) HARQ-ACK REs, when X=2, the UE may always assume that the HARQ-ACK payload size is 2 bits. However, the operation of always assuming that the size is 2 bits as described above may be meaningful only when there is a possibility of mismatch in the HARQ-ACK payload size between the BS and the UE. Therefore, if there is a total DAI (in the DL assignment) or a UL DAI (total DAI in the UL grant), the UE may calculate the locations/number of (reserved) HARQ-ACKs based on the HARQ-ACK payload size according to the value of the total DAI. Otherwise, the UE may calculate the locations/number of (reserved) HARQ-ACKs, assuming that the HARQ-ACK payload size is 2 bits.

Additionally, the HARQ-ACK payload size of Y bits that the UE will assume to determine the locations/number of (reserved) HARQ-ACK REs to which CSI part 1 is not mapped may be determined as follows.

1) When the semi-static HARQ-ACK codebook has been configured or RRC connection setup has not been obtained yet:

if the maximum HARQ-ACK payload size is less than or equal to 2 bits, Y=the maximum HARQ-ACK payload size; and if the maximum HARQ-ACK payload size is greater than 2 bits, Y=0.

2) When a dynamic HARQ-ACK codebook is configured:

2-1) for a PUSCH having a UL DAI (in the UL grant),

Y=0 if the HARQ-ACK payload size indicated by the UL DAI is greater than 2 bits;

Y is the HARQ-ACK payload size indicated by the UL DAI if the HARQ-ACK payload size indicated by the UL DAI is less than or equal to 2 bits;

2-2) for a PUSCH having no UL DAI (in the UL grant) but having a total DAI received (in the DL DCI), Y=0 if the HARQ-ACK payload size indicated by the total DAI is greater than 2 bits;

Y=the HARQ-ACK payload size indicated by the total DAI if the HARQ-ACK payload size indicated by the total DAI is less than or equal to 2 bits;

2-3) for a PUSCH having no UL DAI (in the UL grant) and having no total DAI received (in the DL DCI), Y=2.

Alternatively, as another method, the HARQ-ACK payload size of Y bits may be determined as follows.

<1> When the semi-static HARQ-ACK codebook has been configured or RRC connection setup has not been obtained yet:
  if the maximum HARQ-ACK payload size is less than or equal to 2 bits, Y=the maximum HARQ-ACK payload size; and
  if the maximum HARQ-ACK payload size is greater than 2 bits, Y=0.

<2> When a dynamic HARQ-ACK codebook is configured, Y=2.

Additionally, when the semi-static HARQ-ACK codebook is configured, and the DAI indicated by the UL grant indicates one of "0 or 1 or 2 HARQ-ACK bits" or "Maximum configured HARQ-ACK payload size", Y may be set to 2 if "0 or 1 or 2 HARQ-ACK bits" is indicated, whereas Y may be set to 0 if the "Maximum configured HARQ-ACK payload size" is indicated.

The eleventh UCI piggyback method described above may be applied in combination with other proposed methods of the present invention as long as they do not conflict with each other.

3.12. Twelfth UCI Piggyback Method

When the BS can set an upper limit of the number of REs to which UCI mapping is possible to the number of REs obtained by multiplying the maximum number of REs to which UCI mapping is possible for the UCI piggyback operation of the UE by a scaling factor α, the initial value of α may be set to 1.

Here, the UCI type to which the upper limit of the number of REs to which UCI mapping is possible is applied may depend on presence or absence of the UL-SCH in the PUSCH.

In addition, the value of α may be set for the UE by the BS through a higher layer signal (e.g., RRC signaling).

Specifically, when the UE calculates the number of REs for UCI transmission in the PUSCH in the NR system according to an embodiment of the present invention, the upper limit of the number of UCI mapping REs may be set to the number of REs obtained by multiplying the maximum number of UCI mapping REs in the PUSCH by a scaling factor α in order to prevent the UCI payload size from becoming excessively larger than the payload size of the data to cause all REs in the PUSCH to be allocated to the UCI. In this regard, since the UCI payload size is rarely larger than the payload size of the data before the UE receives the RRC configuration, the initial value of α may be set to 1.

The twelfth UCI piggyback method described above may be applied in combination with other proposed methods of the present invention as long as they do not conflict with each other.

3.13. Thirteenth UCI Piggyback Method

When the UE transmits only the UCI on the PUSCH without the UL-SCH, the UE may calculate the number of coded modulation symbols (or the number of UCI mapping REs) for HARQ-ACK, CSI part 1, and CSI part 2 as disclosed below. In this case, $Q'_{ACK}$, $Q'_{CSI,1}$, and $Q'_{CSI,2}$ may denote the numbers of coded modulation symbols (or the numbers of UCI mapping REs) for HARQ-ACK, CSI part 1, and CSI part 2, respectively.

(1) Opt. 1

$$Q'_{ACK} = \min\left\{ \left\lceil \frac{\beta_{offset}^{ACK} \cdot (O_{ACK} + L_{ACK}) \cdot \sum_{l=0}^{N_{symb,all}^{PUSCH}-1} M_{sc}^{\Phi UCI}(l)}{\beta_{offset}^{CSI,1} \cdot (O_{CSI,1} + L_{CSI,1}) + \beta_{offset}^{CSI,2} \cdot (O_{CSI,2,REF} + L_{CSI,2})} \right\rceil, \alpha \left( \sum_{l=l_0}^{N_{symb,all}^{PUSCH}-1} M_{sc}^{\Phi UCI}(l) \right) \right\}$$ [Equation 5]

$$Q'_{CSI,1} = \min\left\{ \left\lceil \frac{\beta_{offset}^{CSI,1} \cdot (O_{CSI,1} + L_{CSI,1}) \cdot \sum_{l=0}^{N_{symb,all}^{PUSCH}-1} M_{sc}^{\Phi UCI}(l)}{\beta_{offset}^{CSI,1} \cdot (O_{CSI,1} + L_{CSI,1}) + \beta_{offset}^{CSI,2} \cdot (O_{CSI,2,REF} + L_{CSI,2})} \right\rceil, \alpha \left( \sum_{l=0}^{N_{symb,all}^{PUSCH}-1} M_{sc}^{\Phi UCI}(l) \right) - Q'_{ACK} \right\}$$ [Equation 6]

or $$Q'_{CSI,1} = \min\left\{ \left\lceil \frac{\beta_{offset}^{CSI,1} \cdot (O_{CSI,1} + L_{CSI,1}) \cdot \sum_{l=0}^{N_{symb,all}^{PUSCH}-1} M_{sc}^{\Phi UCI}(l)}{\beta_{offset}^{CSI,1} \cdot (O_{CSI,1} + L_{CSI,1}) + \beta_{offset}^{CSI,2} \cdot (O_{CSI,2,REF} + L_{CSI,2})} \right\rceil, \sum_{l=0}^{N_{symb,all}^{PUSCH}-1} M_{sc}^{\Phi UCI}(l) - Q'_{ACK} \right\}$$ [Equation 7]

$$Q'_{CSI,2} = \sum_{l=0}^{N_{symb,all}^{PUSCH}-1} M_{sc}^{\Phi UCI}(l) - Q'_{ACK} - Q'_{CSI,1}$$ [Equation 8]

(2) Opt. 2

$$Q'_{ACK} = \min\left\{ \left\lceil \frac{\beta_{offset}^{ACK} \cdot (O_{ACK} + L_{ACK}) \cdot \sum_{l=l_0}^{N_{symb,all}^{PUSCH}-1} M_{sc}^{\Phi UCI}(l)}{\beta_{offset}^{CSI,2} \cdot (O_{CSI,2,REF} + L_{CSI,2})} \right\rceil, \alpha \left( \sum_{l=l_0}^{N_{symb,all}^{PUSCH}-1} M_{sc}^{\Phi UCI}(l) \right) \right\}$$ [Equation 9]

$$Q'_{CSI,1} = \min\left\{\left\lceil\frac{\beta_{offset}^{CSI,1} \cdot (O_{CSI,1} + L_{CSI,1}) \cdot \sum_{l=l_0}^{N_{symb,all}^{PUSCH}-1} M_{sc}^{\Phi UCI}(l)}{\beta_{offset}^{CSI,2} \cdot (O_{CSI,2,REF} + L_{CSI,2})}\right\rceil, \alpha\left(\sum_{l=0}^{N_{symb,all}^{PUSCH}-1} M_{sc}^{\Phi UCI}(l)\right) - Q'_{ACK}\right\}$$ [Equation 10]

or $$Q'_{CSI,1} = \min\left\{\left\lceil\frac{\beta_{offset}^{CSI,1} \cdot (O_{CSI,1} + L_{CSI,1}) \cdot \sum_{l=l_0}^{N_{symb,all}^{PUSCH}-1} M_{sc}^{\Phi UCI}(l)}{\beta_{offset}^{CSI,2} \cdot (O_{CSI,2,REF} + L_{CSI,2})}\right\rceil, \sum_{l=0}^{N_{symb,all}^{PUSCH}-1} M_{sc}^{\Phi UCI}(l) - Q'_{ACK}\right\}$$ [Equation 11]

$$Q'_{CSI,2} = \sum_{l=0}^{N_{symb,all}^{PUSCH}-1} M_{sc}^{\Phi UCI}(l) - Q'_{ACK} - Q'_{CSI,1}$$ [Equation 12]

Here, $O_{ACK}$ and $O_{CSI,1}$ may denote the UCI payload sizes of HARQ-ACK and CSI part 1, respectively.

In addition, $O_{CSI,2,REF}$ is a reference UCI payload size for CSI part 2, and may be calculated in a manner predetermined between the BS and the UE regardless of actual transmission of CSI part 2. For example, $O_{CSI,2,REF}$ may be a minimum UCI payload size, a maximum UCI payload size, a median or an average for CSI part 2.

$L_{ACK}$, $L_{CSI,1}$ and $L_{CSI,2}$ may denote the CRC bits(s) for HARQ-ACK, CSI part 1 and CSI part 2, respectively.

In addition, $\beta_{offset}^{ACK}$, $\beta_{offset}^{CSI,1}$, and $\beta_{offset}^{CSI,2}$ may be beta-offset values for offset HARQ-ACK, CSI part 1, and CSI part 2, respectively.

Also, α, which is set by the BS through a higher layer signal, may denote a scaling factor between 0 and 1.

$M_{sc}^{\Phi UCI}(l)$ may denote the number of UCI mapping REs in symbol index l, $N_{symb,all}^{PUSCH}$ may denote the total number of (OFDM) symbols in the PUSCH, and $l_0$ may denote the symbol index of the earliest non-DM-RS (OFDM) symbol after the first DM-RS (OFDM) symbol(s) in a slot.

Specifically, the number of UCI REs in a PUSCH with a UL-SCH may be determined by the ratio between the UCI payload size (scaled by the beta-offset) and the data payload size. On the other hand, for the PUSCH without a UL-SCH, there is no data payload size, and therefore a CSI payload size may be considered as a reference value to replace the data payload size. In this case, since the CSI includes CSI part 1 and CSI part 2, the number of UCI REs in the PUSCH with the UL-SCH may be determined according to Opt. 1 or Opt. 2 of the thirteenth UCI piggyback method.

In Opt. 1, the CSI payload size is calculated as the sum of the CSI part 1 payload size (scaled by beta-offset) and the CSI part 2 payload size (scaled by beta-offset). On the other hand, in Opt. 2, the CSI payload size is calculated only with the (reference) CSI part 2 payload size (scaled by beta-offset). The (reference) CSI part 2 payload size is a value on which the BS and the UE have pre-agreed. For example, it may be the maximum or minimum value of the CSI part 2 payload size.

The thirteenth UCI piggyback method described above may be applied in combination with other proposed methods of the present invention as long as they do not conflict with each other.

3.14. Fourteenth UCI Piggyback Method

When the UE can omit a part of information about CSI part 2 (e.g., omission) in performing the UCI piggyback, the UE may perform omission for CSI part 2 as follows.

Omission of some low priority blocks for CSI part 2 until the (effective) coding rate for CSI part 2 becomes less than or equal to the (effective) coding rate for CSI part 1

As a specific example, the UE may perform omission for CSI part 2 until Condition 1 according to Equation 13 (or Condition 2 according to Equation 14) is satisfied.

$$\frac{\beta_{offset}^{CSI,2} \cdot (O_{CSI,2} + L_{CSI,2})}{Q'_{CSI,2}} \leq \frac{\beta_{offset}^{CSI,1} \cdot (O_{CSI,1} + L_{CSI,1})}{Q'_{CSI,1}}$$ [Equation 13]

$$c_{CSI,2} = \frac{(O_{CSI,2} + L_{CSI,2})}{Q'_{CSI,2}} \leq \frac{\beta_{offset}^{CSI,1}}{\beta_{offset}^{CSI,2}} \cdot \frac{(O_{CSI,1} + L_{CSI,1})}{Q'_{CSI,1}}$$ [Equation 14]

Here, $Q'_{CSI,1}$ and $Q'_{CSI,2}$ may denote the numbers of coded modulation symbols (or the numbers of UCI mapping REs) for CSI part 1 and CSI part 2, respectively. In addition, a reference UCI payload size for CSI part 2 may be utilized in calculating $Q'_{CSI,2}$. In other words, $Q'_{CSI,2}$ may be determined regardless of the UCI payload size of CSI part 2 that is actually transmitted.

Here, $O_{CSI,1}$ and $O_{CSI,2}$ may denote the UCI payload sizes for CSI part 1 and CSI part 2, respectively.

$L_{CSI,1}$ and $L_{CSI,2}$ may denote CRC bits(s) for CSI part 1 and CSI part 2, respectively.

$\beta_{offset}^{CSI,1}$ and $\beta_{offset}^{CSI,2}$ may be the beta-offset values for CSI part 1 and CSI part 2, respectively.

Also, $C_{CSI,2}$ may be a coding rate for CSI part 2.

Specifically, in the NR system according to an embodiment of the present invention, in the case of UCI information having a considerably large payload size like CSI part 2, the UE may perform UCI piggyback transmission, omitting some of the entire UCIs depending on the size of the resource region of the PUCCH and/PUSCH to be transmitted. At this time the UCI carried on the PUSCH may be assigned a priority determined according to the type thereof.

For example, when the number of CSI types to be reported in one slot is N (which may be associated with, for example, the CSI process index and the CC index), the priority for the entire part 2 CSI may be determined depending on the priority determined based on the CSI type such as WB CSI and SB CSI, and blocks may be sequentially omitted from the block with the lowest priority. In this case, a part of CSI part 2 may be omitted such that a maximum CSI part 2 payload size is obtained as long as the UCI coding rate for CSI part 2 does not exceed a predetermined threshold coding rate.

However, when CSI part 2 is transmitted on the PUSCH, the PUSCH may or may not have the UL-SCH. Therefore, when CSI part 2 is transmitted on the PUSCH, it may be preferable to calculate the threshold coding rate based on CSI part 1 for which presence of the UL-SCH in the PUSCH is always guaranteed.

Thus, the UE may perform omission for CSI part 2 until the effective UCI coding rate (scaled by beta-offset) is less than or equal to the effective UCI coding rate (scaled beta-offset) for CSI part 1.

Additionally, the UE may perform omission for CSI part 2 such that the coding rate for CSI part 2 is less than or equal to $c_T$ given below.

$$c_T = \frac{\beta_{offset}^{CSI,1}}{\beta_{offset}^{CSI,2}} \cdot \frac{(O_{CSI,1} + L_{CSI,1})}{Q'_{CSI,1} \cdot Q_m} \qquad \text{[Equation 15]}$$

Here, $Q_m$ may denote a modulation order for CSI part 1 transmitted in the PUSCH.

Alternatively, the UE may perform omission for CSI part 2 in the following manner by applying an upper limit to $c_T$.

$$c_T = \min\left\{\frac{\beta_{offset}^{CSI,1}}{\beta_{offset}^{CSI,2}} \cdot \frac{(O_{CSI,1} + L_{CSI,1})}{Q'_{CSI,1} \cdot Q_m}, r_{max}\right\} \qquad \text{[Equation 16]}$$

Here, $r_{max}$ may be a value on which the BS and the UE have pre-agreed (or a value set through a higher layer). For example, it may be 0.8.

In addition, when the UCI on PUSCH is without UL-SCH and the UE performs omission for CSI part 2 such that the coding rate for CSI part 2 is less than or equal to $c_T$, there may be no UCI payload size of CSI part 2 that makes the coding rate for CSI part 2 less than or equal to $c_T$ (for example, the coding rate for CSI part 2 is greater than $c_T$ even if the minimum UCI payload size of CSI part 2 is assumed). In this case, the UE may omit all CSI part 2 transmissions and calculate the number of REs for CSI part 1 as follows.

$$Q'_{CSI,1} = \sum_{l=0}^{N_{symb,all}^{PUSCH}-1} M_{sc}^{\Phi^{UCI}}(l) - Q'_{ACK} \qquad \text{[Equation 17]}$$

Here, $Q'_{ACK}$ and $Q'_{CSI,1}$ may denote the numbers of coded modulation symbols (or the numbers of UCI mapping REs) for HARQ-ACK and CSI part 1, respectively.

$M_{sc}^{\Phi^{UCI}}(l)$ may denote the number of UCI mapping REs in symbol index l, $N_{symb,all}^{PUSCH}$ may denote the total number of (OFDM) symbols in the PUSCH, and $l_0$ may denote the symbol index of the earliest non-DM-RS (OFDM) symbol after the first DM-RS (OFDM) symbol(s) in a slot.

The fourteenth UCI piggyback method described above may be applied in combination with other proposed methods of the present invention as long as they do not conflict with each other.

3.15. Fifteenth UCI Piggyback Method

When the UE transmits only the UCI on the PUSCH without the UL-SCH, the BS may indicate a target coding rate for the PUSCH through a higher layer signal and/or DCI. Thereafter, the UE may calculate the numbers of coded modulation symbols (or the numbers of UCI mapping REs) for HARQ-ACK, CSI part 1, and CSI part 2 as disclosed below. In the equation below, $Q'_{ACK}$, $Q'_{CSI,1}$, and $Q'_{CSI,2}$ may denote the numbers of coded modulation symbols (or the numbers of UCI mapping REs) for HARQ-ACK, CSI part 1, and CSI part 2, respectively.

$$Q'_{ACK} = \min\left\{\left\lceil\frac{\beta_{offset}^{ACK} \cdot (O_{ACK} + L_{ACK})}{c_0 \cdot Q_m}\right\rceil, \alpha\left(\sum_{l=l_0}^{N_{symb,all}^{PUSCH}-1} M_{sc}^{\Phi^{UCI}}(l)\right)\right\} \qquad \text{[Equation 18]}$$

$$Q'_{CSI,1} = \min\left\{\left\lceil\frac{\beta_{offset}^{CSI,1} \cdot (O_{CSI,1} + L_{CSI,1})}{c_0 \cdot Q_m}\right\rceil, \alpha\left(\sum_{l=0}^{N_{symb,all}^{PUSCH}-1} M_{sc}^{\Phi^{UCI}}(l)\right) - Q'_{ACK}\right\} \qquad \text{[Equation 19]}$$

or $$Q'_{CSI,1} = \min\left\{\left\lceil\frac{\beta_{offset}^{CSI,1} \cdot (O_{CSI,1} + L_{CSI,1})}{c_0 \cdot Q_m}\right\rceil, \sum_{l=0}^{N_{symb,all}^{PUSCH}-1} M_{sc}^{\Phi^{UCI}}(l) - Q'_{ACK}\right\} \qquad \text{[Equation 20]}$$

$$Q'_{CSI,2} = \sum_{l=0}^{N_{symb,all}^{PUSCH}-1} M_{sc}^{\Phi^{UCI}}(l) - Q'_{ACK} - Q'_{CSI,1} \qquad \text{[Equation 21]}$$

Here, $O_{CSI,1}$ and $O_{CSI,2}$ may denote the UCI payload sizes for CSI part 1 and CSI part 2, respectively.

$L_{CSI,1}$ and $L_{CSI,2}$ may denote CRC bits(s) for CSI part 1 and CSI part 2, respectively.

$\beta_{offset}^{CSI,1}$ and $\beta_{offset}^{CSI,2}$ may be the beta-offset values for CSI part 1 and CSI part 2, respectively.

Also, $Q_m$ may denote a modulation order of UCI transmitted on the PUSCH. Here, $Q_m$ may be indicated by the BS through DCI. For example, the BS may indicate the modulation order of the UCI through a bit field indicating the MCS (in the UL grant).

Also, $c_0$ may denote a (virtual) target coding rate for a PUSCH (without UL-SCH). Here, $c_0$ may be indicated by the UE through a higher layer signal and/or DCI. For example, the BS may indicate one of a plurality of values which are predetermined (or configured through a higher layer signal) for the target coding rate for the PUSCH through a bit filed other than the bit field indicating an MCS (and/or a time/frequency resource allocated to the PUSCH and/or an RV value). Particularly, the target coding rate may be indicated through a bit field indicating a HARQ process ID.

In addition, α, which is a value set by the BS through a higher layer signal, may denote a scaling factor between 0 and 1, and may be omitted.

$$M_{sc}^{\Phi^{UCI}}(l)$$

may denote the number of UCI mapping REs in symbol index l, $N_{symb,all}^{PUSCH}$ may denote the total number of (OFDM) symbols in the PUSCH, and $l_0$ may denote the symbol index of the earliest non-DM-RS (OFDM) symbol after the first DM-RS (OFDM) symbol(s) in a slot.

Specifically, the number of UCI REs in a PUSCH with a UL-SCH may be determined by the ratio between the UCI payload size (scaled by the beta-offset) and the data payload size. On the other hand, for the PUSCH without a UL-SCH, there is no data payload size, and therefore a (virtual) target coding rate may be utilized as a reference value to replace the data payload size.

For example, even in the case of a PUSCH without the UL-SCH, the BS may indicate to the UE a (virtual) PUSCH target coding rate through a higher layer signal and/or the DCI, and the UE may calculate the number of REs for each UCI type based on the (virtual) PUSCH target coding rate, the beta-offset value, the UCI payload size, and the modulation order.

Specifically, the UE may calculate the number of UCI REs for a specific UCI type such that the (effective) UCI payload size obtained by scaling the UCI payload size for the specific UCI type by a beta-offset (for the UCI type) is equal to the PUSCH target coding rate.

In this case, the number of REs for CSI part 2 may be equal to the number of remaining REs other than the REs allocated to HARQ-ACK and/or CSI part 1 in the PUSCH.

Particularly, in this configuration, the (virtual) target coding rate for the PUSCH may be indicated by a bit field indicating a HARQ process ID in the UL grant. This is because, in the UL grant indicating the UCI only PUSCH, the bit field indicating the HARQ process ID does not need to indicate the HARQ ID and is thus allowed to be reused for other purposes.

Additionally, the UE may perform omission for CSI part 2 such that the coding rate for CSI part 2 is less than or equal to $c_T$ given below.

$$c_T = \frac{c_0}{\beta_{offset}^{CSI,2}} \quad \text{[Equation 22]}$$

Here, $c_0$ is a target coding rate for the PUSCH, and the BS may indicate $c_0$ through a higher layer signal and/or DCI. For example, the BS may indicate one of a plurality of values which are predetermined (or configured through a higher layer signal) as the target coding rate for the PUSCH through a bit field indicating the HARQ process ID (in the UL grant).

Here, $\beta_{offset}^{CSI,2}$ may be the beta-offset values for CSI part 1 and CSI part 2.

Additionally, the RS density for a phase tracking reference signal (PT-RS) may also be determined in accordance with the (virtual) target coding rate for the PUSCH. That is, when a PT-RS density corresponding to each (virtual) target coding rate for the PUSCH is determined in advance or through a higher layer signal, the UE may apply the corresponding PT-RS density according to the (virtual) target coding rate value for the PUSCH indicated in the UL grant. Here, the (virtual) target coding rate for the PUSCH may be indicated by the bit field indicating the HARQ process ID in the UL grant.

In addition, when the UE transmits only the UCI on the PUSCH without the UL-SCH (and the CSI in the UCI has only a single-part), the BS may indicate the target coding rate for the PUSCH through a higher layer signal and/or the DCI, and the UE may calculate the numbers of coded modulation symbols (or the numbers of UCI mapping REs) for the HARQ-ACK and the single part CSI as follows. In other words, the UE may allocate all the RE(s) for CSI transmission except for the RE(s) allocated for HARQ-ACK transmission in the PUSCH.

In the equation given below, $Q'_{ACK}$ and $Q'_{CSI}$ may denote the numbers of coded modulation symbols (or the numbers of UCI mapping REs) for HARQ-ACK and single part CSI, respectively.

(1) Option 1

$$Q'_{ACK} = \min\left\{\left\lceil \frac{\beta_{offset}^{ACK} \cdot (O_{ACK} + L_{ACK})}{c_0 \cdot Q_m} \right\rceil, \left\lceil \alpha \cdot \sum_{l=l_0}^{N_{symb,all}^{PUSCH}-1} M_{sc}^{\Phi^{UCI}}(l) \right\rceil\right\} \quad \text{[Equation 23]}$$

$$Q'_{CSI} = \sum_{l=0}^{N_{symb,all}^{PUSCH}-1} M_{sc}^{\Phi^{UCI}}(l) - Q'_{ACK} \quad \text{[Equation 24]}$$

(2) Option 2

$$Q'_{ACK} = \min\left\{\left\lceil \frac{\beta_{offset}^{ACK} \cdot (O_{ACK} + L_{ACK})}{c_0 \cdot Q_m} \right\rceil, \sum_{l=l_0}^{N_{symb,all}^{PUSCH}-1} M_{sc}^{\Phi^{UCI}}(l) \right\} \quad \text{[Equation 25]}$$

$$Q'_{CSI} = \sum_{l=0}^{N_{symb,all}^{PUSCH}-1} M_{sc}^{\Phi^{UCI}}(l) - Q'_{ACK} \quad \text{[Equation 26]}$$

Here, $\beta_{offset}^{ACK}$ may be a beta-offset value for HARQ-ACK.

In addition, $Q_m$ may denote a modulation order for the UCI transmitted in the PUSCH, and may be indicated by the BS through the DCI. For example, the BS may indicate the modulation order of the UCI $Q_m$ through the bit field indicating the MCS (in the UL grant).

Also, $c_0$ may denote a (virtual) target coding rate for a PUSCH (without UL-SCH). Here, $c_0$ may be indicated by the UE through a higher layer signal and/or DCI. For example, the BS may indicate one of a plurality of values which are predetermined (or configured through a higher layer signal) for the target coding rate for the PUSCH through a bit field other than the bit field indicating an MCS (and/or a time/frequency resource allocated to the PUSCH and/or an RV value). Particularly, the BS may indicate the target coding rate through a bit field indicating a HARQ process ID.

In addition, $\alpha$, which is a value set by the BS through a higher layer signal, may denote a scaling factor between 0 and 1.

$M_{sc}^{\Phi^{UCI}}(l)$ may denote the number of UCI mapping REs in symbol index l, $N_{symb,all}^{PUSCH}$ may denote the total number of (OFDM) symbols in the PUSCH, and $l_0$ may denote the symbol index of the earliest non-DM-RS (OFDM) symbol after the first DM-RS (OFDM) symbol(s) in a slot.

In the NR system according to an embodiment of the present invention, when CSI indicating reference signal received power (RSRP) information about a specific beam is transmitted as A-CSI on PUSCH, the CSI may be composed of only a single part. When the UE transmits the UCI only on PUSCH without UL-SCH, the UE may allocate all the RE(s) for CSI transmission except for the RE(s) allocated for HARQ-ACK transmission.

Particularly, when the UE transmits only the UCI on the PUSCH without the UL-SCH, the number of CSI transmission REs may be set differently depending on whether the CSI transmitted on the PUSCH is single part CSI or two-part CSI (i.e., CSI part 1 and CSI part 2).

For example, if the CSI is two-part CSI, the UE may apply the method of calculating the numbers of coded modulation symbols (or the numbers of UCI mapping REs) for HARQ-ACK, CSI part 1 and CSI part 2 described above. If the CSI is single part CSI, the UE may apply the method of calculating the numbers of coded modulation symbols (or the numbers of UCI mapping REs) for the HARQ-ACK and the single part CSI described above.

The fifteenth UCI piggyback method described above may be applied in combination with other proposed methods of the present invention as long as they do not conflict with each other.

Figure 31:
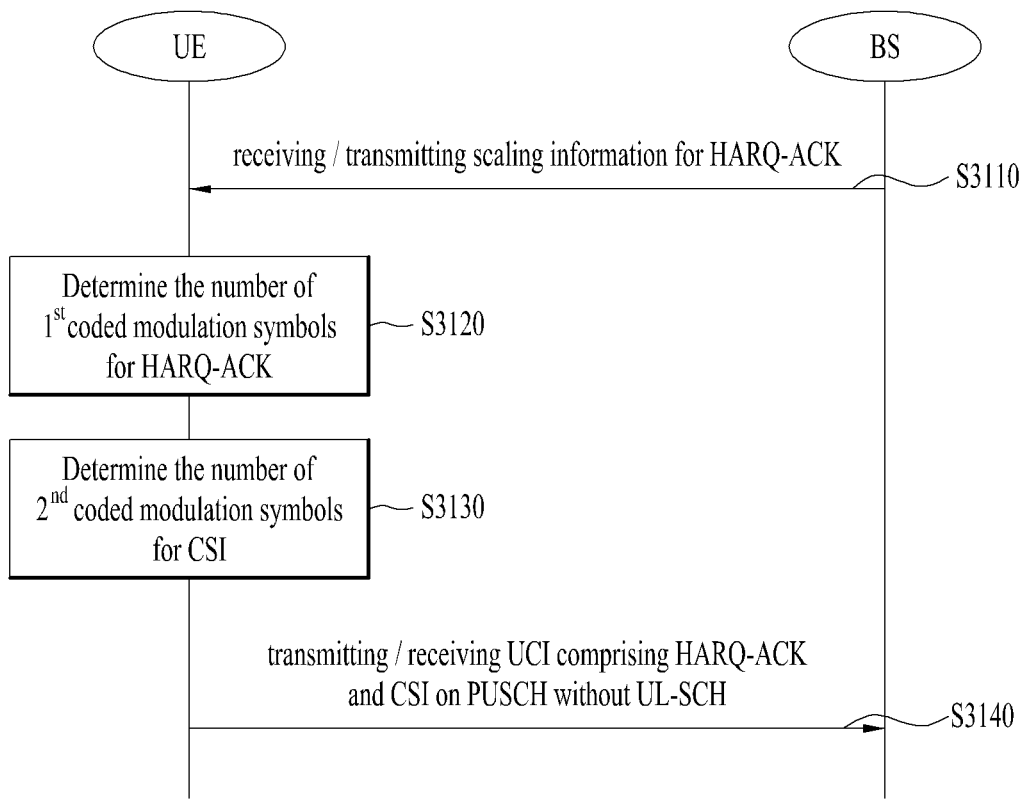
FIG. 31 is a diagram illustrating a UCI piggybacking method of a terminal and a base station according to an embodiment of the present invention.

FIG. 31 is a diagram illustrating a UCI piggybacking method of a terminal and a base station according to an embodiment of the present invention. In this embodiment, it is assumed that UCI piggyback is performed on a PUSCH without UL-SCH.

The base station (BS) according to the present invention transmits, to the UE, scaling information on acknowledgement information (e.g., HARQ-ACK) included in the UCI (S3110). In response, the UE receives, from the BS, the scaling information on the acknowledgment information included in the UCI.

Here, the scaling information may be transmitted/received through higher layer signaling (e.g., RRC signaling) or may be transmitted/received through downlink control information.

The UE determines the number of first coded modulation symbols for the acknowledgement information on physical uplink shared channel (PUSCH) without uplink shared channel (UL-SCH) on the basis of the scaling information (S3120).

In addition, the UE determines the number of second coded modulation symbols for channel state information (CSI) by subtracting the number of the first coded modulation symbols from the number of resource elements that can be used for transmission of the UCI including the acknowledgement information and the CSI (S3130).

For example, when the CSI includes CSI part 1 and CSI part 2 and the number of the first coded modulation symbols corresponds to $Q'_{ACK}$, the UE may determine the number of coded modulation symbols for CSI part 1 and CSI part 2 based on the equations given below.

More specifically, the UE may determine the number of third coded modulation symbols for CSI part 1 and the number of fourth coded modulation symbols for CSI part 2 based on Equations 27 and 28 given below.

$$Q'_{CSI,1} = \min\left\{\left\lceil \frac{\beta^{CSI,1}_{offset} \cdot (O_{CSI,1} + L_{CSI,1})}{c_0 \cdot Q_m} \right\rceil, \sum_{l=0}^{N^{PUSCH}_{symb,all}-1} M^{\Phi^{UCI}}_{sc}(l) - Q'_{ACK} \right\}$$ [Equation 27]

$$Q'_{CSI,2} = \sum_{l=0}^{N^{PUSCH}_{symb,all}-1} M^{\Phi^{UCI}}_{sc}(l) - Q'_{ACK} - Q'_{CSI,1}$$ [Equation 28]

Here, $O_{CSI,1}$ may denote the payload size for CSI part 1, $L_{CSI,1}$ may denote the number of CRC (Cyclic Redundancy Check) bits for the CSI part 1, and $\beta^{CSI,1}_{offset}$ may denote beta offset value for CSI part 1. $Q_m$ may denote the modulation order of the UCI transmitted in the PUSCH, $c_0$ may denote a target code rate of the PUSCH without the UL-SCH, $M^{\Phi^{UCI}}_{sc}(l)$ may denote the number of resource elements that can be used for transmission of the UCI in symbol index l, and $N^{PUSCH}_{symb,all}$ may denote the total number of symbols of the PUSCH.

In this case, the sum of the number of the third coded modulation symbols and the number of the fourth coded modulation symbols may correspond to the number of the second coded modulation symbols.

In another example, if the CSI includes CSI part 1 only and the number of the first coded modulation symbols corresponds to $Q'_{ACK}$, the UE may determine the numbers of coded modulation symbols for the acknowledgment information and the CSI part 1 based on the following equation given below.

More specifically, the UE may determine the number of third coded modulation symbols for CSI part 1 and the number of the first coded modulation symbols for the acknowledgment information based on Equations 29 and 30 below.

$$Q'_{CSI} = \sum_{l=0}^{N^{PUSCH}_{symb,all}-1} M^{\Phi^{UCI}}_{sc}(l) - Q'_{ACK}$$ [Equation 29]

$$Q'_{ACK} = \min\left\{\left\lceil \frac{\beta^{ACK}_{offset} \cdot (O_{ACK} + L_{ACK})}{c_0 \cdot Q_m} \right\rceil, \left\lceil \alpha \cdot \sum_{l=0}^{N^{PUSCH}_{symb,all}-1} M^{\Phi^{UCI}}_{sc}(l) \right\rceil \right\}$$ [Equation 30]

Here, $M^{\Phi^{UCI}}_{sc}(l)$ may denote the number of resource elements that can be used for transmission of the UCI in symbol index l, and $N^{PUSCH}_{symb,all}$ may denote a total number of symbols of the PUSCH. $O_{ACK}$ may denote the payload size for the acknowledgement information, $L_{ACK}$ may denote the number of CRC (Cyclic Redundancy Check) bits for the acknowledgement information, and $\beta^{ACK}_{offset}$ et may denote a beta offset value for the acknowledgement information. $c_0$ may denote a target code rate of the PUSCH without the UL-SCH, and α may denote a scaling value indicated by the scaling information.

Subsequently, the UE transmits, to the BS, the UCI including the acknowledgment information and the CSI on the PUSCH (i.e., the PUSCH without the UL-SCH) on the basis of the number of the first coded modulation symbols and the number of the second coded modulation symbols (S3140). In response, the BS may receive, from the UE, the UCI including the acknowledgment information and the CSI on the PUSCH (i.e., the PUSCH without the UL-SCH) based on the number of the first coded modulation symbols and the number of the second coded modulation symbols.

In the present invention, the PUSCH on which the UCI is transmitted may be determined according to the following rules.

For example, when a plurality of PUSCHs in which a transmission interval is overlapped with a physical uplink control channel (PUCCH) in which transmission of the UCI is scheduled comprises one or more first PUSCHs scheduled by corresponding uplink grants and one or more second PUSCHs configured without corresponding uplink grants, the PUSCH in which the UCI is transmitted may be determined to be one of the one or more first PUSCHs.

In particular, when the one or more first PUSCHs include a plurality of first PUSCHs, the PUSCH in which the UCI is transmitted may be determined to be a PUSCH to be transmitted first among the one or more first PUSCHs.

It is obvious that examples of the proposed schemes described above may also be included in one of the implementation methods of the present invention, and thus may be regarded as a kind of proposed scheme. In addition, the proposed schemes described above may be implemented independently or by combining (or merging) some of the proposed schemes. A rule may be defined such that the BS informs the UE of the information on whether or not the proposed methods are applied (or information on the rules of the proposed methods) through a predefined signal (e.g., a physical layer signal or a higher layer signal).

4. Device Configuration

Figure 32:
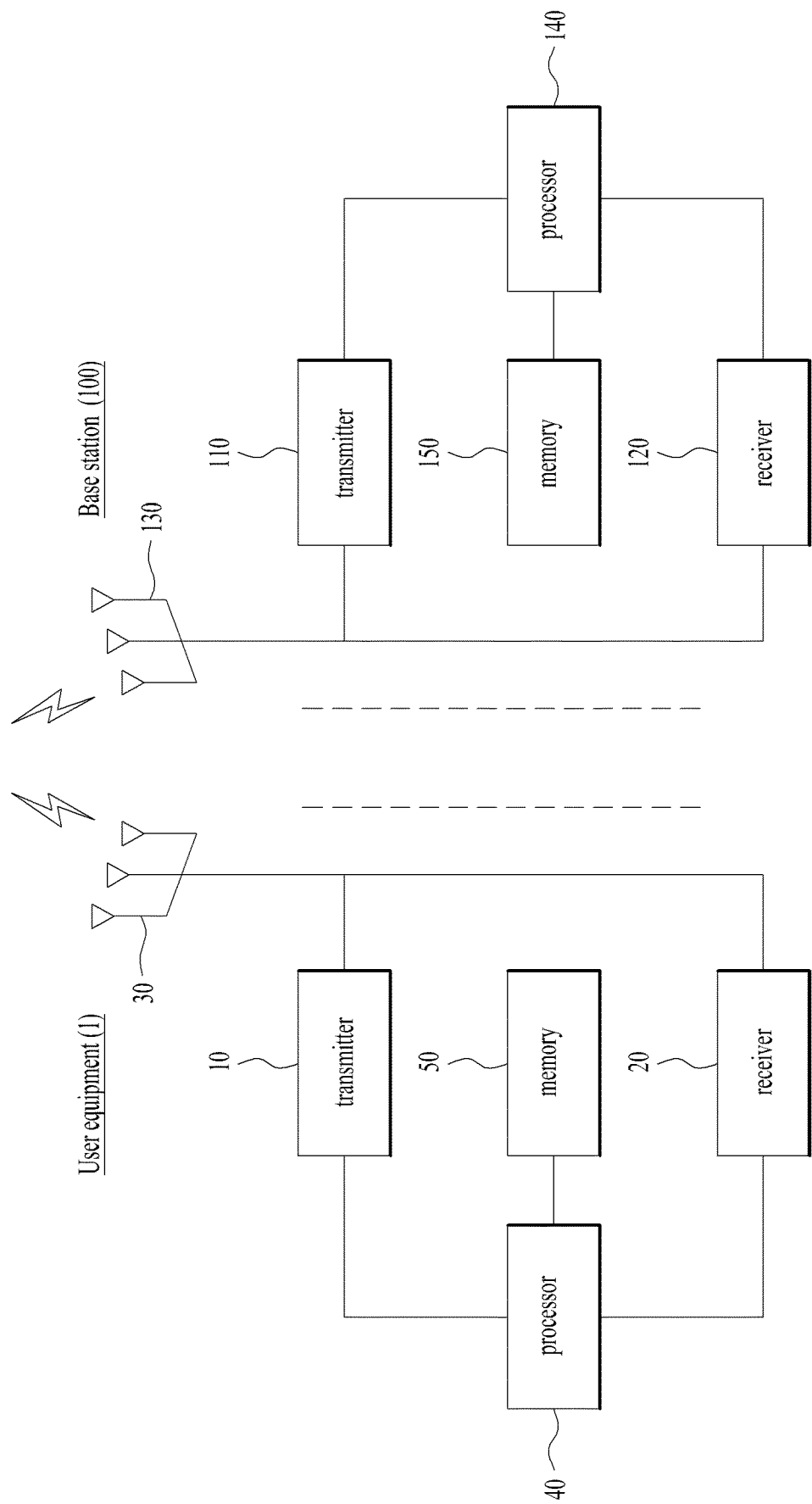
FIG. 32 is a diagram illustrating configuration of a user equipment and a base station by which the proposed embodiments may be implemented.

FIG. 32 is a diagram illustrating configuration of a user equipment and a base station by which the proposed embodiments may be implemented. The UE and the BS shown in FIG. 32 operate to implement the above-described embodiments of the uplink control information transmission/reception methods between the UE and the BS.

A UE 1 may act as a transmission end on a UL and as a reception end on a DL. A BS (eNB or gNB) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 configured as described above receives, from the BS, scaling information on the acknowledgment information included in the UCI via the receiver 20 through higher layer signaling. The UE 1 determines the number of first coded modulation symbols for the acknowledgement information on physical uplink shared channel (PUSCH) without uplink shared channel (UL-SCH) on the basis of the scaling information and determines the number of second coded modulation symbols for channel state information (CSI) by subtracting the number of the first coded modulation symbols from the number of resource elements that can be used for transmission of the UCI including the acknowledgement information and the CSI, using the processor 40. Subsequently, the UE 1 transmits, to the BS, the UCI including the acknowledgment information and the CSI on the PUSCH on the basis of the number of the first coded modulation symbols and the number of the second coded modulation symbols through the transmitter 10.

In response, the BS 100 transmits, to the UE 1, scaling information on acknowledgement information included in the UCI via the transmitter 110 through higher layer signaling. Then, the BS 100 receives, from the UE 1, the UCI including acknowledgement information and channel state information (CSI) on a physical uplink shared channel (PUSCH) without an uplink shared channel (UL-SCH) through the receiver 120. At this time, the UCI including the acknowledgement information and the CSI may be received on the PUSCH on the basis of the number of first coded modulation symbols for the acknowledgement information and the number of second coded modulation symbols for the CSI. Herein, the number of the first coded modulation symbols may be determined on the basis of the scaling information, and the number of the second coded modulation symbols may be determined by subtracting the number of the first coded modulation symbols from a number of resource elements that can be used for transmission of the UCI comprising the acknowledgement information and the CSI.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 32 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

What is claimed is:

1. A method for transmitting uplink control information (UCI) at a user equipment (UE) to a base station (BS) in a wireless communication system, the method comprising:
   receiving, from the BS, scaling information for acknowledgement information through higher layer signaling;
   determining a number of first coded modulation symbols for the acknowledgement information on physical uplink shared channel (PUSCH) without uplink shared channel (UL-SCH) based on the scaling information;
   determining a number of second coded modulation symbols for channel state information (CSI) by subtracting the number of the first coded modulation symbols from a number of resource elements that can be used for transmission of the UCI including the acknowledgement information and the CSI; and
   transmitting, to the BS, the UCI on the PUSCH based on the number of the first coded modulation symbols and the number of the second coded modulation symbols,
   wherein, based on that the CSI includes CSI part 1 and CSI part 2, a number of third coded modulation symbols for the CSI part 1 satisfies below equation 1, and a number of fourth coded modulation symbols for the CSI part 2 satisfies below equation 2,
   where $Q'_{ACK}$ denotes the number of the first coded modulation symbols,
   where $O_{CSI,1}$ denotes payload size for the CSI part 1,
   where $L_{CSI,1}$ denotes a number of CRC (Cyclic Redundancy Check) bits for the CSI part 1, where $\beta_{offset}^{CSI,1}$ denotes beta offset value for the CSI part 1, where $Q_m$ denotes modulation order of the UCI transmitted in the PUSCH, where $c_0$ denotes a target code rate of the PUSCH without the UL-SCH, where $M_{sc}^{\Phi^{UCI}}(l)$ denotes a number of resource elements that can be used for transmission of the UCI in symbol index l, where $N_{symb,all}^{PUSCH}$ denotes a total number of symbols of the PUSCH.

2. The method of claim 1,
wherein a sum of the number of the third coded modulation symbols and the number of the fourth coded modulation symbols is the number of the second coded modulation symbols.

3. The method of claim 1,
wherein when a plurality of PUSCHs in which a transmission interval is overlapped with a physical uplink control channel (PUCCH) in which transmission of the UCI is scheduled comprises one or more first PUSCHs scheduled by corresponding uplink grants and one or more second PUSCHs configured without corresponding uplink grants,
the PUSCH in which the UCI is transmitted is one of the one or more first PUSCHs.

4. The method of claim 3,
wherein the PUSCH in which the UCI is transmitted corresponds to a PUSCH to be transmitted first among the one or more first PUSCHs.

5. A method for receiving uplink control information (UCI) by a base station (BS) from a user equipment (UE) in a wireless communication system, the method comprising:
transmitting, to the UE, scaling information for acknowledgement information through higher layer signaling; and
receiving from the UE, the UCI on a physical uplink shared channel (PUSCH) without a uplink shared channel (UL-SCH),
wherein the UCI includes the acknowledgement information and channel state information (CSI), and the UCI is received based on a number of first coded modulation symbols for the acknowledgement information and a number of second coded modulation symbols for the CSI,
wherein the number of the first coded modulation symbols is determined based on the scaling information,
wherein the number of the second coded modulation symbols is determined by subtracting the number of the first coded modulation symbols from a number of resource elements that can be used for transmission of the UCI,
wherein, based on that the CSI includes CSI part 1 and CSI part 2, a number of third coded modulation symbols for the CSI part 1 satisfies below equation 1, and a number of fourth coded modulation symbols for the CSI part 2 satisfies below equation 2, where $Q'_{ACK}$ denotes the number of the first coded modulation symbols, where $O_{CSI,1}$ denotes payload size for the CSI part 1, where $L_{CSI,1}$ denotes a number of CRC (Cyclic Redundancy Check) bits for the CSI part 1, where $\beta_{offset}^{CSI,1}$ denotes beta offset value for the CSI part 1, where $Q_m$ denotes modulation order of the UCI transmitted in the PUSCH, where $c_0$ denotes a target code rate of the PUSCH without the UL-SCH, where $M_{sc}^{\Phi^{UCI}}(l)$ denotes a number of resource elements that can be used for transmission of the UCI in symbol index l, where $N_{symb,all}^{PUSCH}$ denotes a total number of symbols of the PUSCH.

6. The method of claim 5,
wherein a sum of the number of the third coded modulation symbols and the number of the fourth coded modulation symbols is the number of the second coded modulation symbols.

7. The method of claim 5,
wherein when a plurality of PUSCHs in which a transmission interval is overlapped with a physical uplink control channel (PUCCH) in which transmission of the UCI is scheduled comprises one or more first PUSCHs scheduled by corresponding uplink grants and one or more second PUSCHs configured without corresponding uplink grants,
the PUSCH in which the UCI is transmitted is one of the one or more first PUSCHs.

8. The method of claim 7,
wherein the PUSCH in which the UCI is transmitted corresponds to a PUSCH to be transmitted first among the one or more first PUSCHs.

9. A user equipment (UE) configured to transmit uplink control information (UCI) to a base station (BS) in a wireless communication system, the UE comprising:
a transmitter;
a receiver; and
a processor connected to the transmitter and the receiver to operate,
wherein the processor is configured to:
receive, from the BS, scaling information for acknowledgement information through higher layer signaling;
determine a number of first coded modulation symbols for the acknowledgement information on physical uplink shared channel (PUSCH) without uplink shared channel (UL-SCH) based on the scaling information;
determine a number of second coded modulation symbols for channel state information (CSI) by subtracting the number of the first coded modulation symbols from a number of resource elements that can be used for transmission of the UCI including the acknowledgement information and the CSI; and
transmit to the BS, the UCI on the PUSCH based on the number of the first coded modulation symbols and the number of the second coded modulation symbols,
wherein, based on that the CSI includes CSI part 1 and CSI part 2, a number of third coded modulation symbols for the CSI part 1 satisfies below equation 1, and a number of fourth coded modulation symbols for the CSI part 2 satisfies below equation 2, where $Q'_{ACK}$ denotes the number of the first coded modulation symbols, where $O_{CSI,1}$ denotes payload size for the CSI part 1, where $L_{CSI,1}$ denotes a number of CRC (Cyclic Redundancy Check) bits for the CSI part 1, where $\beta_{offset}^{CSI,1}$ denotes beta offset value for the CSI part 1, where $Q_m$ denotes modulation order of the UCI transmitted in the PUSCH, where $c_0$ denotes a target code rate of the PUSCH without the UL-SCH, where $M_{sc}^{\Phi^{UCI}}(l)$ denotes a number of resource elements that can be used for transmission of the UCI in symbol index l, where $N_{symb,all}^{PUSCH}$ denotes a total number of symbols of the PUSCH.

10. A base station (BS) configured to receive uplink control information (UCI) from a user equipment (UE) in a wireless communication system, the UE comprising:
a transmitter;
a receiver; and
a processor connected to the transmitter and the receiver to operate, wherein the processor is configured to:
transmit, to the UE, scaling information for acknowledgement information through higher layer signaling; and
receive, from the UE, the UCI on a physical uplink shared channel (PUSCH) without a uplink shared channel (UL-SCH),
wherein the UCI includes the acknowledgement information and channel state information (CSI), and the UCI is received based on a number of first coded modulation symbols for the acknowledgement information and a number of second coded modulation symbols for the CSI,
wherein the number of the first coded modulation symbols is determined based on the scaling information,
wherein the number of the second coded modulation symbols is determined by subtracting the number of the first coded modulation symbols from a number of resource elements that can be used for transmission of the UCI,
wherein, based on that the CSI includes CSI part 1 and CSI part 2, a number of third coded modulation symbols for the CSI part 1 satisfies below equation 1, and a number of fourth coded modulation symbols for the CSI part 2 satisfies below equation 2, where $Q'_{ACK}$ denotes the number of the first coded modulation symbols, where $O_{CSI,1}$ denotes payload size for the CSI part 1, where $L_{CSI,1}$ denotes a number of CRC (Cyclic Redundancy Check) bits for the CSI part 1, where $\beta_{offset}^{CSI,1}$ denotes beta offset value for the CSI part 1, where $Q_m$ denotes modulation order of the UCI transmitted in the PUSCH, where $c_0$ denotes a target code rate of the PUSCH without the UL-SCH, where $M_{sc}^{\Phi^{UCI}}(l)$ denotes a number of resource elements that can be used for transmission of the UCI in symbol index l, where $N_{symb,all}^{PUSCH}$ denotes a total number of symbols of the PUSCH.

* * * * *

UNITED STATES PATENT AND TRADEMARK OFFICE
CERTIFICATE OF CORRECTION

PATENT NO. : 10,813,118 B2
APPLICATION NO. : 16/100872
DATED : October 20, 2020
INVENTOR(S) : Hanjun Park, Suckchel Yang and Seonwook Kim Page 1 of 2

It is certified that error appears in the above-identified patent and that said Letters Patent is hereby corrected as shown below:

In the Claims

Column 62, Line 64; in Claim 1, after "equation 1," insert:
-- equation 1:

$$Q'_{CSI,1} = \min\left\{ \left\lceil \frac{\beta_{offset}^{CSI,1} \cdot (O_{CSI,1} + L_{CSI,1})}{c_0 \cdot Q_m} \right\rceil , \sum_{l=0}^{N_{symb,all}^{PUSCH}-1} M_{sc}^{\neq UCI}(l) - Q'_{ACK} \right\}$$

-- therefore.

Column 62, Line 66; in Claim 1, after "equation 2," insert:
-- equation 2:

$$Q'_{CSI,2} = \sum_{l=0}^{N_{symb,all}^{PUSCH}-1} M_{sc}^{\neq UCI}(l) - Q'_{ACK} - Q'_{CSI,1}$$

-- therefore.

Column 63, Line 55; in Claim 5, after "equation 1," insert:
-- equation 1:

$$Q'_{CSI,1} = \min\left\{ \left\lceil \frac{\beta_{offset}^{CSI,1} \cdot (O_{CSI,1} + L_{CSI,1})}{c_0 \cdot Q_m} \right\rceil , \sum_{l=0}^{N_{symb,all}^{PUSCH}-1} M_{sc}^{\neq UCI}(l) - Q'_{ACK} \right\}$$

-- therefore.

Column 63, Line 57; in Claim 5, after "equation 2," insert:
-- equation 2:

Signed and Sealed this
Thirteenth Day of September, 2022

Katherine Kelly Vidal
*Director of the United States Patent and Trademark Office*

CERTIFICATE OF CORRECTION (continued)
U.S. Pat. No. 10,813,118 B2

$$Q'_{CSI,2} = \sum_{l=0}^{N_{symb,all}^{PUSCH}-1} M_{sc}^{\phi UCI}(l) - Q'_{ACK} - Q'_{CSI,1}$$

-- therefore.

Column 64, Line 47; in Claim 9, after "equation 1," insert:
-- equation 1:

$$Q'_{CSI,1} = \min\left\{\left\lceil\frac{\beta_{offset}^{CSI,1} \cdot (O_{CSI,1} + L_{CSI,1})}{c_0 \cdot Q_m}\right\rceil, \sum_{l=0}^{N_{symb,all}^{PUSCH}-1} M_{sc}^{\phi UCI}(l) - Q'_{ACK}\right\}$$

-- therefore.

Column 64, Line 49; in Claim 9, after "equation 2," insert:
-- equation 2:

$$Q'_{CSI,2} = \sum_{l=0}^{N_{symb,all}^{PUSCH}-1} M_{sc}^{\phi UCI}(l) - Q'_{ACK} - Q'_{CSI,1}$$

-- therefore.

Column 65, Line 22; in Claim 10, after "equation 1," insert:
-- equation 1:

$$Q'_{CSI,1} = \min\left\{\left\lceil\frac{\beta_{offset}^{CSI,1} \cdot (O_{CSI,1} + L_{CSI,1})}{c_0 \cdot Q_m}\right\rceil, \sum_{l=0}^{N_{symb,all}^{PUSCH}-1} M_{sc}^{\phi UCI}(l) - Q'_{ACK}\right\}$$

-- therefore.

Column 66, Line 2; in Claim 10, after "equation 2," insert:
-- equation 2:

$$Q'_{CSI,2} = \sum_{l=0}^{N_{symb,all}^{PUSCH}-1} M_{sc}^{\phi UCI}(l) - Q'_{ACK} - Q'_{CSI,1}$$

-- therefore.